(12) United States Patent
Berglund et al.

(10) Patent No.: US 11,413,995 B2
(45) Date of Patent: Aug. 16, 2022

(54) SUSPENSION SYSTEM FOR A UTILITY VEHICLE

(71) Applicant: Ariens Company, Brillion, WI (US)

(72) Inventors: Brent P. Berglund, Brillion, WI (US); Jeffrey M. Berchem, New Holstein, WI (US); Daniel J. Gindt, Appleton, WI (US)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 17/609,349

(22) PCT Filed: May 8, 2020

(86) PCT No.: PCT/US2020/032227
§ 371 (c)(1),
(2) Date: Nov. 5, 2021

(87) PCT Pub. No.: WO2020/227684
PCT Pub. Date: Nov. 12, 2020

(65) Prior Publication Data
US 2022/0169155 A1    Jun. 2, 2022

Related U.S. Application Data

(60) Provisional application No. 63/014,593, filed on Apr. 23, 2020, provisional application No. 62/845,345, filed on May 9, 2019.

(51) Int. Cl.
*B60N 2/54*    (2006.01)
*B60G 3/18*    (2006.01)
(Continued)

(52) U.S. Cl.
CPC ............. *B60N 2/54* (2013.01); *B60G 3/18* (2013.01); *A01D 34/00* (2013.01); *A01D 2101/00* (2013.01)

(58) Field of Classification Search
CPC . B60N 2/54; B60G 3/18; A01D 34/00; A01D 2101/00
See application file for complete search history.

(56) References Cited

U.S. PATENT DOCUMENTS 2,334,922 A    11/1943 Gustafson
3,006,593 A    10/1961 Plate et al.
(Continued)

FOREIGN PATENT DOCUMENTS

GB              918114 A    2/1963
WO       WO1991004881 A1    4/1991
(Continued)

OTHER PUBLICATIONS

International Search Report with Written Opinion for related Application No. PCT/US2020/032227 dated Jul. 22, 2020 (16 Pages).
(Continued)

*Primary Examiner* — Drew J Brown
(74) *Attorney, Agent, or Firm* — Michael Best & Friedrich LLP

(57) ABSTRACT

A utility vehicle includes a frame, a first ground-engaging element coupled to a first portion of the frame, a second ground-engaging element coupled to a second portion of the frame, an operator platform supported by the frame, and a suspension system coupled between the operator platform and the frame to accommodate motion of the frame relative to the operator platform. The suspension system includes a first linkage assembly coupled to the operator platform and operable to accommodate motion of the second portion of the frame relative to the operator platform and a second linkage assembly having a first end coupled to the frame to secure the suspension system to the frame and a second end coupled to the first linkage assembly. The second linkage assembly being operable independent of the first linkage
(Continued)

assembly to accommodate motion of the first portion of the frame relative to the operator platform.

42 Claims, 31 Drawing Sheets

(51) Int. Cl.
  *A01D 34/00* (2006.01)
  *A01D 101/00* (2006.01)

(56) References Cited

U.S. PATENT DOCUMENTS

| | | | |
|---|---|---|---|
| 3,325,136 A | 6/1967 | Radke et al. | |
| 3,357,717 A | 12/1967 | Samford | |
| 3,599,232 A | 8/1971 | Tabor | |
| 3,602,475 A | 8/1971 | Sedlock | |
| 3,638,897 A | 2/1972 | Harder, Jr. et al. | |
| 3,883,172 A | 5/1975 | Barton et al. | |
| 4,151,973 A | 5/1979 | Sedlock | |
| 4,175,366 A | 11/1979 | Cicci | |
| 4,177,627 A | 12/1979 | Cicci | |
| 5,004,206 A | 4/1991 | Anderson | |
| 5,127,699 A * | 7/1992 | Maezawa | E02F 9/166 180/326 |
| 5,368,118 A | 11/1994 | Hoefle | |
| 5,628,169 A | 5/1997 | Stiller et al. | |
| 5,651,585 A | 7/1997 | Van Duser | |
| 5,873,627 A | 2/1999 | Kosmatka et al. | |
| 5,950,977 A | 9/1999 | Proksch et al. | |
| 6,206,121 B1 | 3/2001 | Michel | |
| 6,257,663 B1 | 7/2001 | Swierczewski | |
| 6,336,627 B1 | 1/2002 | Fujita et al. | |
| 6,773,049 B2 * | 8/2004 | Rupiper | B60N 2/06 296/65.02 |
| 6,983,583 B2 | 1/2006 | Bucher | |
| 7,029,059 B2 | 4/2006 | Bernhardt et al. | |
| 7,107,746 B2 | 9/2006 | Melone et al. | |
| 7,246,836 B2 * | 7/2007 | Hahn | B60N 2/507 296/65.02 |
| 7,882,914 B2 | 2/2011 | Scheele et al. | |
| 8,065,864 B2 | 11/2011 | Melone et al. | |
| 8,146,899 B2 | 4/2012 | Hiser | |
| 8,186,475 B2 | 5/2012 | Sugden et al. | |
| 8,282,149 B2 | 10/2012 | Kniffin et al. | |
| 8,356,861 B2 | 1/2013 | Kniffin et al. | |
| 8,397,367 B2 | 3/2013 | Melone et al. | |
| 8,714,642 B2 | 5/2014 | Lamparter et al. | |
| 8,955,832 B1 | 2/2015 | Bartel | |
| 8,960,691 B2 | 2/2015 | Haller et al. | |
| 8,973,967 B2 | 3/2015 | Kolb | |
| 9,096,151 B2 | 8/2015 | Canonge et al. | |
| 9,499,204 B1 | 11/2016 | Gust et al. | |
| 9,682,642 B2 | 6/2017 | Fujita et al. | |
| 9,783,086 B2 | 10/2017 | Parker et al. | |
| 9,821,689 B2 | 11/2017 | Busboom et al. | |
| 9,937,831 B2 | 4/2018 | Lorey | |
| 10,112,512 B2 | 10/2018 | Lorey et al. | |
| 10,173,560 B2 | 1/2019 | Ochs | |
| 10,220,738 B2 | 3/2019 | Lorey et al. | |
| 10,597,092 B2 | 3/2020 | Stover et al. | |
| 10,624,261 B2 | 4/2020 | Krajewski | |
| 2005/0144923 A1 | 7/2005 | Melone et al. | |
| 2007/0131474 A1 | 6/2007 | Zetterstroem | |
| 2009/0127812 A1 | 5/2009 | Copsey et al. | |
| 2011/0277433 A1 | 11/2011 | Sugden et al. | |
| 2017/0190270 A1 * | 7/2017 | Busboom | B60N 2/502 |
| 2017/0203628 A1 | 7/2017 | Dames et al. | |
| 2017/0203673 A1 | 7/2017 | Parker et al. | |
| 2017/0232871 A1 | 8/2017 | Asai et al. | |
| 2018/0001805 A1 | 1/2018 | Lorey | |
| 2018/0201331 A1 | 7/2018 | Helm et al. | |
| 2019/0111812 A1 | 4/2019 | Stover et al. | |
| 2020/0108751 A1 * | 4/2020 | Dotzler | B60N 2/508 |
| 2021/0309133 A1 * | 10/2021 | Fujita | F16F 15/022 |

FOREIGN PATENT DOCUMENTS

| | | | | |
|---|---|---|---|---|
| WO | WO2009075327 A1 | 6/2009 | | |
| WO | WO-2019049879 A1 * | 3/2019 | | B60N 2/50 |
| WO | WO-2021079941 A1 * | 4/2021 | | |

OTHER PUBLICATIONS

Examination Report issued from the Australian Patent Office for related Application No. 2020270148 dated Jan. 6, 2022 (3 Pages).
Examination Report issued from the New Zealand Patent Office for related application No. 782724 dated Jan. 26, 2022 (3 Pages).

* cited by examiner

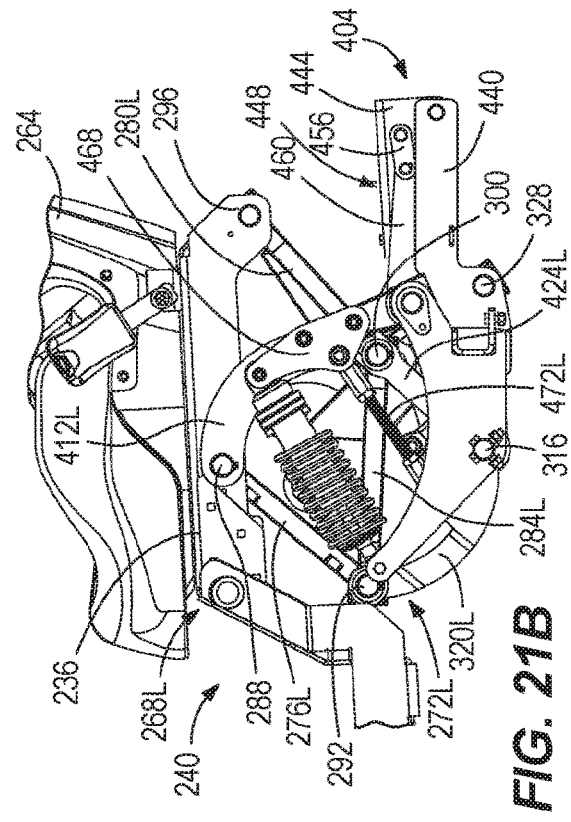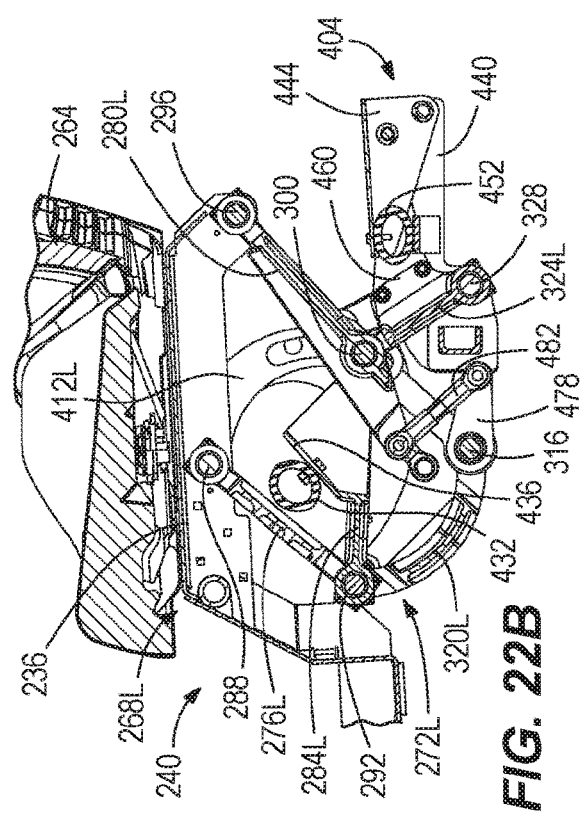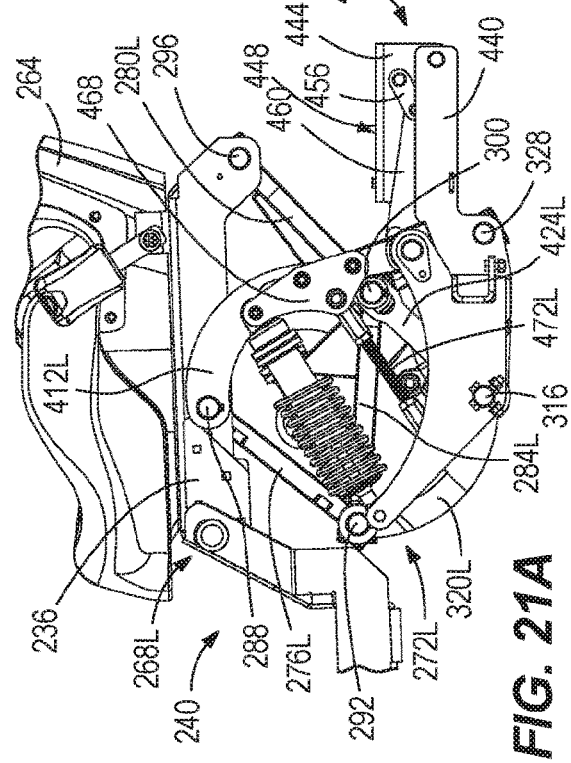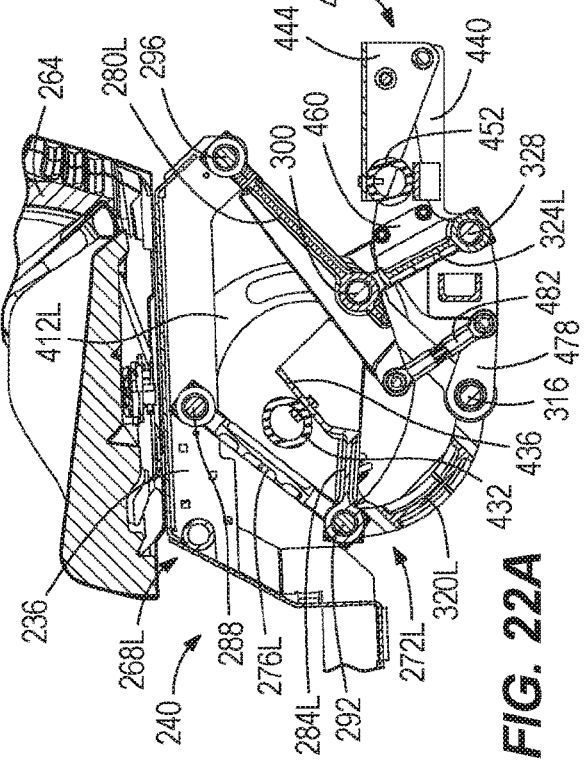

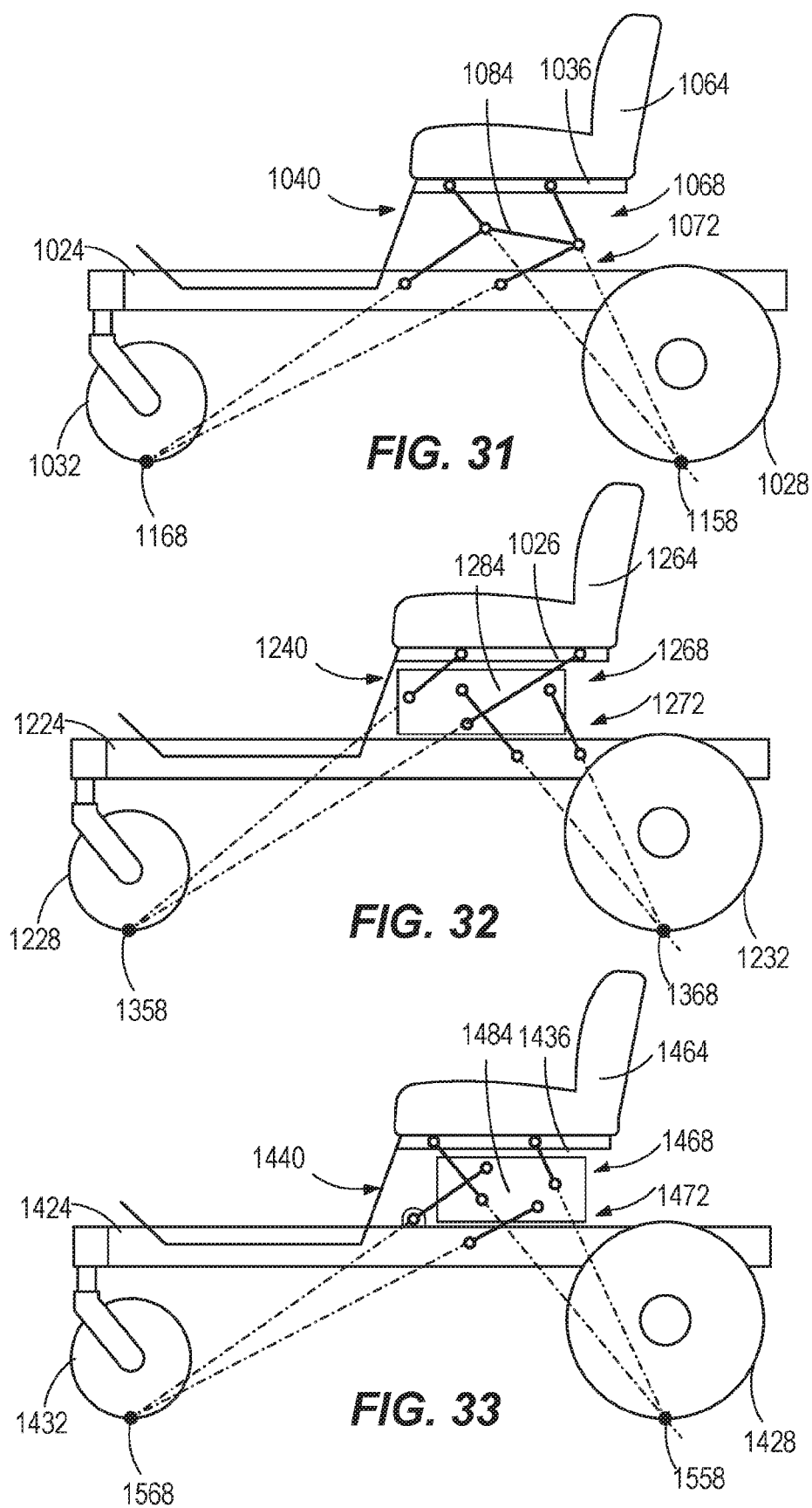

SUSPENSION SYSTEM FOR A UTILITY VEHICLE

CROSS REFERENCE TO RELATED APPLICATIONS

This application claims priority to U.S. Provisional Patent Application No. 62/845,345, filed May 9, 2019, and U.S. Provisional Patent Application No. 63/014,593, filed Apr. 23, 2020, the entire content of which is incorporated herein by reference.

FIELD OF THE INVENTION

The present invention relates to utility vehicles (e.g., lawn mowers, tractors, utility task vehicles (UTVs), loaders, etc.) and, more particularly, to suspension systems for utility vehicles.

SUMMARY

In one embodiment, the invention provides a utility vehicle including a frame, a first ground-engaging element coupled to a first portion of the frame, a second ground-engaging element coupled to a second portion of the frame an operator platform supported by the frame, and a suspension system coupled between the operator platform and the frame to accommodate motion of the frame relative to the operator platform. The suspension system including a first linkage assembly coupled to the operator platform and operable to accommodate motion of the second portion of the frame relative to the operator platform and a second linkage assembly having a first end coupled to the frame to secure the suspension system to the frame and a second end coupled to the first linkage assembly. The second linkage assembly being operable independent of the first linkage assembly to accommodate motion of the first portion of the frame relative to the operator platform. The first portion of the frame is one of a front portion of the frame and a rear portion of the frame and the second portion of the frame is the other of the front and rear portion of the frame.

In one embodiment, the invention provides a utility vehicle including a frame, a first ground-engaging element coupled to a first portion of the frame, a second ground-engaging element coupled to a second portion of the frame, an operator platform supported by the frame, and a suspension system coupled between the operator platform and the frame to accommodate motion of the frame relative to the operator platform. The suspension system including a first four bar linkage assembly having a first top link, a connecting link, a first upper link having a first end pivotally coupled to the first top link and a second end pivotally coupled to the connecting link, and a second upper link having a first end pivotally coupled to the first top link and a second end pivotally coupled to the connecting link. The first four bar linkage assembly defining a first instant center located to a first side of the operator platform. The first top link pivoting about the first instant center to accommodate motion of the second portion of the frame relative to the operator platform and a second four bar linkage assembly connected to the first four bar linkage assembly. The second four bar linkage assembly having a second top link, the frame, a first lower link having a first end pivotally coupled to the frame and a second end pivotally coupled to the second top link, a second lower link having a first end pivotally coupled to the frame and a second end pivotally coupled to the second top link. The second four bar linkage assembly defining a second instant center located to a second side of the operator platform. The second top link pivoting about the first instant center to accommodate motion the first portion of the frame relative to the operator platform. The first portion of the frame is one of a front portion of the frame and a rear portion of the frame and the second portion of the frame is the other of the front and rear portion of the frame.

In one embodiment, the invention provides a utility vehicle including a frame having a front portion and a rear portion, a first ground-engaging element coupled to one of the front and rear portion of the frame for rotation about a first drive axis, a second ground-engaging element coupled to the other one of the front and rear portion of the frame for rotation about a second drive axis, an operator platform supported by the frame and located at least partially between the first drive axis and the second drive axis, the operator platform operable to support an operator relative to the frame, and a suspension system coupled between the operator platform and the frame to accommodate motion of the frame relative to the operator platform and motion of the operator platform relative to the frame. The suspension system including a first linkage assembly coupled to the operator platform and operable to accommodate motion of the frame relative to the operator platform in response to a pitching force on the second ground-engaging element. The first linkage assembly defines a first composite center of gravity. A second linkage assembly having a first end coupled to the frame to secure the suspension system to the frame and a second end coupled to the first linkage assembly, the second linkage assembly being operable independent from the first linkage assembly to accommodate motion of the frame relative to the operator platform in response to a pitching force on the first ground-engaging element, the second linkage assembly defining a second composite center of gravity. The first composite center of gravity and the second composite center of gravity are each positioned between the first and second drive axes so the first linkage assembly and the second linkage assembly pivot together to limit pivotal movement of the operator platform relative to the frame in response to a non-pitching force received by the operator platform.

In one embodiment, the invention provides a method of assembling a utility vehicle. The method includes providing a frame having a first ground-engaging element coupled to a front portion of the frame and a second ground-engaging element coupled to a rear portion of the frame. Providing a suspension system that is fully operational separate from the frame, the suspension system comprising a first linkage assembly and a second linkage assembly connected in series with the first linkage assembly, where the first linkage assembly, the second linkage assembly, or both includes a four-bar linkage. Providing an operator platform that is operable to support an operator. Affixing the suspension system to the frame and affixing the operator platform to the suspension system.

Other aspects of the invention will become apparent by consideration of the detailed description and accompanying drawings.

BRIEF DESCRIPTION OF THE DRAWINGS

FIG. 21A is a side view of a portion of the utility vehicle, where a lower linkage assembly of the suspension system is in a resting position.

FIG. 21B is a side view of the portion of the utility vehicle of FIG. 21A, where the lower linkage assembly is in a first collapsed position.

FIG. 22A is a cross-sectional side view of a portion of the utility vehicle of FIG. 21A, where the lower linkage assembly of the suspension system is in the resting position.

FIG. 22B is a cross-sectional side view of the portion of the utility vehicle of FIG. 21A, where the lower linkage assembly is in the first collapsed position.

FIG. 31 is a left side schematic view of the utility vehicle, illustrating a suspension system according to another embodiment.

FIG. 32 is a left side schematic view of the utility vehicle, illustrating a suspension system according to another embodiment.

FIG. 33 is a left side schematic view of the utility vehicle, illustrating a suspension system according to another embodiment.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. As used herein, terms relating to position (e.g., front, rear, left, right, etc.) are relative to an operator situated on a utility vehicle during normal operation of the utility vehicle.

Figure 1:
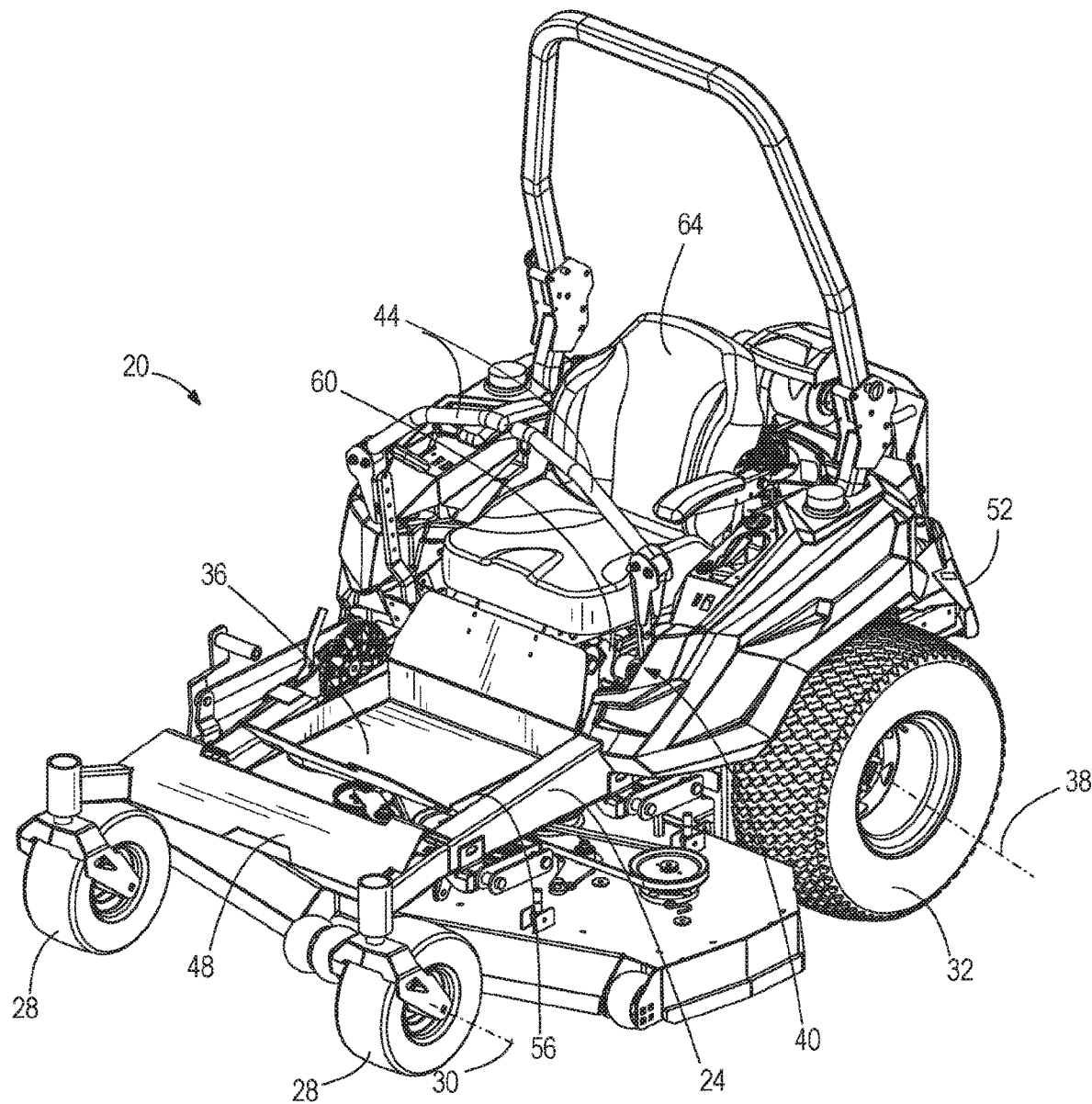
FIG. 1 is a top, front, left perspective view of a utility vehicle having a suspension system.
Figure 2:
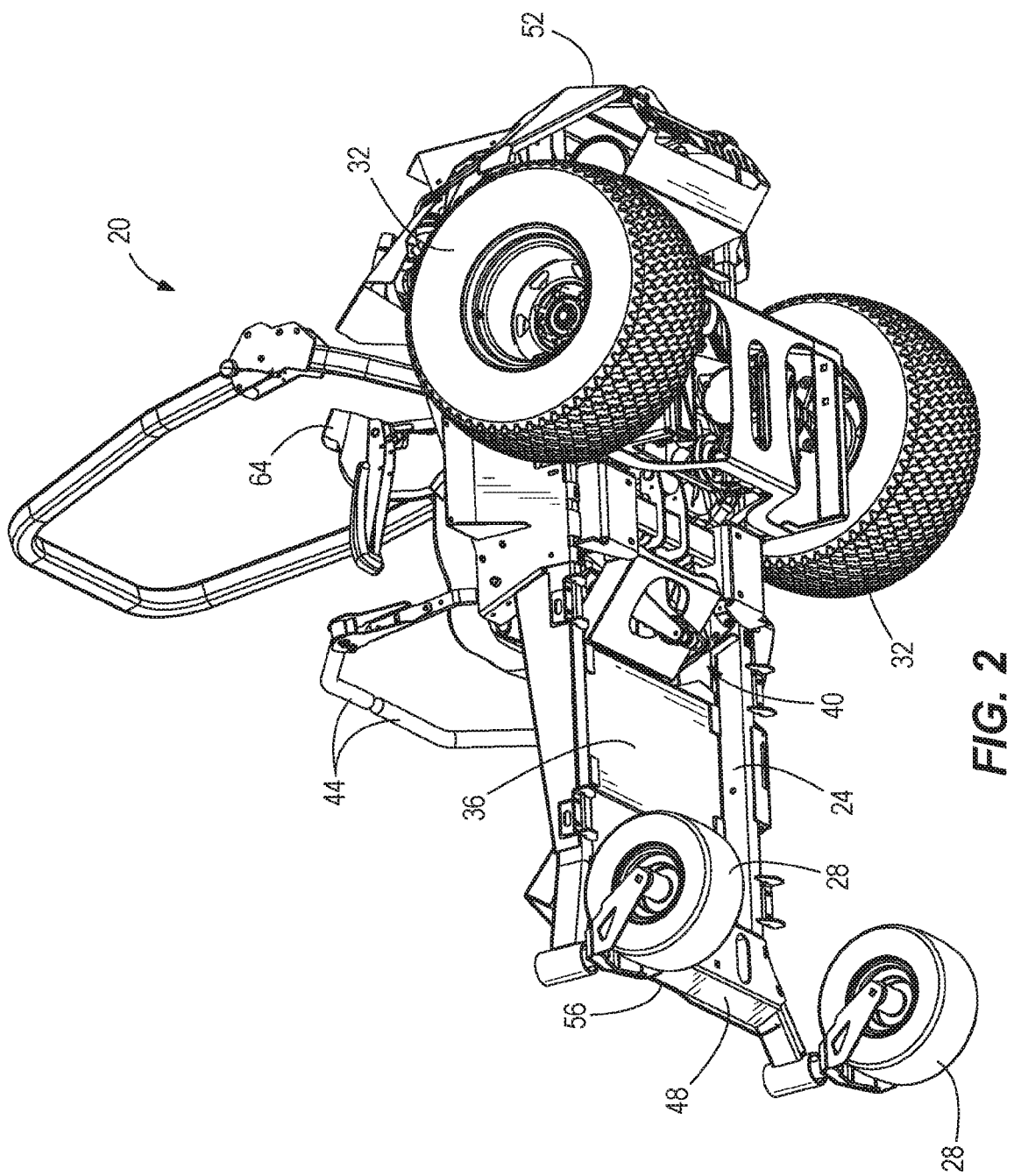
FIG. 2 is a bottom, front, left perspective view of the utility vehicle.

FIGS. 1 and 2 illustrate a utility vehicle 20. The utility vehicle 20 may be, for example, a lawn mower, a tractor, a UTV, a loader, and the like. The illustrated utility vehicle 20 includes a frame 24, a plurality of ground-engaging elements 28, 32 coupled to the frame 24, an operator platform 36 supported by the frame 24, and a suspension system 40 connecting the operator platform 36 to the frame 24. Although not shown, the utility vehicle 20 may also include a prime mover (e.g., an engine, a motor and battery, etc.) supported by the frame 24 and coupled to the ground-engaging elements 28, 32. The prime mover may also be operatively coupled to a work implement coupled to the frame 24. The work implement may include, for example, a cutting deck, a spreader, a yard vacuum, a plow, and the like, depending on the type of utility vehicle.

The illustrated utility vehicle 20 also includes operator controls 44. The operator controls 44 are coupled to the frame 24 adjacent the operator platform 36. The operator controls 44 are operable to control the utility vehicle 20. For example, the operator controls 44 can be used to control speed and direction of the ground-engaging elements 28, 32 through a drive mechanism (e.g., a transmission, an electric motor, etc.) to move and/or turn the utility vehicle 20. In the illustrated embodiment, the operator controls 44 include two handles used for a zero turn radius (ZTR) lawn mower. In other embodiments, the operator controls 44 may include other suitable actuators, such as a steering wheel, joystick(s), and the like. In some embodiments, the operator controls 44 may be coupled directly to the operator platform 36 so the operator controls 44 move with the operator platform 36 during operation of the utility vehicle 20. For example, the operator controls 44 may be drive by wire controls that are coupled to the operator platform 36 and communicate with an electronic controller that is mounted to the frame 24 or the drive mechanism of the utility vehicle 20. The electronic controller may be in communication with the drive mechanism (e.g., a transmission, an electric motor, etc) of the utility vehicle 20 to selectively provide power to the ground engaging elements 32 in response to movement of the operator controls 44. For example, the electronic controller may be able to determine the position of the operator controls 44 (e.g., using position sensors, a swashplate lever, etc.) and selectively provide power to the ground-engaging elements 32 through the drive mechanism of the utility vehicle 20. As a result, the operator controls 44 communicate with the drive mechanism of the utility vehicle 20 without the need of mechanical linkages extending between the operator platform 36 and the drive mechanism of the utility vehicle 20. In some embodiments, the drive by wire operator controls 44 may include cables extending from the steering position sensors on the platform 36 to the electronic controller mounted to the frame 24 or the drive mechanism. In other embodiments, a wireless position sensor may be in communication with the electronic controller to eliminate the need for cables extending between the operator platform 36 and the frame 24 or drive mechanism of the utility vehicle 20.

The frame 24 includes a first or front portion 48 and a second or rear portion 52 opposite the front portion 48. The frame 24 defines the overall body structure of the utility vehicle 20 and supports the other components of the utility vehicle 20. The prime mover may be supported on the rear portion 52 of the frame 24, behind the operator platform 36. In addition, in embodiments where the utility vehicle 20 is a lawn mower, a cutting deck may be supported underneath the frame 24 between the front and rear portions 48, 52.

The ground-engaging elements 28, 32 are movably (e.g., rotatably) coupled to the frame 24. The illustrated ground-engaging elements 28, 32 include two first ground-engaging elements 28 coupled to the front portion 48 of the frame 24, and two second ground-engaging elements 32 coupled to the rear portion 52 of the frame 24. The first ground-engaging element 28 rotates about a first drive axis 30 (FIG. 1) that extends centrally through the first ground-engaging element 28. The second ground-engaging element 32 rotate about a second drive axis 38 (FIG. 1) that extends centrally through the second ground-engaging element 32. In the illustrated embodiment, the ground-engaging elements 28, 32 are wheels. In other embodiments, the utility vehicle 20 may include other types of ground-engaging elements, such as track drives. The first ground-engaging elements 28 are idle wheels that are not driven by the prime mover, while the second ground-engaging elements 32 are driven wheels that are operatively coupled to the prime mover. In other embodiments, the first ground-engaging elements 28 may also or alternatively be driven wheels that are operatively coupled to the prime mover.

The operator platform 36 is supported by the frame 24 and located between the front portion 48 and the rear portion 52. The operator platform 36 is constructed to support an operator relative to the frame 24 and may be defined as the structure positioned within a footprint 46 (FIG. 3) of the operator. In other words, if a box was drawn around the operator, the footprint 46 of the operator would be positioned at any location on a plane 50 transverse to the operator that extends both above or below the operator platform 36. For example, the operator platform 36 of the illustrated utility vehicle 20 is defined as the structure that supports the operator's posterior when the operator is seated in the seat 64. In other embodiment, such as stand up utility vehicle, the operator platform may be defined as the structure the supports the operator's feet relative to the frame.

The illustrated operator platform 36 includes a first or lower section 56 and a second or upper section 60. The lower section 56 is located forward of the upper section 60 and configured to support a user's feet. The upper section 60 is located rearward of the lower section 56 and supports a seat 64. It should be appreciated that the operator platform 36 may include only the upper section 60, or include both the upper section and the lower section 56. In some embodiments, the lower section 60 may be formed separate from the upper section 60. In other embodiments, the lower section 56 may be pivotally coupled to the upper section 60 to allow access to the suspension system 40. The seat 64 allows a user to sit during operation of the utility vehicle 20 and access the operator controls 44. In some embodiments, the operator platform 36 may only include the lower section 56 such that the utility vehicle 20 is a standing vehicle. In other embodiments, the lower and upper sections 56, 60 may be separate parts. In such embodiments, the upper section 60 of the operator platform 36 may be connected to the suspension system 40 for movement relative to the frame 24. In further embodiments, the operator platform 36 may have other configurations.

Figure 3:
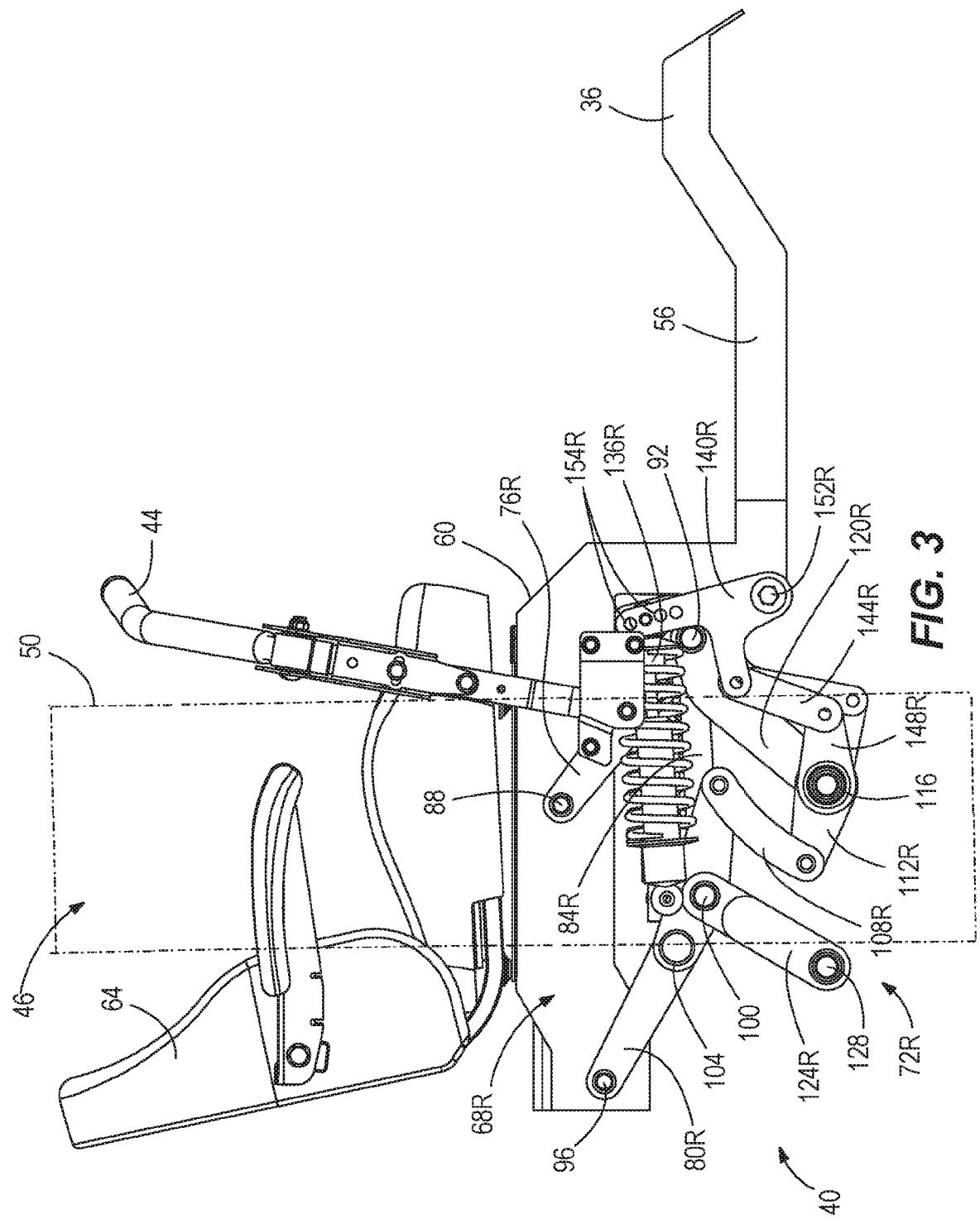
FIG. 3 is a right side view of a portion of the utility vehicle, illustrating a right side of the suspension system.
Figure 4:
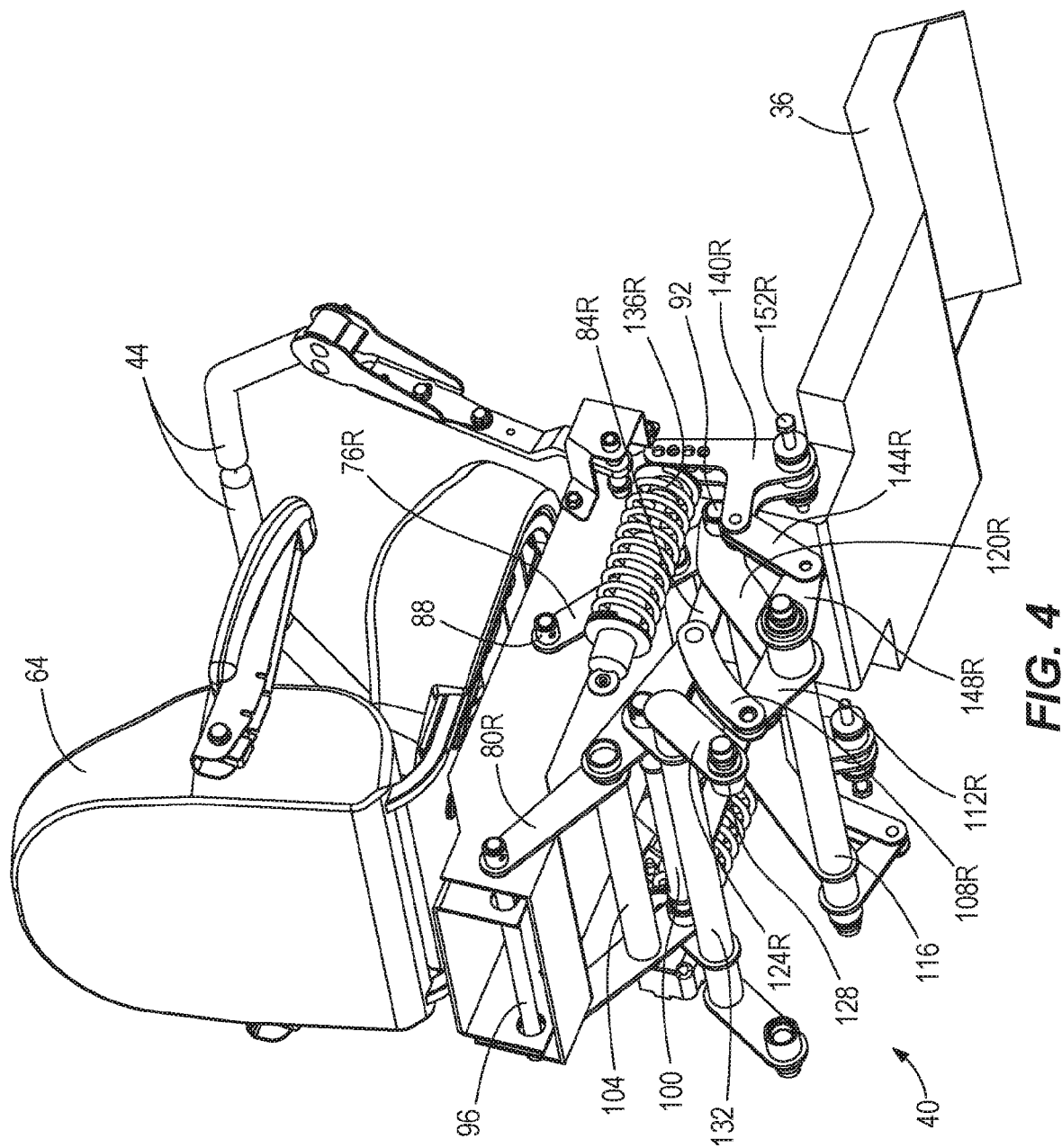
FIG. 4 is a bottom, rear, right side perspective view of the portion of the utility vehicle shown in FIG. 3.
Figure 5:
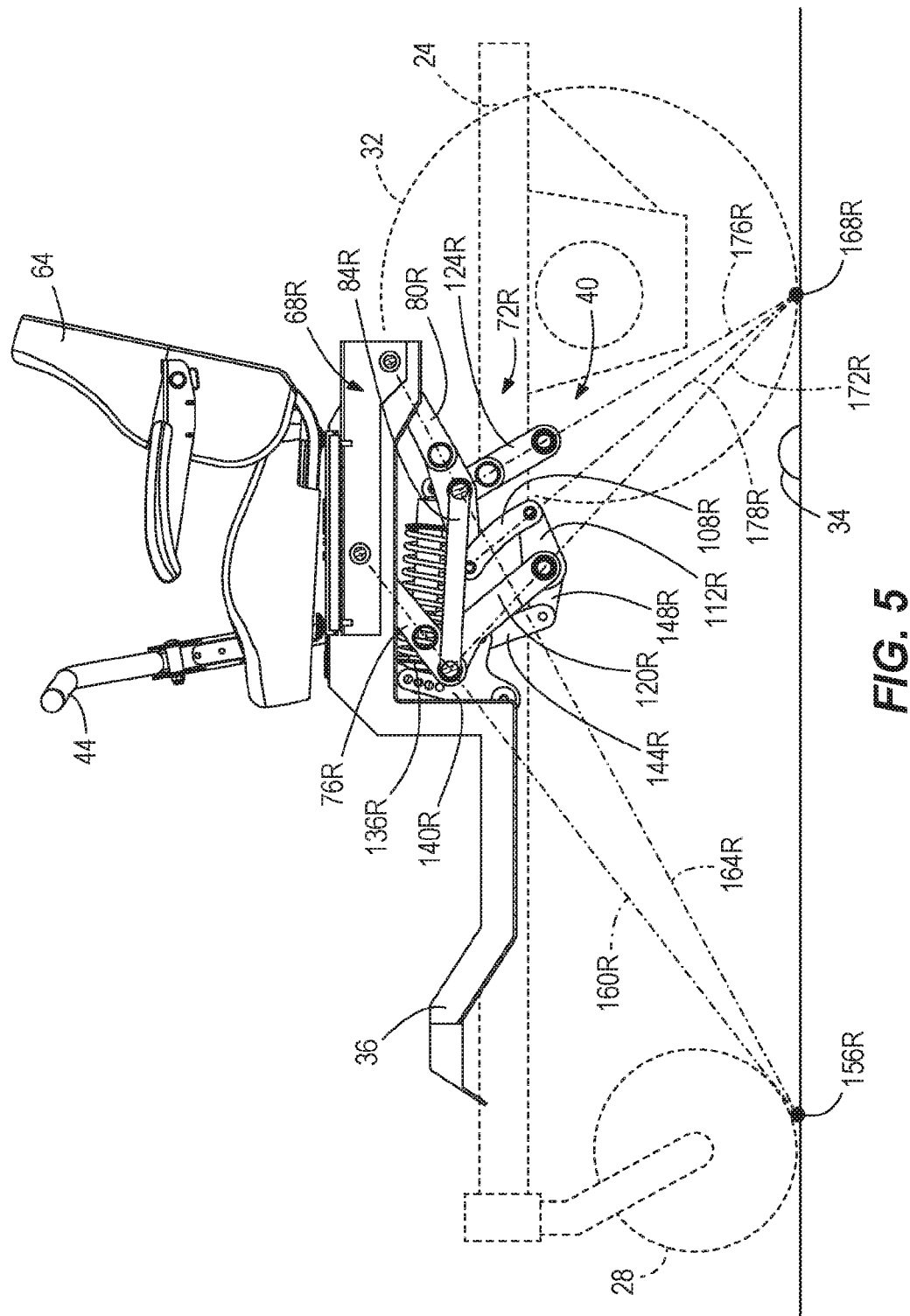
FIG. 5 is a cross-sectional view of the portion of the utility vehicle shown in FIG. 3, illustrating the right side of the suspension system.
Figure 6:
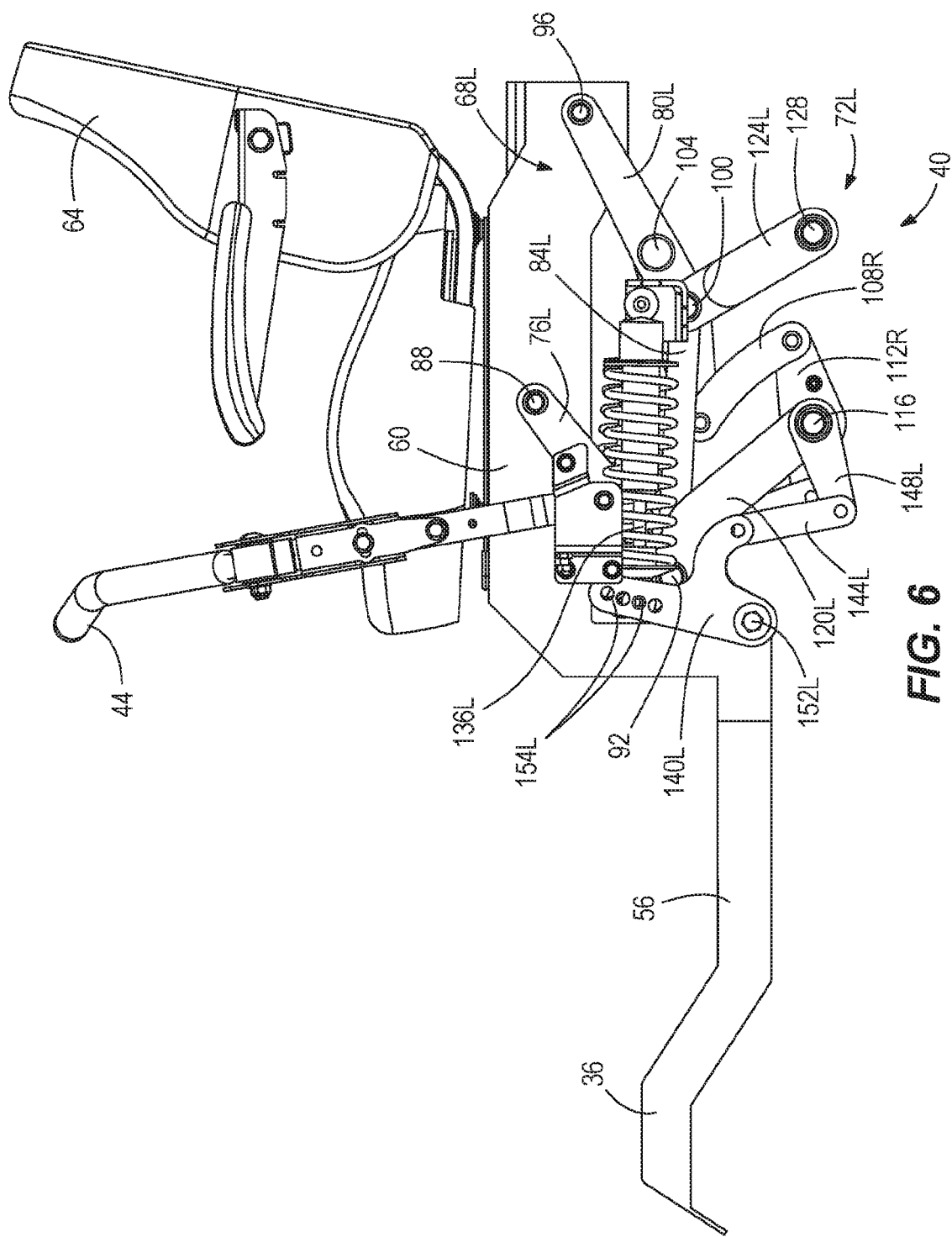
FIG. 6 is a left side view of a portion of the utility vehicle, illustrating a left side of the suspension system.
Figure 7:
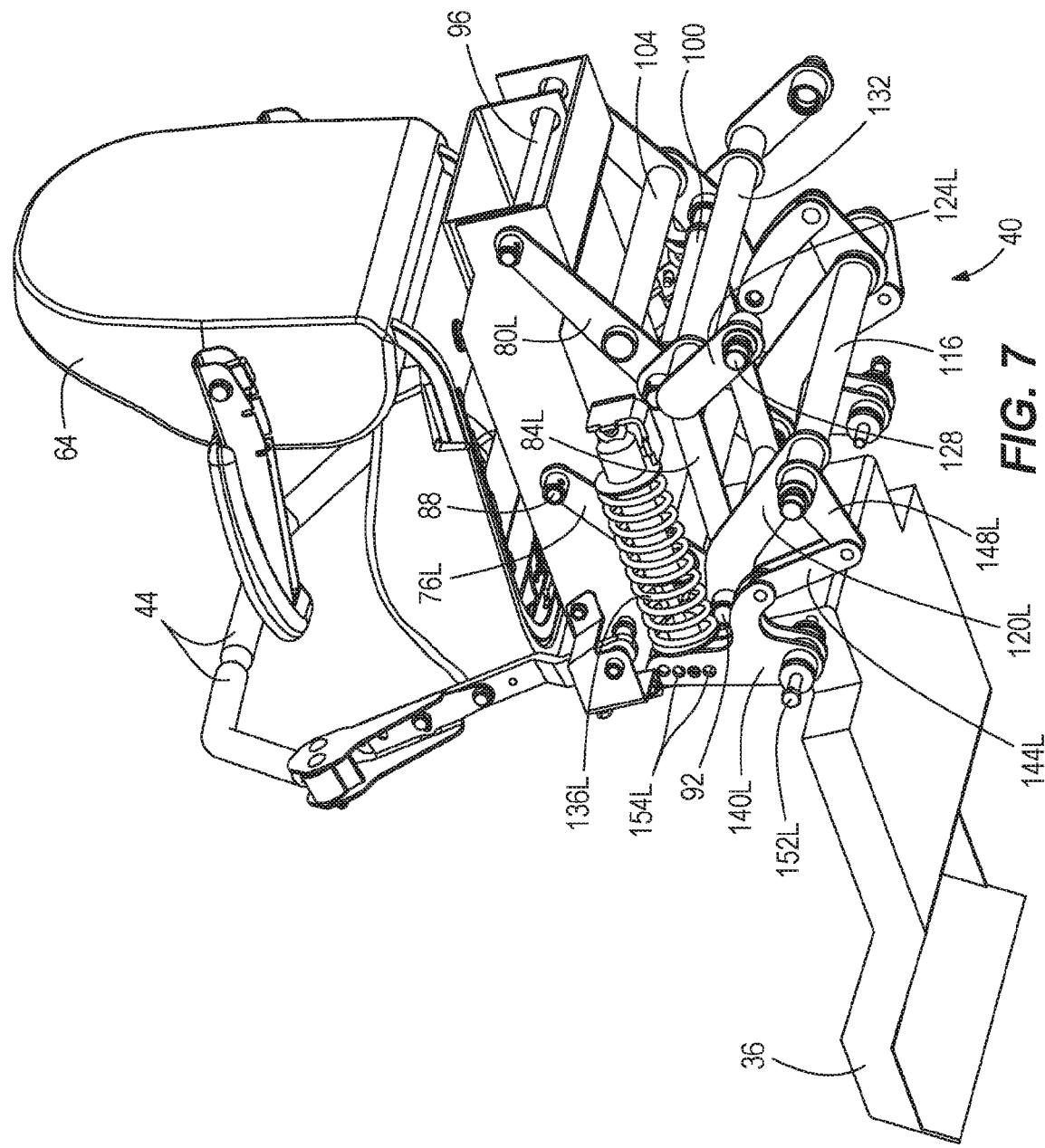
FIG. 7 is a bottom, rear, left side perspective view of the portion of the utility vehicle shown in FIG. 6.
Figure 8:
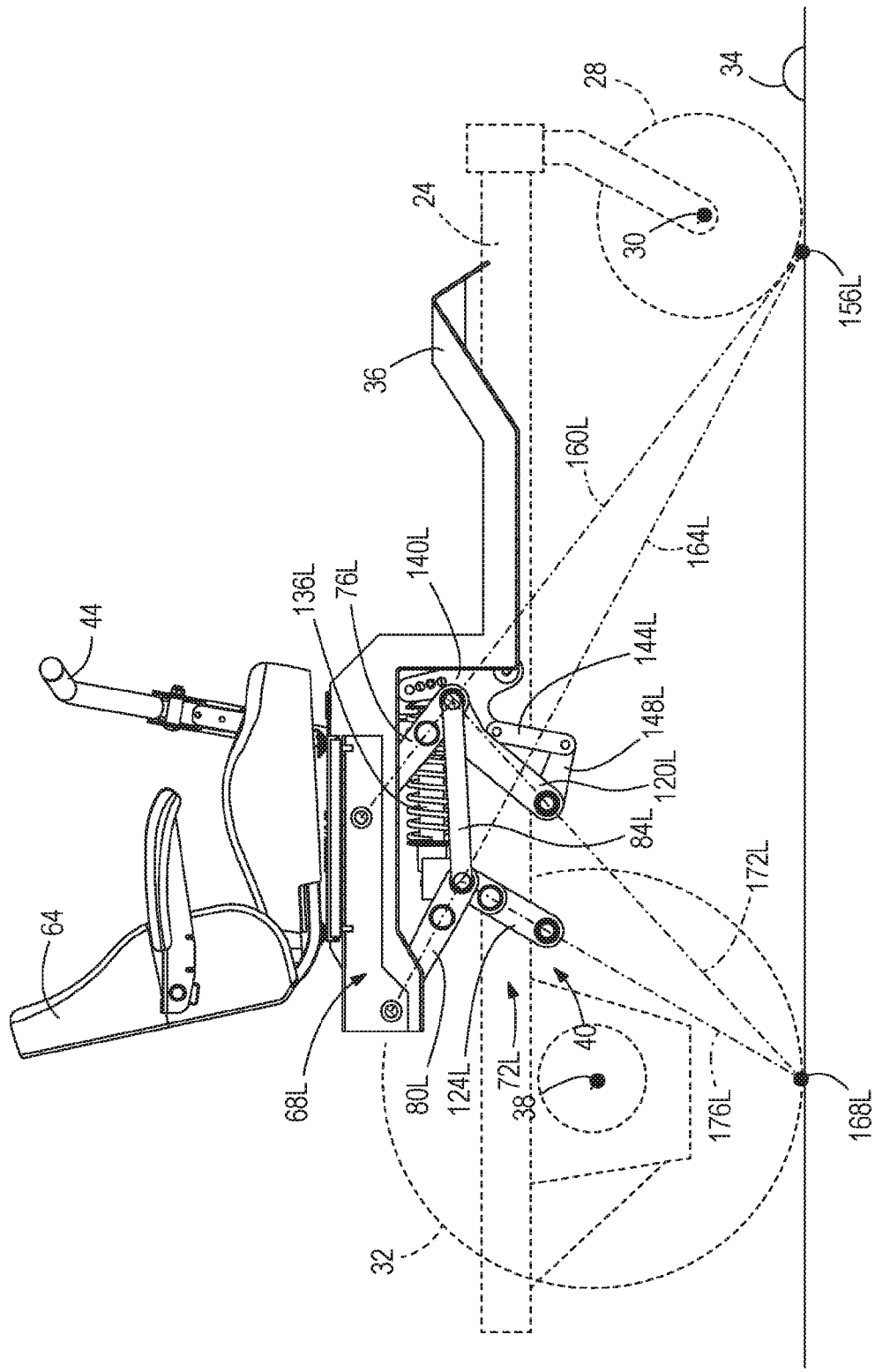
FIG. 8 is a cross-sectional view of the portion of the utility vehicle shown in FIG. 3, illustrating the left side of the suspension system.

The suspension system 40 supports the operator platform 36 on the frame 24. The suspension system 40 allows the operator platform 36 to move relative to the frame 24 when, for example, the utility vehicle 20 is traveling over uneven or bumpy terrain. The suspension system 40 generally maintains the operator platform 36 in a horizontal orientation relative to the ground. FIGS. 3-5 illustrate one side (e.g., the right side) of the suspension system 40, while FIGS. 6-8 illustrate the other side (e.g., the left side) of the suspension system 40. The two sides of the suspension system 40 are described separately below, but operate together to move the operator platform 36 relative to the frame 24. Elements of the right side of the suspension system 40 are designated with an "R" suffix, and elements of the left side of the suspension system 40 are designated with an "L" suffix.

As shown in FIGS. 3-8, the suspension system 40 includes a first linkage assembly 68 and a second linkage assembly 72. The first linkage assembly 68 consists of right and left sides 68R, 68L and the second linkage assembly 72 consists of right and left sides 72R, 72L. Although the drawings call out 68R, 68L, 72R, 72L depending on which side of the respective linkage assembly 68, 72 is illustrated, the written description will simply refer to the first assembly 68 and second assembly 72 when referring to the overall assemblies 68, 72 or either side of the assemblies 68, 72.

The first linkage assembly 68 is an upper linkage assembly coupled to the operator platform 36. The second linkage assembly 72 is a lower linkage assembly coupled to the frame 24. The first and second linkage assemblies 68, 72 are also coupled together (e.g., stacked on top of each other). In other words, the first and second linkage assemblies 68, 72 are connected in series. Each linkage assembly 68, 72 includes a plurality of links. In the illustrated embodiment, the plurality of links form four-bar linkages. In other embodiments, other suitable linkages may also or alternatively be employed. In should be appreciated that the use of the terms couple or affix, may include either direct coupling or coupling using intervening elements. For example, the first and second linkage assemblies 68, 72 may be directly coupled (e.g., share a common link) or be coupled together using an intervening element.

With continued reference to FIGS. 3-5, the first linkage assembly 68 on the right side includes a first upper link 76R, a second upper link 80R, and a connecting link 84R. The platform 36 may also be considered a link of the first linkage assembly 68R, creating a four-bar linkage. The first upper link 76R has a first end coupled to the operator platform 36 by a first shaft 88, and a second end coupled to the connecting link 84R by a second shaft 92. The second upper link 80R has a first end coupled to the operator platform 36 by a third shaft 96, and a mid section coupled to the connecting link 84R by a fourth shaft 100. The connecting link 84R has a first end coupled to the second end of the first upper link 76R by the second shaft 92, and a second end coupled to the mid section of the second upper link 80R by the fourth shaft 100. In the illustrated embodiment, the second upper link 80R is divided into two link segments connected together by a second upper link shaft 104. In other embodiments, the second upper link 80R may be a single piece.

The illustrated second upper link 80R is also coupled to the frame 24 through one or more intermediate links. In the illustrated embodiment, the second upper link 80R has a second end coupled to a first end of a first intermediate link 108R. The first intermediate link 108R has a second end coupled to a first end of a second intermediate link 112R. The second intermediate link 112R has a second end coupled to the frame 24 by a fifth shaft 116. The intermediate links 108R, 112R help transfer energy (e.g., that is created by the vertical forces acting on the ground engaging elements 32) from the first linkage assembly 68 directly to the frame 24 through movement of the links 108R, 112R without causing significant movement of the second linkage assembly 72R.

The second linkage assembly 72 on the right side includes a first lower link 120R, a second lower link 124R, and the connecting link 84R. The frame 24 may also be considered a link of the second linkage assembly 72R, creating a four-bar linkage. The first lower link 120R has a first end coupled to the frame 24 by the fifth shaft 116, and a second end coupled to the first end of the connecting link 84R by the second shaft 92. The second lower link 124R has a first end coupled to the frame 24 by a sixth shaft 128, and a second end coupled to the second end of the connecting link 84R by the fourth shaft 100. In the illustrated embodiment, the second lower link 124R is divided into two link segments connected together by a second lower link shaft 132. In other embodiments, the second lower link 124R may be a single piece.

The right side of the suspension system 40 also includes a right biasing member 136R. The illustrated biasing member 136R includes a spring damper assembly (e.g., a coil spring positioned over a shock). In other embodiments, the suspension system 40 may include other suitable types of biasing members, such as an elastomeric member, a pneumatic spring, a coil spring, a wave spring, a torsion spring, and the like. In further embodiments, the biasing member 136R may include a separate spring and damper and/or may be located elsewhere relative to the suspension system 40 and the frame 24. The right biasing member 136R is configured to urge the first (upper) linkage assembly 68 towards an extended position and maintain the first linkage assembly 68 in a resting position (e.g., when the operator is seated). The right biasing member 136R is also configured to resist motion of the first linkage assembly 68R. The right biasing member 136R further returns the first linkage assembly 68 to the resting position after the first linkage assembly 68 is actuated.

The right biasing member 136R has a first end coupled to a series of spring links, and a second end coupled to the frame 24. The illustrated series of spring links includes a first spring link 140R coupled to the right biasing member 136R, a second spring link 144R coupled to the first spring link 140R, and a third spring link 148R coupled to the second spring link 144R and the fifth shaft 116. The third spring link 148R is fixed relative to the second intermediate link 112R to move with the second intermediate link 112R. For example, movement of the first intermediate link 108R (e.g., when the ground-engaging elements 28 contact uneven terrain) may cause the second intermediate link 112R and the third spring link 148 to rotate about the fifth shaft 116. The first spring link 140R is also rotatably coupled to the frame 24 by a pin 152R. The first spring link 140R includes a series of mounting holes 154R (FIG. 3). The mounting holes 154R allow the biasing member 136R to be coupled to the first spring link 140R at different locations to adjust for operator weight. Specifically, coupling the first end of the biasing member 136R to a different mounting hole 154R adjusts a mechanical advantage of the first linkage assembly 68R relative to the biasing member 136R. In other embodiments, the preload of the biasing member 136R may be adjusted using other mechanisms, such as, for example, adjustment mechanisms (e.g., nuts) on the biasing member 136R itself and/or an actuator (e.g., lever) that is operable by a user.

With reference to FIGS. 6-8, the first linkage assembly 68 on the left side includes a first upper link 76L, a second upper link 80L, and a connecting link 84L. The platform 36 may also be considered a link of the first linkage assembly 68, creating a four-bar linkage The first upper link 76L has a first end coupled to the operator platform 36 by the first shaft 88, and a second end coupled to the connecting link 84L by the second shaft 92. The second upper link 80L has a first end coupled to the operator platform 36 by the third shaft 96, and a second end coupled to the connecting link 84L by the fourth shaft 100. The connecting link 84L has a first end coupled to the second end of the first upper link 76L by the second shaft 92, and a second end coupled to the second end of the second upper link 80L by the fourth shaft 100.

The second linkage assembly 72 on the left side includes a first lower link 120L, a second lower link 124L, and the connecting link 84L. The frame 24 may also be considered a link of the second linkage assembly 72, creating a four-bar linkage. The first lower link 120L has a first end coupled to the frame 24 by the fifth shaft 116, and a second end coupled to the connecting link 84L by the second shaft 92. The second lower link 124L has a first end coupled to the frame 24 by the sixth shaft 128, and a second end coupled to the connecting link 84R by the fourth shaft 100. In the illustrated embodiment, the sixth shaft 128 is separated into two shaft segments, but may alternatively be a single shaft. The connecting link 84L has a first end coupled to the second end of the first lower link 120L by the second shaft 92, and a second end coupled to the second end of the second lower link 124L by the fourth shaft 100. In the illustrated embodiment, the second lower link 124L is divided into two link segments connected together by the second lower link shaft 132. In other embodiments, the second lower link 124L may be a single piece. In the illustrated embodiment, each of the shafts 88, 82, 96, 100, 116, 128 includes a bronze or plastic journal bearing that promotes movement of the shafts 88, 82, 96, 100, 116, 128 and increases the strength of the pivot joints of the suspension system 40.

The left side of the suspension system 40 also includes a left biasing member 136L. The illustrated biasing member 136L includes a spring damper assembly (e.g., a coil spring positioned over a shock). In other embodiments, the suspension system 40 may include other suitable types of biasing members, such as an elastomeric member, a pneumatic spring, a coil spring, a wave spring, a torsion spring, and the like. In further embodiments, the shock of the biasing member 136L may be a standard shock, a progressive shock, an active system, a ferrofluid shock, and the like and the biasing member 136L may include a separate spring and damper and/or may be located elsewhere relative to the suspension system 40 and the frame 24. The left biasing member 136L is configured to maintain the second (lower) linkage assembly 72 in a resting position. The left biasing member 136L is also configured to resist motion of the second linkage assembly 72. The left biasing member 136L further returns the second linkage assembly 72 to the resting position after the second linkage assembly 72 is actuated.

The left biasing member 136L has a first end coupled to a series of spring links, and a second end coupled to the frame 24. The illustrated series of spring links includes a first spring link 140L coupled to the left biasing member 136L, a second spring link 144L coupled to the first spring link 140L, and a third spring link 148L coupled to the second spring link 144L and the fifth shaft 116. The third spring link 148L is fixed relative to the first lower link 120L to move with the first lower link 120L. The first spring link 140L is also rotatably coupled to the frame 24 by a pin 152L. The first spring link 140L also includes a series of mounting holes 154L. The mounting holes 154L allow the biasing member 136L to be coupled to the first spring link 140L at different locations to adjust for operator weight. Specifically, coupling the first end of the biasing member 136L to a different mounting hole 154L adjusts a mechanical advantage of the second linkage assembly 72 relative to the biasing member 136L. In other embodiments, the preload of the biasing member 136L may be adjusted using other mechanisms, such as, for example, adjustment mechanisms (e.g., nuts) on the biasing member 136L itself and/or an actuator (e.g., lever) that is operable by a user.

In operation, the first linkage assembly 68 (on both the right and left sides) accommodates motion of the rear portion 52 of the frame 24 relative to the operator platform 36, and the second linkage assemblies 72 (on both the right and left sides) accommodate motion of the front portion 48 of the frame 24 relative to the operator platform 36. The first and second linkage assemblies 68, 72 are operable independent from each other to accommodate motion of the frame 24 (e.g., during travel over uneven terrain 34 (FIGS. 5 and 8)). Since the first and second linkage assembly 68, 72 are operable independent of each other, only one or both of the first and second linkage assembly 68, 72 may pivot to accommodate motion of the frame 24 (e.g., vertical motion). In other embodiments, the relative positions of the first and second linkage assemblies 68, 72 may be reversed (i.e., the first linkage assembly 68 may be the lower linkage assembly, and the second linkage assembly 72 may be the upper linkage assembly).

As shown in FIGS. 5 and 8, the first linkage assembly 68 (on both the right and left side) defines an instant center 156R, 156L that is forward of the operator platform 36. The instant centers 156R, 156L are virtual pivot points about which the top link of the first linkage assembly 68 pivots relative to (at that instantaneous position). For example, in the illustrated embodiment, the operator platform 36 pivots about the instant centers 156R, 156L. The instant centers 156R, 156L are defined at intersections of a central longitudinal axis 160R, 160L of each first upper link 76R, 76L, and a central longitudinal axis 164R, 164L of each second upper link 80R, 80L. The use of pivoting about the instant center 158R, 158L, in this regard means, that the top link of the first linkage assembly 68 moves or pivots as if the first upper link 76R, 76L and the second upper link 80R, 80L physically extend to and are hinged at the instant center 158R, 158L. In the illustrated embodiment, the instant centers 156R, 156L are located near the first ground-engaging elements 28. As used herein, "near" means the instant centers 156R, 156L are closer to the first ground-engaging elements 28 than to the second ground-engaging elements 32. In some embodiments, the instant centers 156R, 156L are located on the first ground-engaging element 28 or within a footprint of the first ground-engaging element 28.

In the illustrated embodiment, the first linkage assembly 68 is a non-parallelogram linkage, which ensures the location of the instant centers 156R, 156L are near the first ground-engaging elements 28. For example, the first upper link 76L, 76R and the second upper link 80L, 80R of the first linkage assembly 68 are pivotally couple to the operator platform 36 so a pivot point of the first end of the first upper link 76L, 76R (e.g., the first shaft 88) is offset from a pivot point of the first end of the second upper link 80L, 80R (e.g., the second shaft 92) by a vertical distance. Since the pivot points are offset by the vertical distance, the central longitudinal axis 160R, 160L of each first upper link 76R, 76L and the central longitudinal axis 164R, 164L of each second upper link 80R, 80L intersect near the first ground-engaging element 28.

For example, when the utility vehicle 20 is in a resting position, the instant centers 156R, 156L are positioned within the circumference of the first ground-engaging elements 28. During travel over uneven terrain 34, a pitching force received by the frame 24 (e.g., a vertical or longitudinal force on the ground-engaging element 32) causes the operator platform 36 (e.g., the top link of the first linkage assembly 68) to pivot about the instant centers 156R, 156L so the first linkage assembly 68 accommodates substantially all of the vertical movement of the frame 24. In other words, the first linkage assembly 68 offsets the vertical movement of the frame 24 in response to the pitching force so the operator platform 36 and the seat 64 are maintained in a generally horizontal position relative to the ground (e.g., remains parallel to the ground). When the operator platform 36 is maintained in a generally horizontal position relative to the ground, that means the operator platform 36 remains in substantially the same orientation after contacting uneven terrain 34 as the operator platform 36 was orientated prior to contacting the uneven terrain 34. In other words, minimal pivotal movement of the operator platform 36 is felt by the operator seated on operator platform 36 during travel over the uneven terrain 34. For example, when the second ground-engaging elements 32 travel over the uneven terrain 34, the rear portion 52 of the frame 24 may first move upwards and then downwards. When this occurs, the operator platform 36 pivots (at that instantaneous position) about the instant centers 156R, 156L and the first linkage assembly 68 articulates so the operator platform 36 and the seat 64 are maintained in the generally horizontal position relative to the ground. In other words, the first and second upper links 76L, 78L pitch towards the second ground-engaging elements 32 while the operator platform pivots about the instant center 156R, 156L.

With continued reference to FIGS. 5 and 8, the second linkage assembly 72 (on both the right and left side) defines an instant center 168R, 168L that is rearward of the operator platform 36. The instant centers 168R, 168L are virtual pivot points about which the top link of the second linkage assembly 72 rotate (at that instantaneous position). For example, in the illustrated embodiment, the connecting link 84L, 84R pivots about the instant centers 168R, 168L. The instant centers 168R, 168L are defined at intersections of a central longitudinal axis 172R, 172L of each first lower link 120R, 120L, and a central longitudinal axis 176R, 176L of each second lower link 124R, 124L. The first intermediate link 108R also defines a central longitudinal axis 178R that generally intersects the instant center 168R. The use of pivoting about the instant center 168R, 168L, in this regard means, that the top link of the second linkage assembly 72 moves or pivots as if the first lower link 120L, 120R and the second lower link 124L, 124R physically extend to and are hinged at the instant center 168R, 168L. In the illustrated embodiment, the instant centers 168R, 168L are located near the second ground-engaging elements 32 (FIG. 1). As used herein, "near" means the instant centers 168R, 168L are closer to the second ground-engaging elements 32 than to the first ground-engaging elements 28. In some embodiments, the instant centers 168R, 168L are located on the second ground-engaging element 32 or within a footprint of the second ground-engaging element 32.

For example, the instant centers 168R, 168L are positioned within the circumference of the second ground-engaging elements 32. In the illustrated embodiment, the instant centers 168R, 168L are positioned where the second ground engaging elements 32 contact the ground. During travel over uneven terrain 34, a pitching force received by the frame 24 (e.g., a vertical or longitudinal force on the ground-engaging element 28) causes the connecting link 84L, 84R to pivot about the instant centers 168R, 168L and the second linkage assembly 72 articulates so the operator platform 36 and the seat 64 are maintained in the generally horizontal position. For example, when the first ground-engaging elements 28 travel over the uneven terrain, the front portion 48 of the frame 24 (FIG. 1) may first move upwards and then downwards. When this occurs, the connecting link 84L, 84R pivots (at that instantaneous position) about the instant centers 168R, 168L and the second linkage assembly 72 articulates so the operator platform 36 and the seat 64 are maintained in the generally horizontal position relative to the ground.

In the illustrated embodiment, the second linkage assembly 72 is a non-parallelogram linkage, which ensures the location of the instant centers 156R, 156L are near the second ground-engaging element 32. For example, the first lower link 120L, 120R and the second lower link 124L, 124R of the second linkage assembly 72 are pivotally couple to the connecting link 84 so a pivot point of the first end of the first upper link 76L, 76R is offset from a pivot point of the first end of the second upper link 80L, 80R by a vertical distance. Since the pivot points are offset by the vertical distance the 172R, 172L of each first lower link 120R, 120L and the central longitudinal axis 176R, 176L of each second lower link 120R, 120L intersect near the second ground-engaging element 32.

While movement of the first and second linkage assemblies 68, 72 are described individually above, it should be appreciated that the both the first and second linkage 68, 72 can pivot or articulate simultaneously. For example, in one non-limiting event, both first and second ground-engaging elements may receive a pitching force, which would cause the top link of the first linkage assembly 68 to pivot about the instant centers 156R, 156L and the second linkage assembly 72 to pivot about the instant center 168R, 168L. As a result, the movement of both the first and second linkage assemblies 68, 72 accommodates substantially all of the vertical movement of the frame 24 so the operator platform 36 and the seat 64 are maintained in the generally horizontal position relative to the ground (e.g., remains parallel to the ground).

Figure 9:
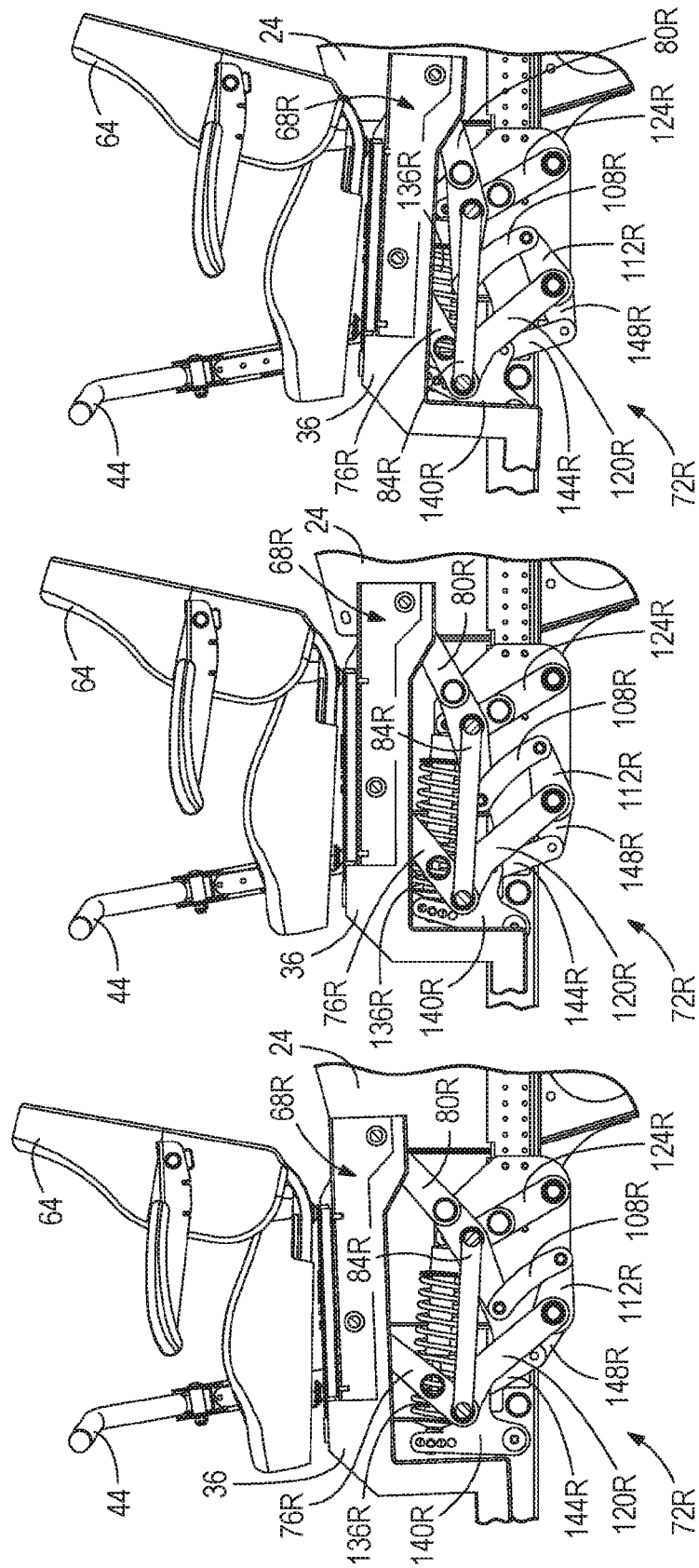
FIG. 9A is a side view of a portion of the utility vehicle, where an upper linkage assembly of the suspension system is in an extended position.
FIG. 9B is a side view of the portion of the utility vehicle of FIG. 9A, where the upper linkage assembly is in a resting position.
FIG. 9C is a side view of the portion of the utility vehicle of FIG. 9A, where the upper linkage assembly is in a compressed position.

FIGS. 9A-9C illustrate movement, or articulation, of the first (upper) linkage assembly 68 (specifically, the right first linkage assembly 68R) as the second (rear) ground-engaging elements 32 travel over uneven terrain. FIG. 9A illustrates the first linkage assembly 68 in an extended position (e.g., when the rear portion 52 of the frame 24 moves downward). FIG. 9B illustrates the first linkage assembly 68 in a neutral or resting position (e.g., when the frame 24 is generally parallel to the ground). The resting position is also, for example, a static equilibrium position while an operator is seated in the seat 64. FIG. 9C illustrates the first linkage assembly 68 in a collapsed position (e.g., when the rear portion 52 of the frame 24 moves upward).

Figure 10:
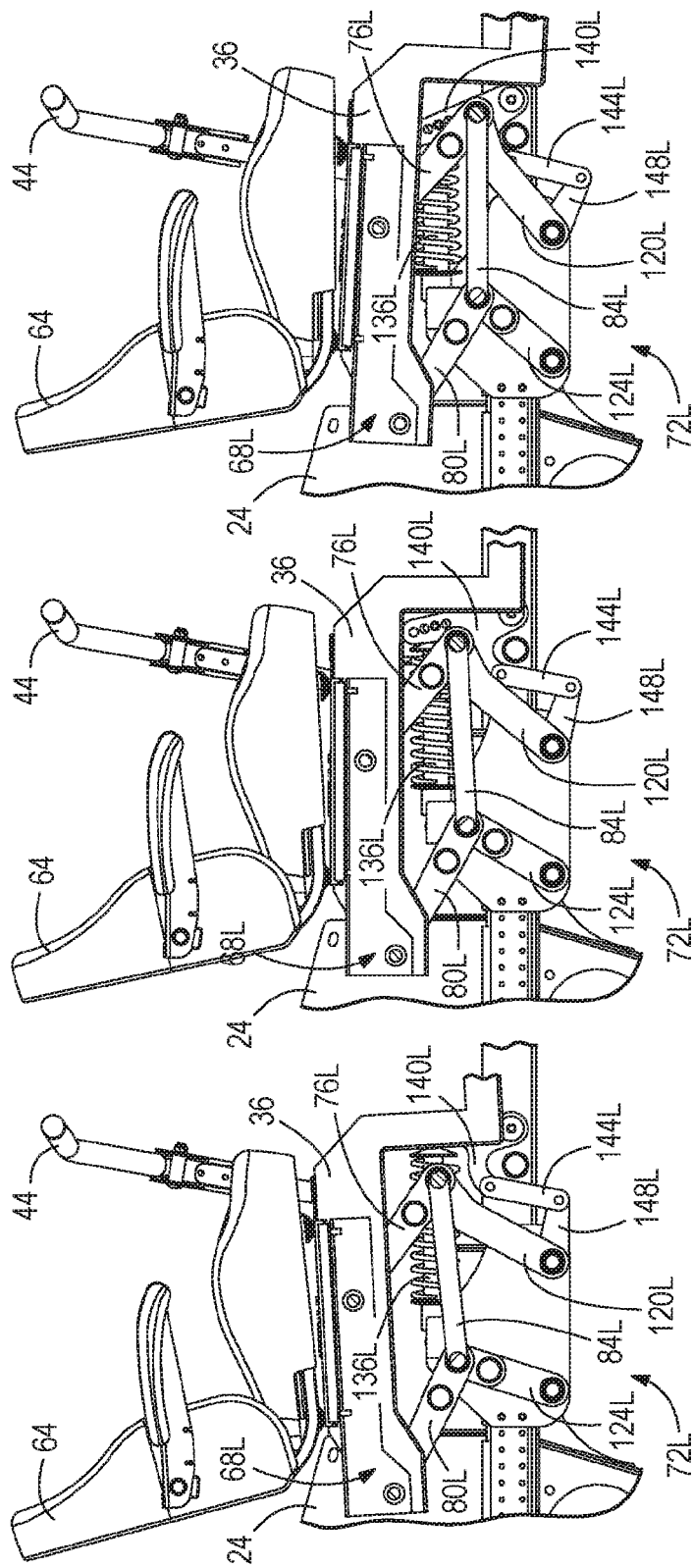
FIG. 10A is a side view of a portion of the utility vehicle, where a lower linkage assembly of the suspension system is in an extended position.
FIG. 10B is a side view of the portion of the utility vehicle of FIG. 10A, where the lower linkage assembly is in a resting position.
FIG. 10C is a side view of the portion of the utility vehicle of FIG. 10A, where the lower linkage assembly is in a compressed position.

FIGS. 10A-10C illustrate movement, or articulation, of the second (lower) linkage assembly 72 (specifically, the left lower linkage assembly 72L) as the first (front) ground-engaging elements 28 travel over uneven terrain. FIG. 10A illustrates the second linkage assembly 72 in an extended position (e.g., when the front portion 48 of the frame 24 moves downward). FIG. 10B illustrates the second linkage assembly 72 in a neutral or resting position (e.g., when the rear portion 52 of the frame 24 is on level ground relative to the front portion 48). FIG. 10C illustrates the second linkage assembly 72 in a collapsed position (e.g., when the rear portion 52 of the frame 24 moves upward).

Although the first and second linkage assemblies 68R, 68L, 72R, 72L are described as moving independently of each, it should be understood that the first and second linkage assemblies 68, 72 are capable of moving together as the utility vehicle 20 travels over uneven terrain.

Figure 11:
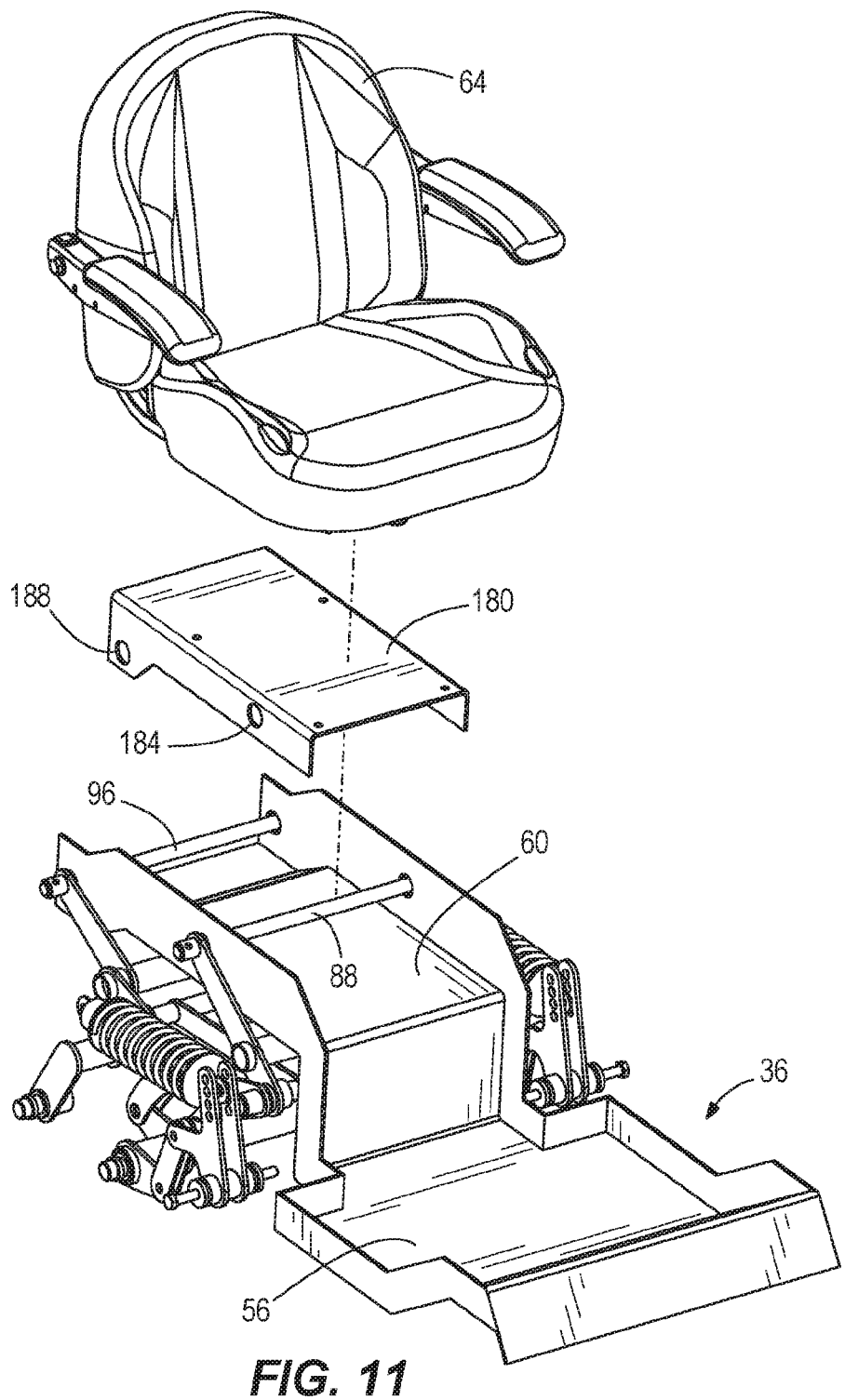
FIG. 11 is an exploded perspective view of a portion of the utility vehicle.
Figure 12:
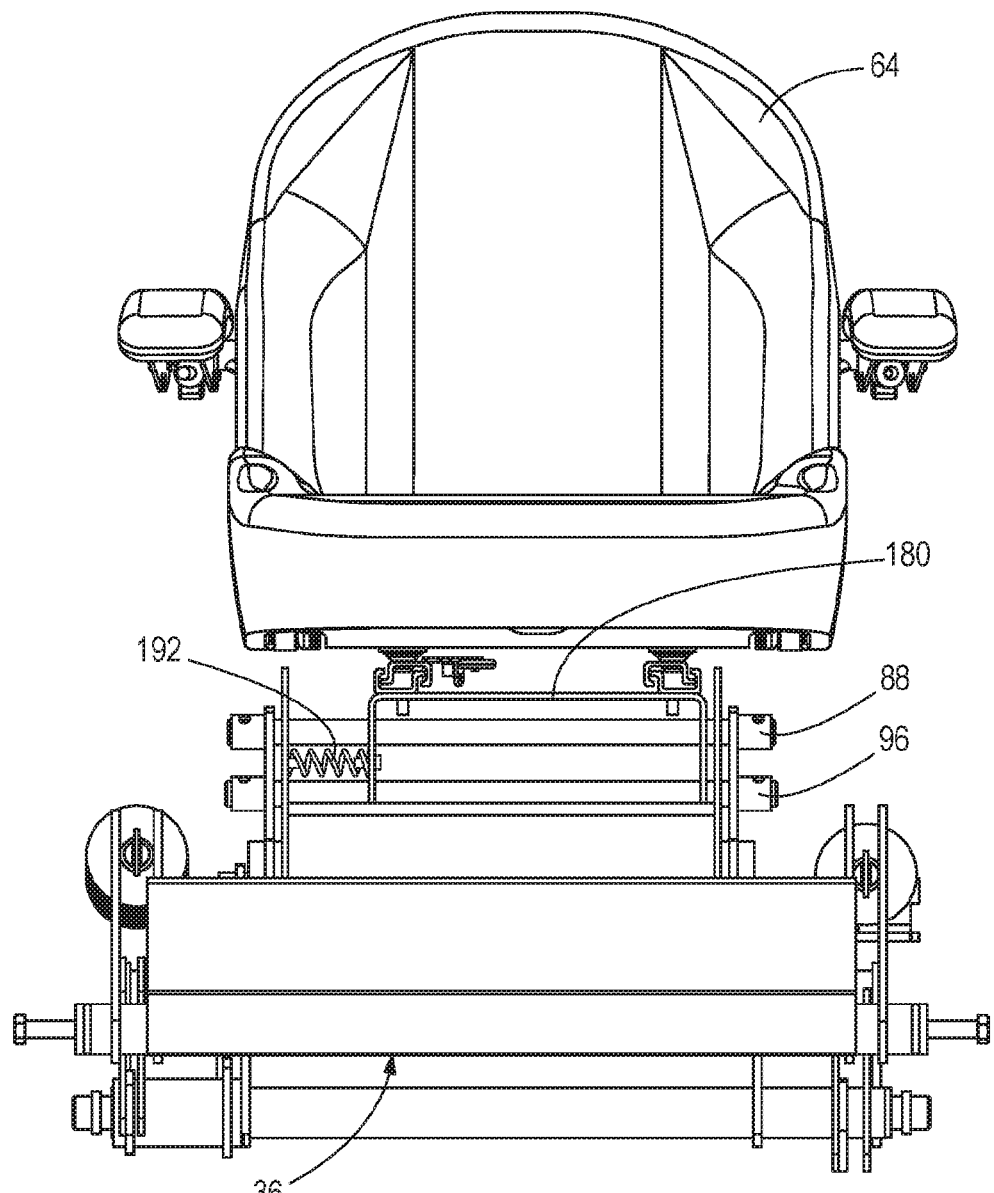
FIG. 12 is a front view of the portion of the utility vehicle of FIG. 11.

As shown in FIGS. 11 and 12, the seat 64 is coupled to the operator platform 36 by a seat pan 180. The illustrated seat pan 180 includes a first set of apertures 184 that receive the first shaft 88 and a second set of apertures 188 that receive the third shaft 96. The apertures 184, 188 allow the seat pan 180 to move (e.g., slide) side-to-side relative to the operator platform 36 along the first and third shafts 88, 96. Such an arrangement allows the seat 64 to shift side-to-side (i.e., in a direction perpendicular to a direction of travel of the utility vehicle 20) as the utility vehicle 20 travels over uneven terrain. Although the illustrated seat 64 moves along the same shafts 88, 96 used to connect the suspension system 40 to the operator platform 36, in other embodiments, the seat 64 may be coupled to and movable along different shafts or supporting elements.

In some embodiments, one or more biasing members 192 (FIG. 12) may be positioned between the seat pan 180 and the operator platform 36. The biasing member(s) 192 may include, for example, coil springs, elastomeric elements, pneumatic dampers, and the like. The biasing member(s) can help control movement of the seat 64 relative to the operator platform 36 by dampening velocity and acceleration of the seat 64 as the seat 64 moves side-to-side. In other words, the seat pan 180 and the biasing members 192 define a lateral suspension system that is coupled between the operator platform 36 and the seat 64 to absorb energy transferred to the seat 64 in response to a roll force. A roll force is defined as any force applied to the utility vehicle 20 that causes the frame 24 to pivot (e.g., rotate about a longitudinal axis) and create a lateral force on the seat 64. As a result, the lateral suspension system reduces the amount of energy that is transmitted to the operator seated on the operator platform 36.

FIGS. 13-22C illustrate a suspension system 240 for a utility vehicle according to an alternative embodiment. The suspension system 240 is similar to the suspension system 40 described above with reference to FIGS. 1-12, and the following description focuses primarily on differences between the suspension system 240 and the suspension system 40. In addition, common features and elements of the suspension system 240 corresponding with features and elements of the suspension system 40 are given common reference numbers plus 200. The suspension system 240 is attached to a frame 224 of the utility vehicle and generally maintains an operator platform 236 in a horizontal orientation relative to the ground. The main differences of the suspension system 240 are related to the positioning and connection of biasing members 408R, 408L and resistance assemblies 400, 404 (FIG. 15) within the suspension system 240. For example, the biasing members 408R, 408L are constructed to urge the suspension system 240 towards an extended position and absorb energy transferred to the suspension system 240 (e.g., when the ground-engaging elements 28, 32 contact uneven terrain) during operation of the utility vehicle. At the same time, the resistance assemblies 400, 404 are constructed to limit the range of motion of the operator platform 236 and absorb energy transferred to the suspension system 240 or cause a dwell near an end of motion of the suspension system 240. As a result, excessive movement of the operator platform 236 is limited during normal operation of the utility vehicle such as abrupt stops of the vehicle, encounters with large bumps, etc.

Figure 13:
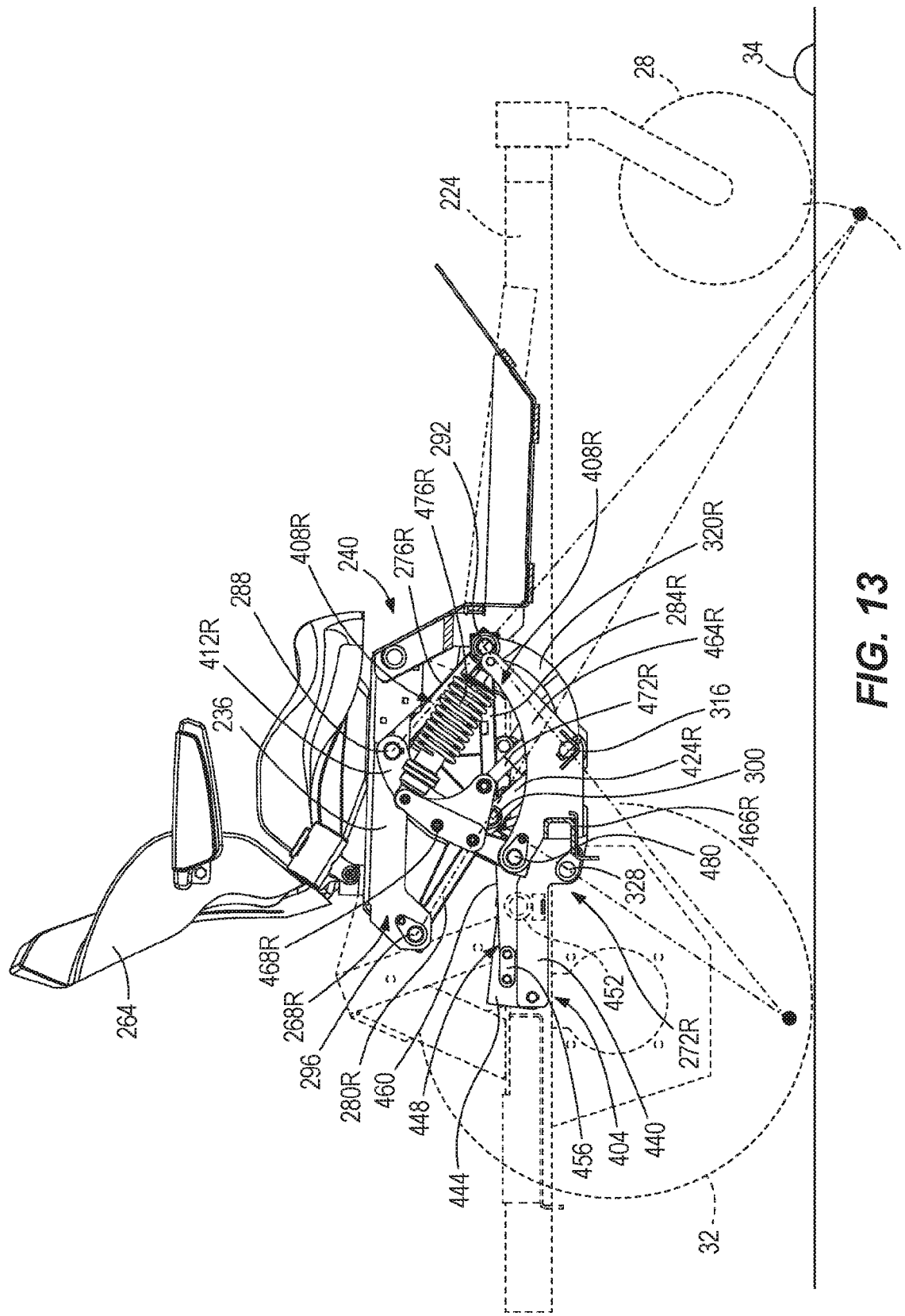
FIG. 13 is a right side view of the utility vehicle, illustrating a right side of a suspension system according to another embodiment.
Figure 14:
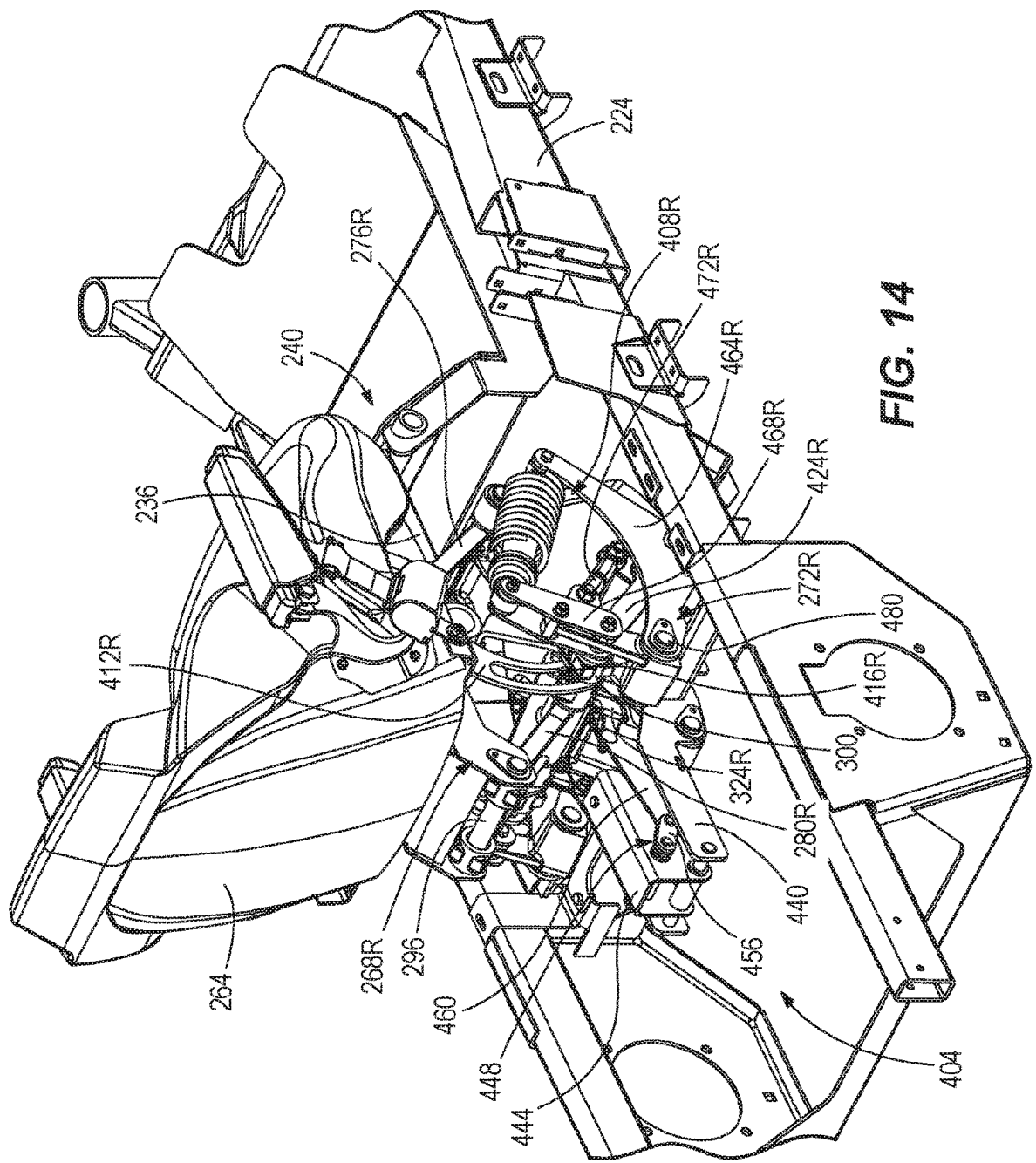
FIG. 14 is a top, rear, right side perspective view of the portion of the utility vehicle of FIG. 13.
Figure 15:
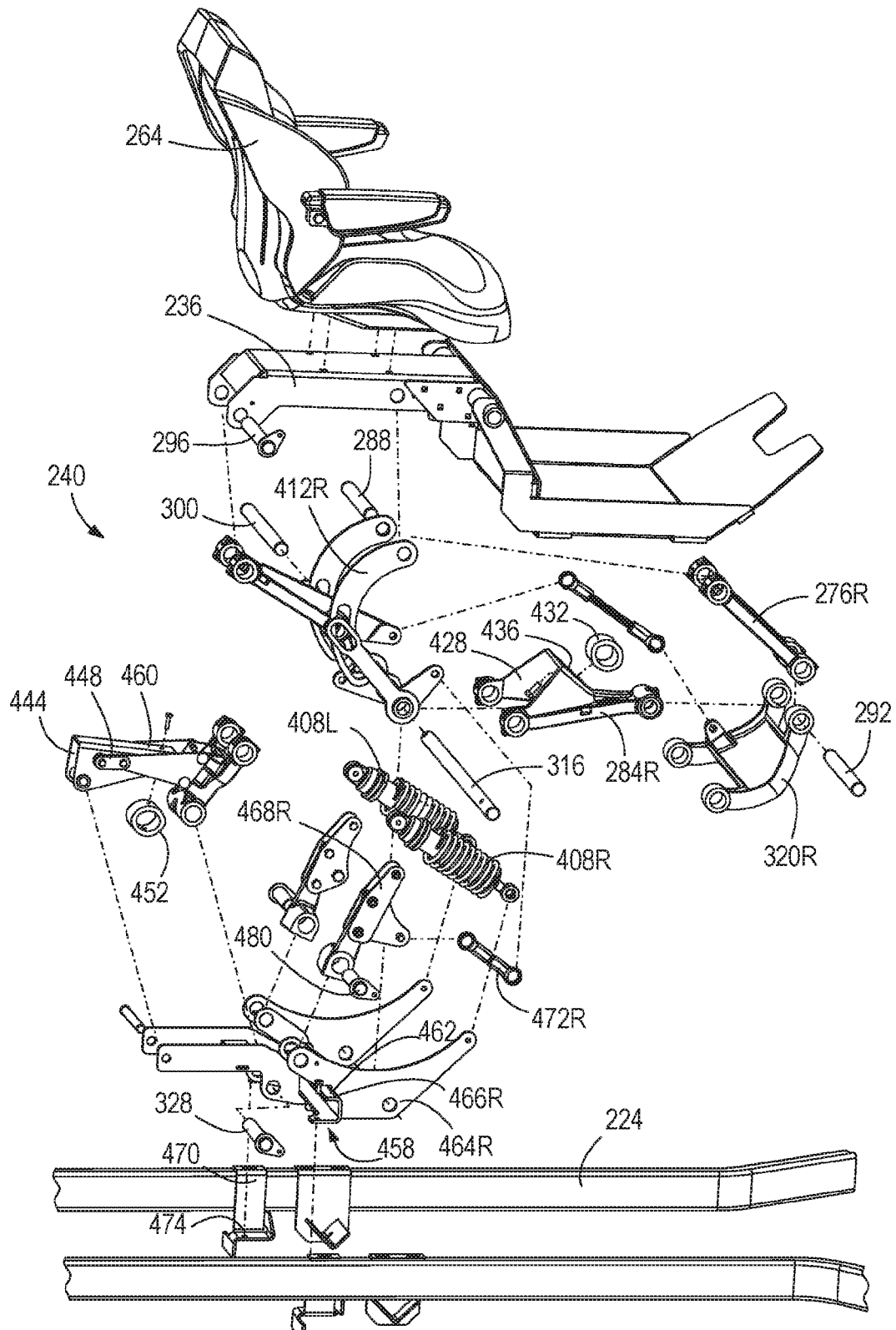
FIG. 15 is a is a top, right side exploded perspective view of the portion of the utility vehicle of FIG. 13.
Figure 16:
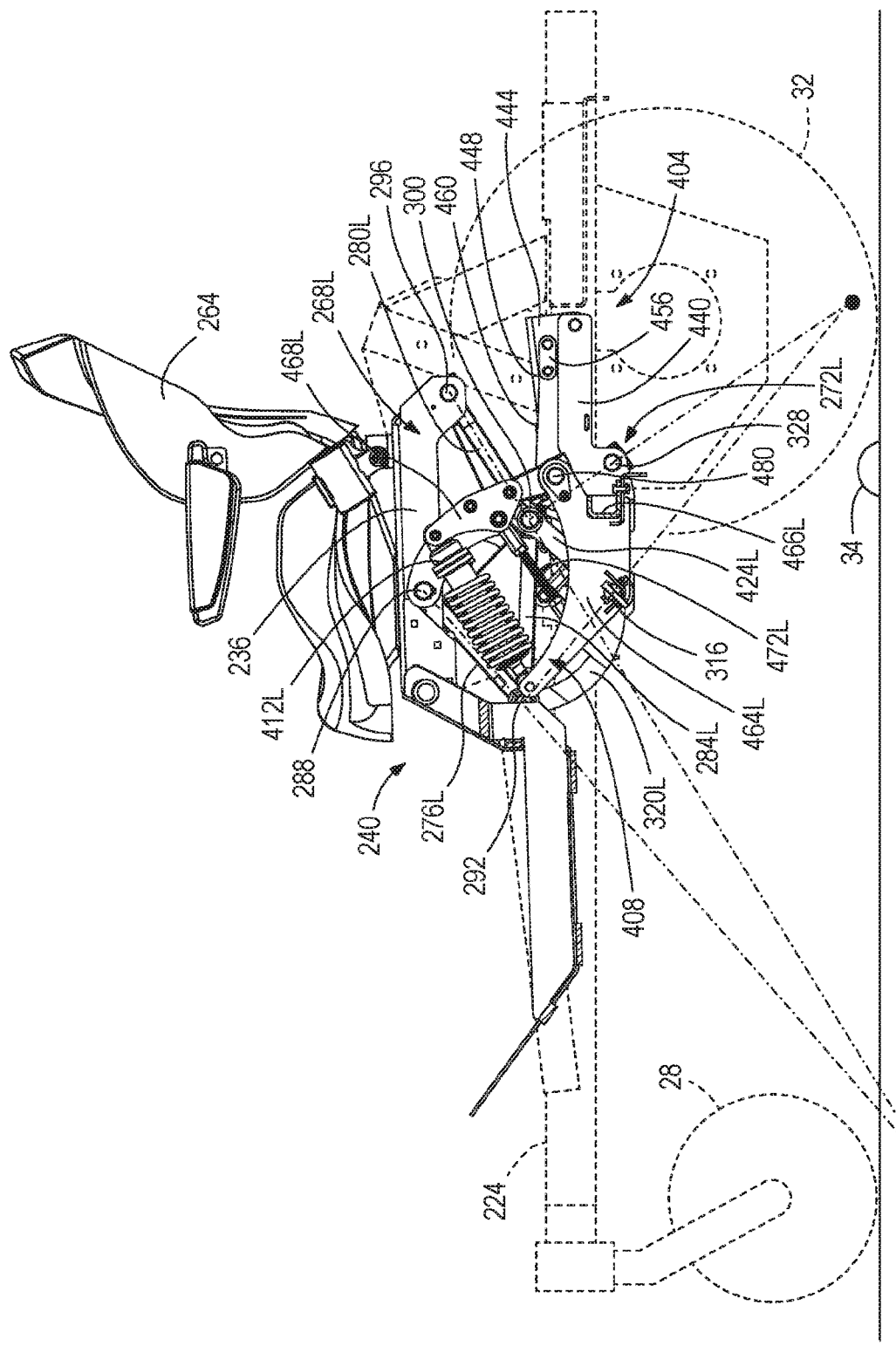
FIG. 16 is a left side view of the utility vehicle, illustrating a left side of the suspension system.
Figure 17:
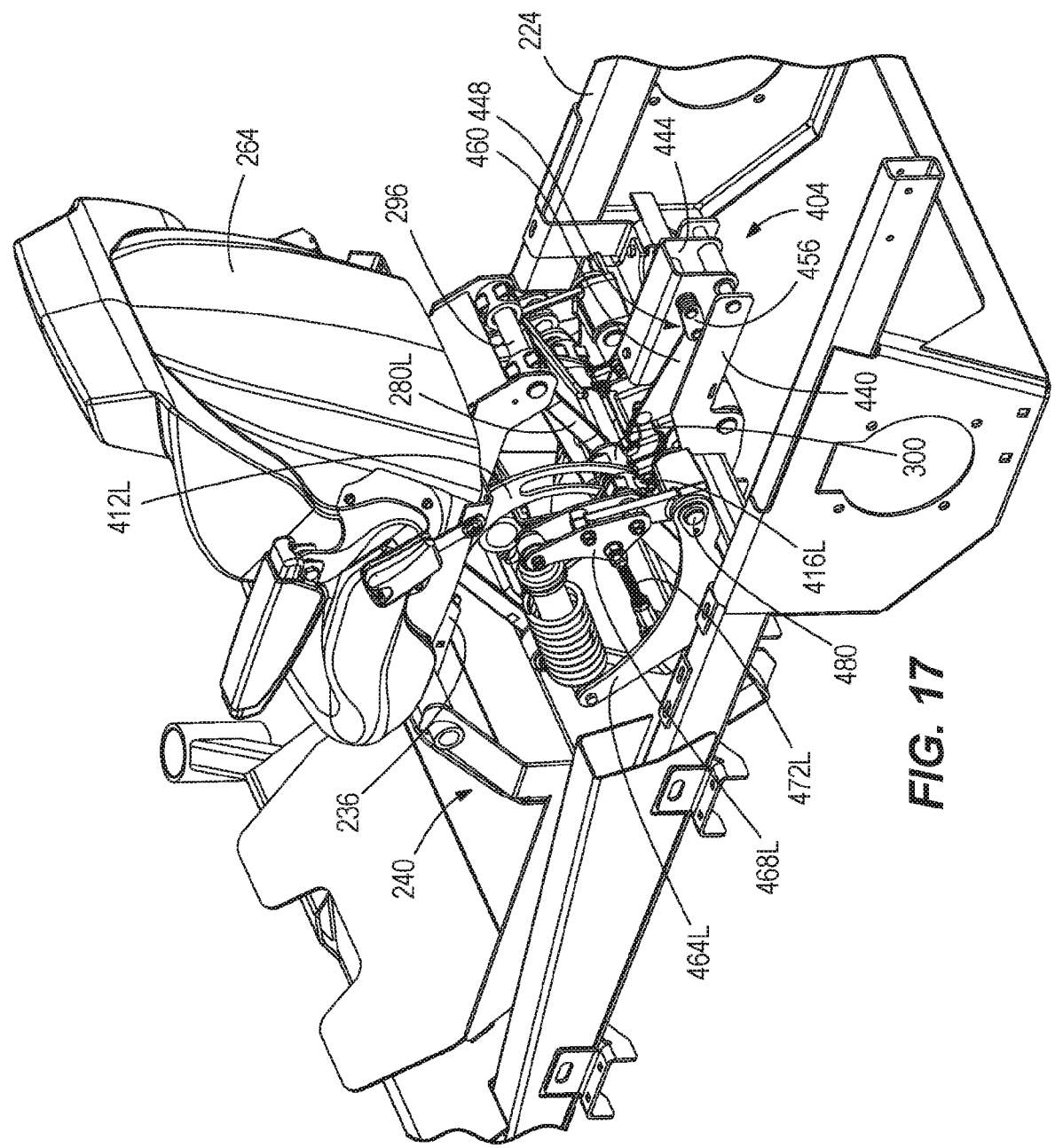
FIG. 17 is a rear, left side perspective view of the portion of the utility vehicle of FIG. 13.
Figure 18:
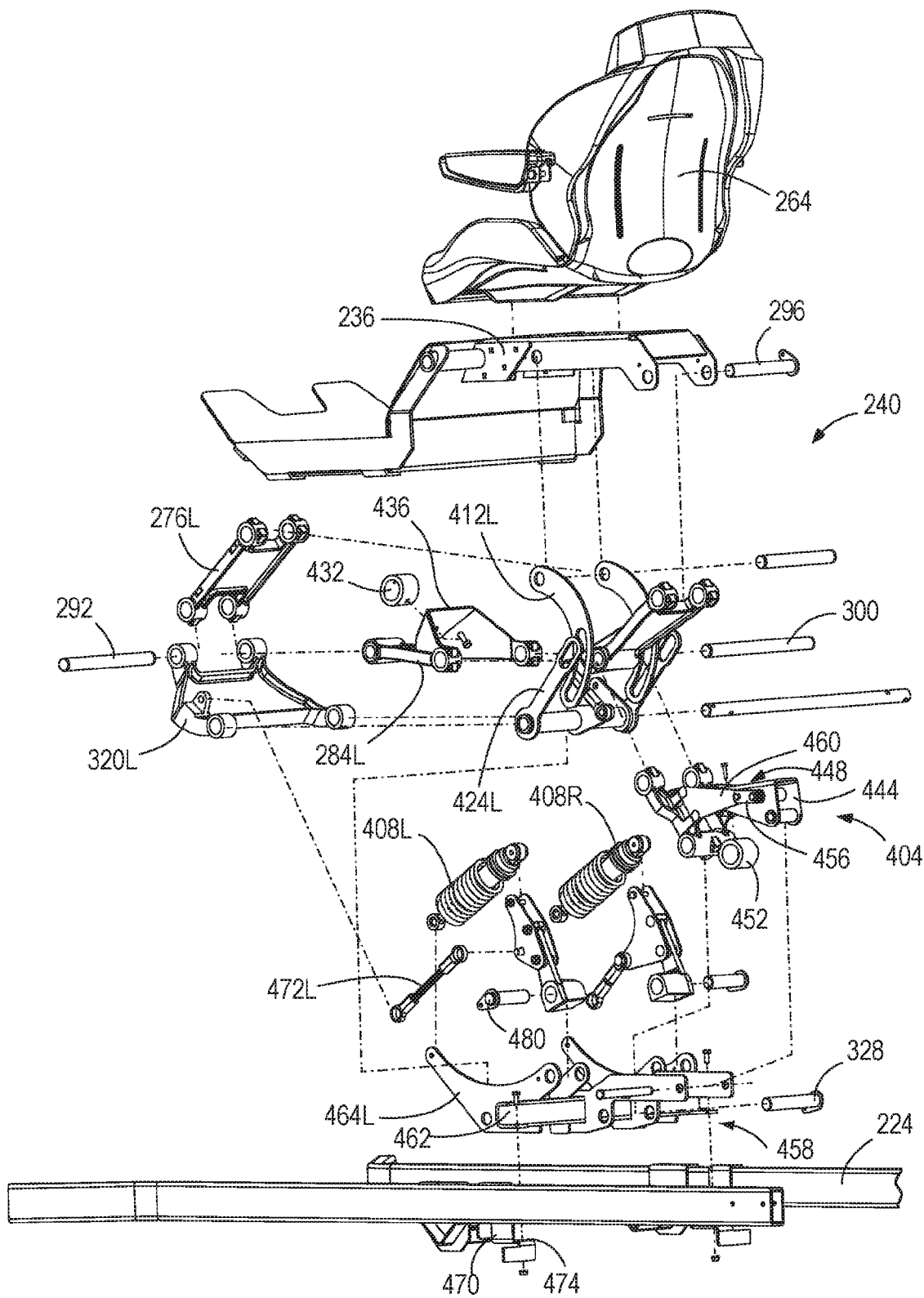
FIG. 18 is a is a top, right side exploded perspective view of the portion of the utility vehicle of FIG. 13.

FIGS. 13-15 illustrate one side (e.g., the right side) of the suspension system 240, while FIGS. 16-18 illustrate the other side (e.g., the left side) of the suspension system 240. The left side of the suspension system 240 is similar to the right side and the left and right sides of the suspension system 240 operate together to move the operator platform 236 relative to the frame 224. Elements of the right side of the suspension system 240 are designated with an "R" suffix, and elements of the left side of the suspension system 240 are designated with an "L" suffix.

As shown in FIGS. 13-15, the right side of the suspension system 240 includes a first linkage assembly 268R, a second linkage assembly 272R, a first resistance assembly 400 (FIG. 15), and a biasing members 408R. As shown in FIGS. 16 and 17 the left side of the suspension system 240 includes a first linkage assembly 268L, a second linkage assembly 272L, a second resistance assembly 404 (FIG. 18), and a biasing member 408L. The first linkage assembly 268 consists of right and left sides 268R, 268L and the second linkage assembly 272 consists of right and left sides 272R, 272L. Although the drawings call out 268R, 268L, 272R, 272L depending on which side of the respective linkage assembly 268, 272 is illustrated, the written description will simply refer to the first assembly 268 and second assembly 272 when referring to the overall assemblies 268, 272 or either side of the assemblies 268, 272.

The first linkage assembly 268 is an upper linkage assembly coupled to the operator platform 236. The second linkage assembly 272 is a lower linkage assembly coupled to a frame 224. The first linkage assembly 268 and the second linkage assembly 272 are also coupled together. The first resistance assembly 400 is coupled to the first linkage assembly 268 to absorb energy that is transferred to the first linkage assembly 268 towards an end of motion of the first linkage assembly 268. The second resistance assembly 404 is rigidly coupled to the frame 224 of the utility vehicle and is coupled to the second linkage assembly 272. The second resistance assembly 404 absorbs energy that is transferred to the second linkage assembly 272 towards an end of motion of the second linkage assembly 272.

With reference to FIG. 15, the right side of the first linkage assembly 268 includes a first upper link 276R, a second upper link 280R, a connecting link 284R, and a first cross link 412R. The operator platform 236 may also be considered a link of the first linkage assembly 268. Therefore, the first upper link 276R, the second upper link 280R, the connecting link 284R and the operator platform 236 creates a four-bar linkage. The first upper link 276R has a first end coupled to the operator platform 236 by a first shaft 288, and a second end coupled to the connecting link 284R by a second shaft 292. The second upper link 280R has a first end coupled to the operator platform 236 by a third shaft 296. The connecting link 284R has a first end coupled to the second end of the first upper link 276R by the second shaft 292, and a second end coupled to a second end of the second upper link 280R by a fourth shaft 300.

The first cross link 412R has a first end coupled to the operator platform 236 by the first shaft 288, and a second end coupled to the second end of the connecting link 284R by the fourth shaft 300. The first cross link 412R extends between opposite corners of the four-bar linkage formed by the first linkage assembly 268 to restrict excessive movement of the first linkage assembly 268. The first cross link 412R includes a slot 416R that the fourth shaft 300 is secured within. The slot 416R allows the first cross link 412R to move relative to the fourth shaft 300. The slot 416R forms a stop surface (e.g., at an end of the slot 416R) that limits the movement of the first cross link 412R relative to the fourth shaft 300. As a result, the first cross link 412R limits the distance between the corners of the four-bar linkage of the first linkage assembly 268 to ensure the first linkage assembly 268 does not over-extend or over-compress.

With continued reference to FIG. 15, the right side of the second linkage assembly 272 includes a first lower link 320R, a second lower link 324R, the connecting link 284R, and a second cross link 424R. The frame 224 may also be considered a link of the second linkage assembly 272. Therefore, the first lower link 320R, the second lower link 324R, the connecting link 284R, and the frame 224 creates a four-bar linkage. The first lower link 320R has a first end coupled to the frame 224 by the fifth shaft 316, and a second end coupled to the first end of the connecting link 284R by the second shaft 292. The second lower link 324R has a first end coupled to the frame 224 by a sixth shaft 328, and a second end coupled to the second end of the connecting link 284R by the fourth shaft 300. The second cross-link 424R has a first end coupled to the first lower link 320R by the fifth shaft 316, and a second end coupled to the second end of the connecting link 284R by the fourth shaft 300. The second cross-link 424R extends between opposite corners of the four-bar linkage of the second linkage assembly 272 to support and restrict excessive movement of the second linkage assembly 272.

The first resistance assembly 400 is coupled to the first linkage assembly 268 and includes a support structure 428 and a first resilient member 432. The support structure 428 has a first end coupled to the connecting link 284R and defines a support surface 436 that extends from the connecting link 284R towards the operator platform 236. In the illustrated embodiment, the support structure 428 is formed as an integral portion of the connecting link 284R. In other embodiments, the support structure 428 may be coupled to the connecting link 284R in any fashion. The support surface 436 is positioned behind the first upper link 276R and faces the first upper link 276R. The first resilient member 432 is coupled to the support surface 436 (e.g., via a fastener) and extends from the support surface 436 towards the first upper link 276R. In the illustrated embodiment, the first resilient member 432 is formed of a highly rigid elastic material and has a circular or oval construction. For example, the resilient member 432 may be an over travel pad that is manufactured by Miner Elastomer Products Corporation. For example, Miner Elastomer Products Corporation product number EPJ0791001 may be used. During movement of the first linkage assembly 268, the first upper link 276R may compress the first resilient member 432 on the support surface 436. As a result, the first resilient member 432 may deform to absorb energy and dampen movement of the operator platform 236 near the end of motion of the first linkage assembly 268. In other embodiments, the first resilient member 432 may be alternatively formed to dampen the movement of the operator platform 236.

With continued reference to FIG. 15, the right biasing member 408R includes a spring damper assembly (e.g., a coil spring positioned over a shock). The right biasing member 408R has a first end coupled to a series of spring links and a second end that is rigidly coupled to the frame 224. In the illustrated embodiment, the second end of the biasing member 408R is coupled to a spring support bracket 464R that is rigidly fixed to the frame 224 via a C-shaped connection portion 466R. The spring support bracket 464R includes a middle portion that defines a receiving aperture that receives the fifth shaft 316, a first end extending in a forward direction (e.g., towards the footrest), and a second end coupled to an eighth shaft 480. The series of links include a first spring link 468R, a second spring link 472R, a first intermediate link 476, a second intermediate link 478, and a third intermediate link 482.

The first spring link 468R has a first end coupled to the biasing member 408R and a second end that is pivotably coupled to the second spring link 472R. In the illustrated embodiment, the first spring link 468R is formed of two separate links that are bolted together and pivot as single link about the eighth shaft 480. The second spring link 472R has a first end pivotably coupled to the first spring link 468R and a second end pivotably coupled to the first intermediate link 476. In the illustrated embodiment, the first and second intermediate links 476, 478 are coupled to the fifth shaft 316 to form a single weldment that moves together to operably couple the biasing member 408R to the first linkage assembly 268. The first intermediate link 476 has a first end that is coupled to a first portion of the fifth shaft 316. The second intermediate link 478 has a first end coupled to a second portion of the fifth shaft 316 offset from the first intermediate link 476 (e.g., proximate the left side of the suspension system 240). The third intermediate link 482 has a first end pivotably coupled to the second intermediate link 478 and a second end pivotably coupled to the second upper link 280R of the first linkage assembly 268.

As a result, the first end of the biasing member 408R is fixed to the frame 224 via the spring support bracket 464R and the second end is coupled to the first linkage assembly 268 via the spring links 468R, 472R and the intermediate links 476, 478, 482 to urge the first linkage assembly 268 to an extended position. Since the biasing member 408R is coupled to the first linkage assembly 268 via the spring links, the biasing member 408R is able to absorb energy transferred through the first linkage assembly 268 during articulation of the first linkage assembly 268. For example, as the second upper link 280L, 280R moves downward (e.g., towards the ground), the intermediate links 476, 478, 482 move together to apply a tensile force on the second spring link 472R. The tensile force on the second spring link 472R causes the first spring link 468R to pivot about the eight shaft 480 which compresses the biasing member 408R. In some movements of the suspension system 240 (e.g., when the first linkage assembly 268 is in the collapsed position), the biasing member 408R and the first resistance assembly 400 work together to absorb energy transferred to the first linkage assembly 268.

With reference to FIG. 16-18, the left side of the first linkage assembly 268 includes a first upper link 276L, a second upper link 280L, a connecting link 284L, and a first cross link 412L. The operator platform 236 may also be considered a link of the first linkage assembly 268. Therefore, the first upper link 276L, the second upper link 280L, the connecting link 284L and the operator platform 236 creates a four-bar linkage similar to the four-bar linkage on the right side of the first linkage assembly 268. The left side of the second linkage assembly 272 includes a first lower link 320L, a second lower link 324L, the connecting link 284L, and a second cross link 424L. The frame 224 may also be considered a link of the second linkage assembly 272. Therefore, the first lower link 320L, the second lower link 324L, the connecting link 284L, and the frame 224 creates a four-bar linkage similar to the four-bar linkage on the right side of the second linkage assembly 272.

The suspension system 240 includes a left biasing member 408L having a spring damper assembly (e.g., a coil spring positioned over a shock). The left biasing member 408L has a first end coupled to a series of spring links and a second end that is rigidly coupled to the frame 224. In the illustrated embodiment, the second end of the biasing member 408L is coupled to a spring support bracket 464L that is rigidly fixed to frame 224. In the illustrated embodiment, the spring support bracket 464L is rigidly coupled to a cross-beam 462 that extends between a left and right portion of the frame 224 via a C-shaped connection portion 466L. The cross beam 462 is affixed to the frame 224 (e.g., via a plurality of fasteners).

The spring support bracket 464L includes a middle portion that defines a receiving aperture that receives the fifth shaft 316, a first end extending in a forward direction (e.g., towards the footrest), and a second end coupled to the eighth shaft 480. The series of links include a first spring link 468L and a second spring link 472L. The first spring link 468L has a first end coupled to the biasing member 408L and a second end that is pivotably coupled to the eighth shaft 480. In the illustrated embodiment, the first spring link 468L is formed of two separate links that are bolded together and pivot as single link about the eighth shaft 480. The second spring link 472L has a first end coupled to the first spring link 468L and a second end coupled to the first lower link 320L of the second linkage assembly 272. As a result, the first end of the biasing member 408L is fixed to the frame 224 via the spring support bracket 464L and the second end is pivotably coupled to the second linkage assembly 272 to urge the second linkage assembly 272 towards an extended position. Since the biasing member 408L is coupled to the first lower link 320L, the biasing member 408L is able to absorb energy transferred through the second linkage assembly 272 during articulation of the second linkage assembly 272. For example, as the first lower link 320L moves downward (e.g., towards the ground), a tensile force is applied to the second spring link 472L that causes the first spring link 468L to pivot about the eight shaft 480 which compresses the biasing member 408L.

With reference to FIG. 18, the second resistance assembly 404 includes a support bracket 440, a first linkage 444, a second linkage 448, and a second resilient member 452 (FIG. 13). The support bracket 440 is rigidly coupled to the frame 224 and has a first end positioned adjacent the second lower link 324L, 324R and a second end in a position rearward of the second lower link 324L, 324R. In the illustrated embodiment, the support bracket 440 is coupled to the cross-beam 462. The first linkage 444 has a first end coupled to the second end of the support bracket 440 and a second end positioned proximate to the first end of the support bracket 440. The support bracket 440 and the first linkage 444 cooperate to form a cavity that supports the second resilient member 452. The second linkage 448 includes a first end that is coupled to a portion of the first linkage 444 and a second end that is coupled to the second lower link 324R, 324L. In the illustrated embodiment, the second linkage 448 is formed of a first linkage portion 456 and a second linkage portion 460 that is coupled to the second lower link 324L, 324R. In other embodiments, the second linkage 448 may be form of a single link. The second resilient member 452 (FIG. 13) is coupled to the second end of the first linkage 444 (e.g., via a fastener). Movement of the second lower link 324L, 324R of the second linkage assembly 272 causes the second linkage 448 and first linkage 444 to pivot relative to the support bracket 440. As a result, the first linkage 444 compresses the second resilient member 452 against the support bracket 440 to absorb energy transferred through the second linkage assembly 272 and cause a dwell near the end of motion of the second linkage assembly 272. The second resilient member is constructed in a similar fashion to the first resilient member 432.

With reference to FIG. 15, a lower bracket 458 is defined by the combination of the cross-beam 462, the support linkage 440, and the spring support brackets 464L, 464R. The lower bracket 458 is affixed to the frame 224 and supports the first lower link 320R, the second lower link 324R, the biasing members 408L, 408R, and second resistance assembly 404 relative to the frame 224. The cross beam 462 of the lower bracket 458 is affixed to the frame 224 (e.g., welded, secured by fasteners, etc.). In the illustrated embodiment, an additional support bracket 470 is affixed to the frame 224 and defines a support surface 474 for the cross-beam 462 to be affixed to. The support surface 474 is positioned below the frame 224 so the operator platform 236 coupled to the suspension system 240 can be positioned at a desired height relative to the frame 224. In addition, the cross beam 462 is coupled to the support surface 474 via a plurality of fasteners so the entire suspension system 240 can be assembled separate from the utility vehicle 220. As a result, the suspension system 240 may be uncoupled from the frame 224 to allow the suspension system 240 to be serviced or replaced with an alternative suspension system.

Figure 19B:
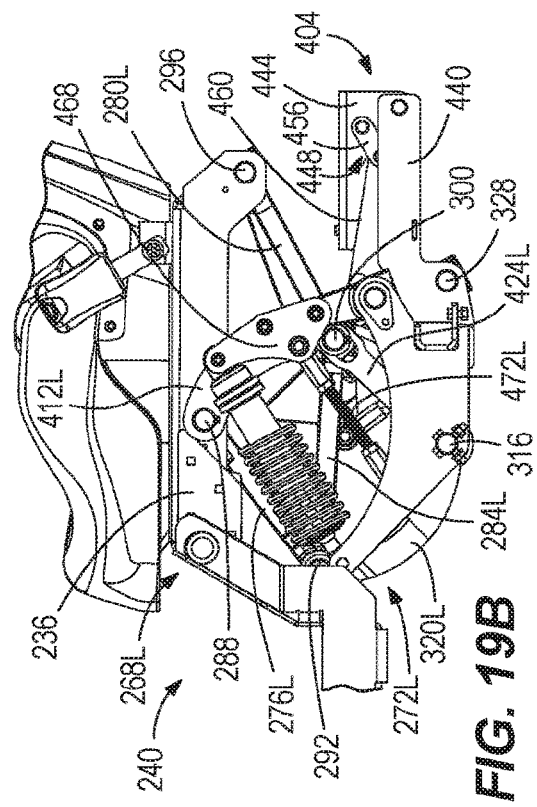
FIG. 19B is a side view of the portion of the utility vehicle of FIG. 19A, where the upper linkage assembly is in a resting position.
Figure 19A:
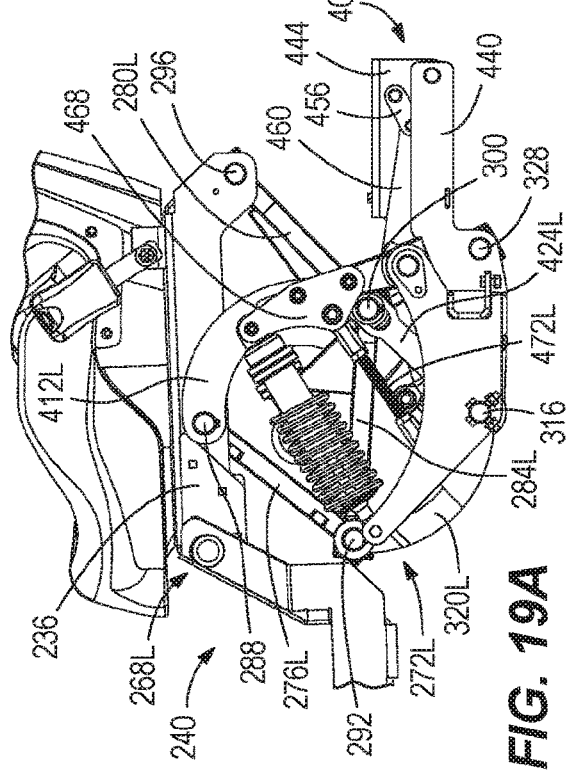
FIG. 19A is a side view of a portion of the utility vehicle, where an upper linkage assembly of the suspension system is in an extended position.
Figure 20A:
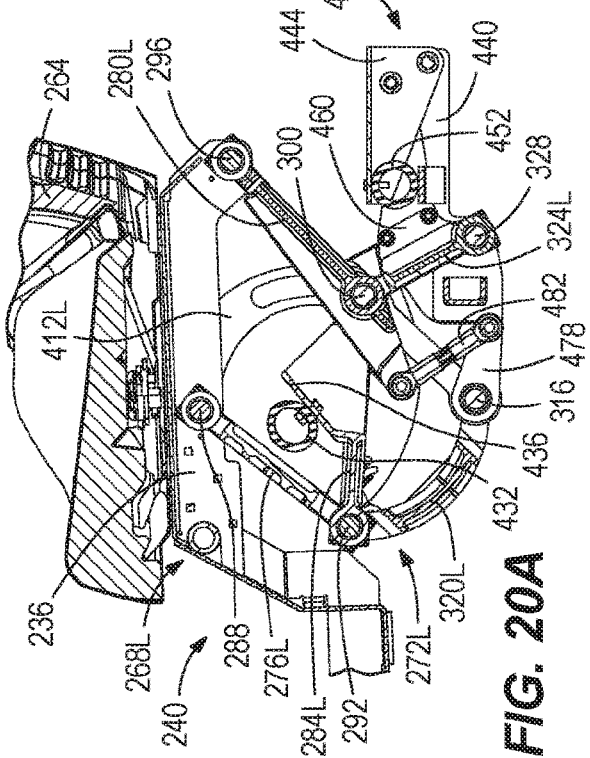
FIG. 20A is a cross-sectional side view of a portion of the utility vehicle of FIG. 19A, where the upper linkage assembly of the suspension system is in the extended position.

FIGS. 19A-20C illustrate movement, or articulation, of the first (upper) linkage assembly 268 (specifically, the left first linkage assembly 268L) as the second (rear) ground-engaging elements 32 travel over uneven terrain. FIGS. 19A and 20A illustrate the first linkage assembly 268 in an extended position (e.g., when an operator is not seated on the operator platform 536). In the illustrated embodiment, the biasing members 408R, 408L are configured to urge the first and second linkages assemblies 268, 272 towards an extended position when the operator is not seated. Therefore, once the operator is seated, the biasing members 408R, 408L absorb the weight of the operator and the first and second linkage assemblies 268, 272 articulate to the resting position.

Figure 20B:
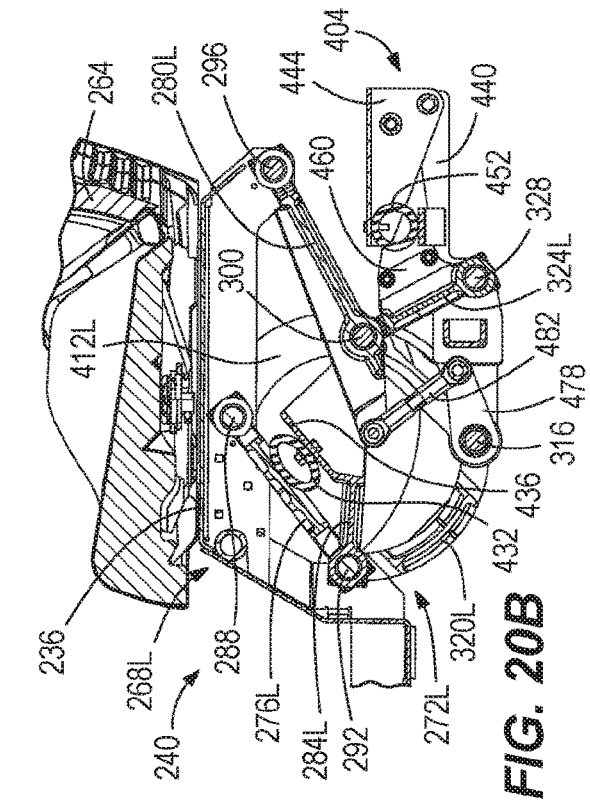
FIG. 20B is a cross-sectional side view of the portion of the utility vehicle of FIG. 19A, where the upper linkage assembly is in the resting position.

FIGS. 19B and 20B illustrates the first linkage assembly 268 in a neutral or resting position (e.g., when the frame 224 is generally parallel to the ground). The resting position is also, for example, a static equilibrium position while an operator is seated in the seat 264. For example, the suspension system 240 may move towards the resting position when the operator is seated on the operator platform or small bumps (e.g., normal operation forces) are encountered as the second (rear) ground-engaging elements 232 travel over uneven terrain. The resting position correlates to position of the first linkage assembly 268 when the first resilient member 432 minimally dampens or has yet to dampen the movement of the first linkage assembly 268. The movement of the first linkage assembly 268 causes the second upper link 276L to approach the first resilient member 432. During travel over small bumps, minimal contact between the second upper link 276L and the first resilient member 432 occurs. In other words, the movement of the first linkage assembly 268 accommodates substantially all of the vertical movement of the frame 224 (e.g., from a pitching force on the second ground engaging element 232) without causing significant movement to the operator platform 236 or the second linkage assembly 272.

Figure 19C:
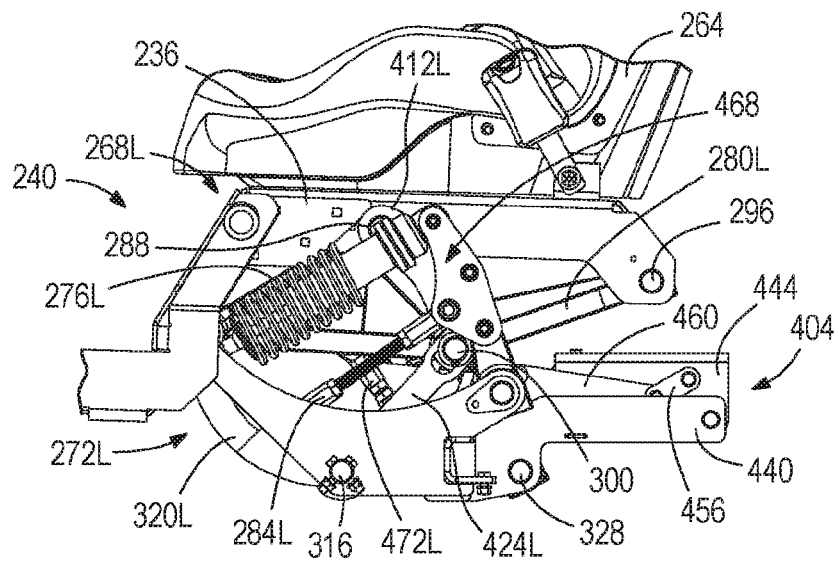
FIG. 19C is a side view of the portion of the utility vehicle of FIG. 19A, where the upper linkage assembly is in a collapsed position.
Figure 20C:
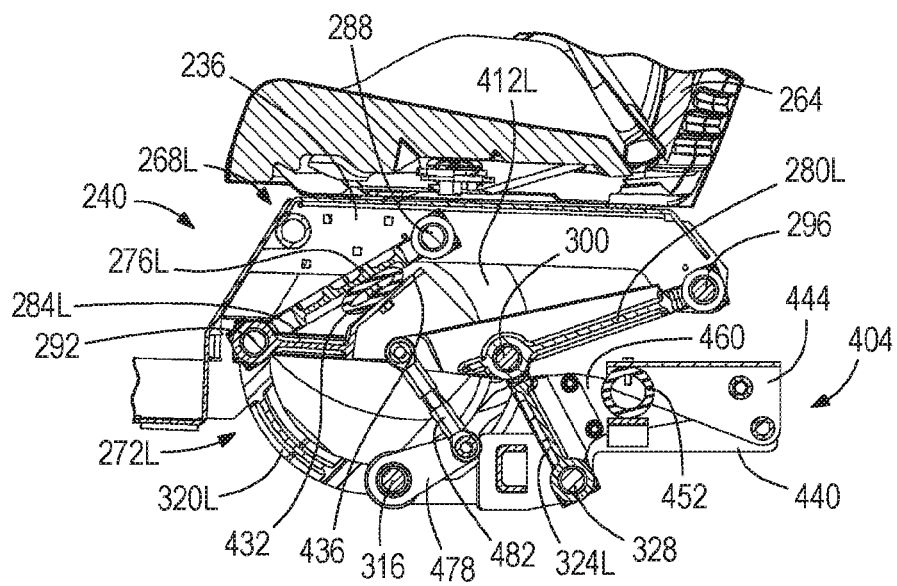
FIG. 20C is a cross-sectional side view of the portion of the utility vehicle of FIG. 19A, where the upper linkage assembly is in the collapsed position.

FIGS. 19C and 20C illustrates the first linkage assembly 268 in a collapsed position or compressed position (e.g., during the end of motion of the first linkage assembly 268). In the collapsed position, the first resilient member 432 is compressed. For example, the first linkage assembly 268 may move towards the collapsed position when large bumps, curb-drops (e.g., the utility vehicle is driven off a sidewalk), etc. are encountered as the second (rear) ground-engaging elements 232 travel over uneven terrain. The compression of the first resilient member 432 dampens the movement of the first linkage assembly 268 to reduce damage to the suspension system 240 and absorb the energy transferred to the first linkage assembly 268 that would otherwise transferred to the operator platform 236 (e.g., in form of abrupt movements of the operator platform 536) near the end of motion of the suspension system 240. At the same time, the right biasing member 408R may compress in tandem with the first resilient member 432 to absorb energy transferred to the first linkage assembly 268. If the combination of the first resilient member 432 and the right biasing member 408R are unable to absorb all of the energy transferred to the first linkage assembly 268 (e.g., during severe impacts), the remaining energy may be transferred to the operator platform 236 in the form of pivotable motion of the operator platform 236. In other words, when the suspension system 240 encounters too severe of an impact, the first resilient member 432 and the right biasing member 408R are able to absorb the majority of the energy transferred to the first linkage assembly 268 and only a small amount of energy is transferred to the operator platform 236 through the pivotable movement of the operator platform 236. For example, the operator platform 236 may pivot approximately 5 to 10 degrees relative to the ground during severe impacts.

FIGS. 21A-22C illustrate movement, or articulation, of the second (lower) linkage assembly 272 (specifically, the left lower linkage assembly 272L) as the first (front) ground-engaging elements 528 travel over uneven terrain. FIGS. 21A and 22A illustrates the second linkage assembly 272 in a resting position (e.g., when an operator is seated on the operator platform 536). For example, the second linkage assembly 272 may move towards the resting position when an operator enters the operator platform 236. The resting position correlates to the position of the second linkage assembly 272 when the second resilient member 452 minimally dampens or has yet to dampen the movement of the second linkage assembly 272. In other words, the second resilient member 452 is in a fully extended position (e.g., as vertically tall as it can be).

FIGS. 21B and 22B illustrates the second linkage assembly 272 in a first (slightly) compressed position (e.g., when the front portion of the frame 224 moves relative to the ground) or when small bumps (e.g., normal operational forces) are encountered as the first (front) ground-engaging elements 228 travel over uneven terrain. The movement of the second lower link 324L of second linkage assembly 272 causes the first linkage 444 and the second linkage 448 of the second resistance assembly 404 to pivot relative to the support bracket 440. In the resting position, the movement of the first and second linkages 444, 448 causes the second resilient member 452 to approach the support bracket 440, which deforms or compresses the second resilient member 452. Since the second resilient member 452 deforms, the second linkage assembly 272 accommodates substantially all of the vertical movement of the frame 224 (e.g., from a pitching force on the ground engaging element 228) without causing significant movement to the operator platform 236 or the first linkage assembly 268.

Figure 21C:
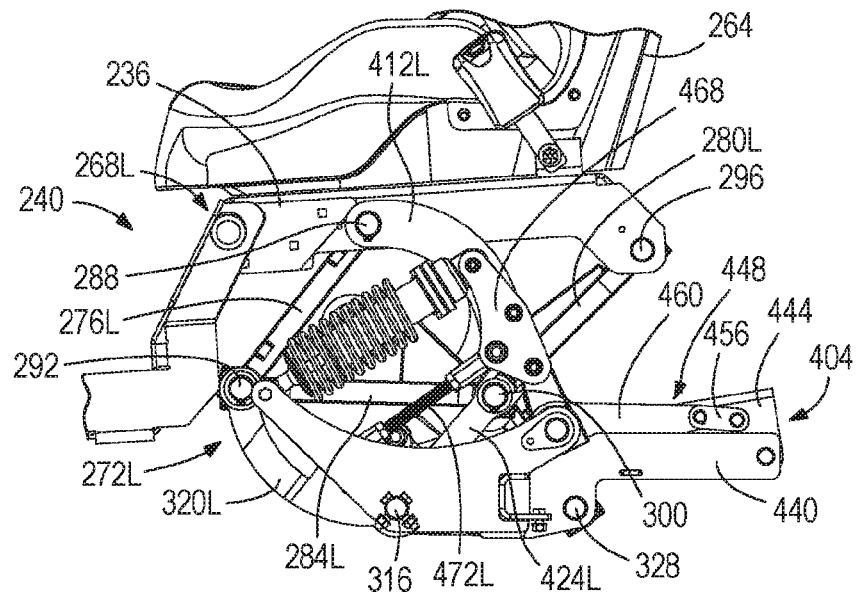
FIG. 21C is a side view of the portion of the utility vehicle of FIG. 21A, where the lower linkage assembly is in a second collapsed position.
Figure 22C:
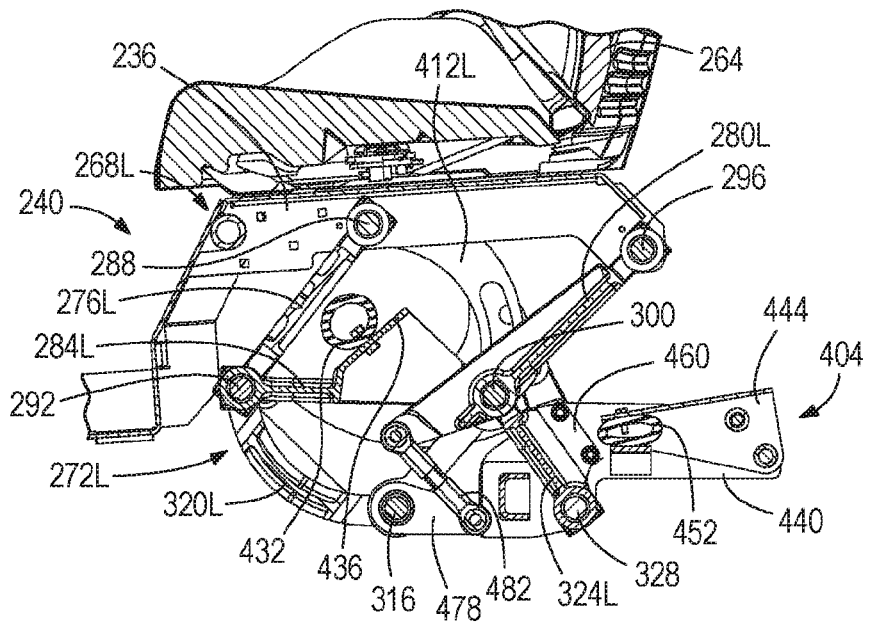
FIG. 22C is a side view of the portion of the utility vehicle of FIG. 21A, where the lower linkage assembly is in the second collapsed position.

FIGS. 21C and 22C illustrates the second linkage assembly 272 in a second compressed or collapsed position (e.g., during the end of motion of the second linkage assembly 272L). In the second collapsed position, the second resilient member 452 and the left biasing member 408L may compress in tandem to absorb energy transferred to the second linkage assembly 272. For example, the second linkage assembly 272 may move towards the second collapsed position when large bumps, curb-drops (e.g., the utility vehicle is driven off a sidewalk), etc. are encountered as the first (front) ground-engaging elements 228 travel over uneven terrain. The compression of the second resilient member 452 dampens the movement of the second linkage assembly 272 to reduce damage to the suspension system 240. While movement of the second linkage assembly 272 towards the collapsed position (e.g., clockwise movement) is only described in detail above, it should be appreciated that the second resistance assembly 404 may act in a similar fashion when the second linkage assembly 272 moves towards an extended positioned (not shown). In other words, the second resilient member 452 may compress in response to counter-clockwise movement of the second linkage assembly 272.

FIGS. 23-28 illustrate a suspension system 540 for a utility vehicle 520 according to an alternative embodiment. The suspension system 540 is similar to the suspension systems 40, 240 described above with reference to FIGS. 1-22C, and the following description focuses primarily on differences between the suspension system 540 and the suspension system 240, 40. In addition, common features and elements of the suspension system 240, 40 corresponding with features and elements of the suspension system 40 are given common reference numbers plus 500.

The illustrated utility vehicle 520 includes a frame 524 that supports two first ground-engaging elements 528 and two second ground-engaging elements 532 and the suspension system 540 that generally maintains an operator platform 536 in a horizontal orientation relative to the ground. The main differences of the suspension system 540 are related to the positioning and connection of biasing members 708, 710 and resistance assemblies 700, 704 within the suspension system 540. In the illustrated embodiment, the biasing members 708, 710 are constructed to urge the suspension system 540 towards an extended position and absorb energy transferred to the suspension system 540 from the ground-engaging elements 528, 532. At the same time, the resistance assemblies 700, 704 are constructed to limit the range of motion of the operator platform 536 and absorb energy transferred to the suspension system or cause a dwell near an end of motion of the suspension system 540. As a result, excessive movement of the operator platform 536 is limited when the utility vehicle is abruptly stopped, encounters large bumps or uneven terrain, etc.

In the illustrated embodiments, the suspension system 540 includes a first (upper) linkage assembly 568 and a second (lower) linkage assembly 572. The first linkage assembly 568 consists of right and left sides 568R, 568L and the second linkage assembly 572 consists of right and left sides 572R, 572L. For the sake of brevity, only the left side of the suspension system 540 is described in detail and it should be appreciated that the right side of the suspension system 540 is similar to left side. Although the drawings call out 568R, 568L, 572R, 572L depending on which side of the respective linkage assembly 568, 572 is illustrated, the written description will simply refer to the first assembly 568 and second assembly 572 when referring to the overall assemblies 568, 572 or either side of the assemblies 568, 572.

The first linkage assembly 568 defines an instant center 656L that is forward of the operator platform 536 and the second linkage assembly 572 defines an instant center 668L rearward of the operator platform 536. A top link of the first and second linkage assemblies 568, 572 (e.g., the operator platform 536 and a connecting link 584L) each respectively pivot about the instant centers 656L, 668L during articulation of the suspension system 540, in a similar manner to the suspension systems 40, 240 described above in detail.

The biasing members 708, 710 and the resistance assemblies 700, 704 are coupled to the suspension system 540 in a manner that limits the number of links required in the suspension system 540 and limits the number of connection points formed on the links. The construction of the suspension system 540 limits or even eliminates the amount of bending stress that occurs on the links. Therefore, one or more of the links of the first and second linkage assemblies 568, 572 are in only compression or tension during articulation, which simplifies the strength analysis of the suspension system 540 and permits the links of the suspension system 540 to be formed of materials with lower yield strengths (e.g., aluminum). The use of lower yield materials such as aluminum reduces the overall weight and cost of the suspension system 540.

Figure 23:
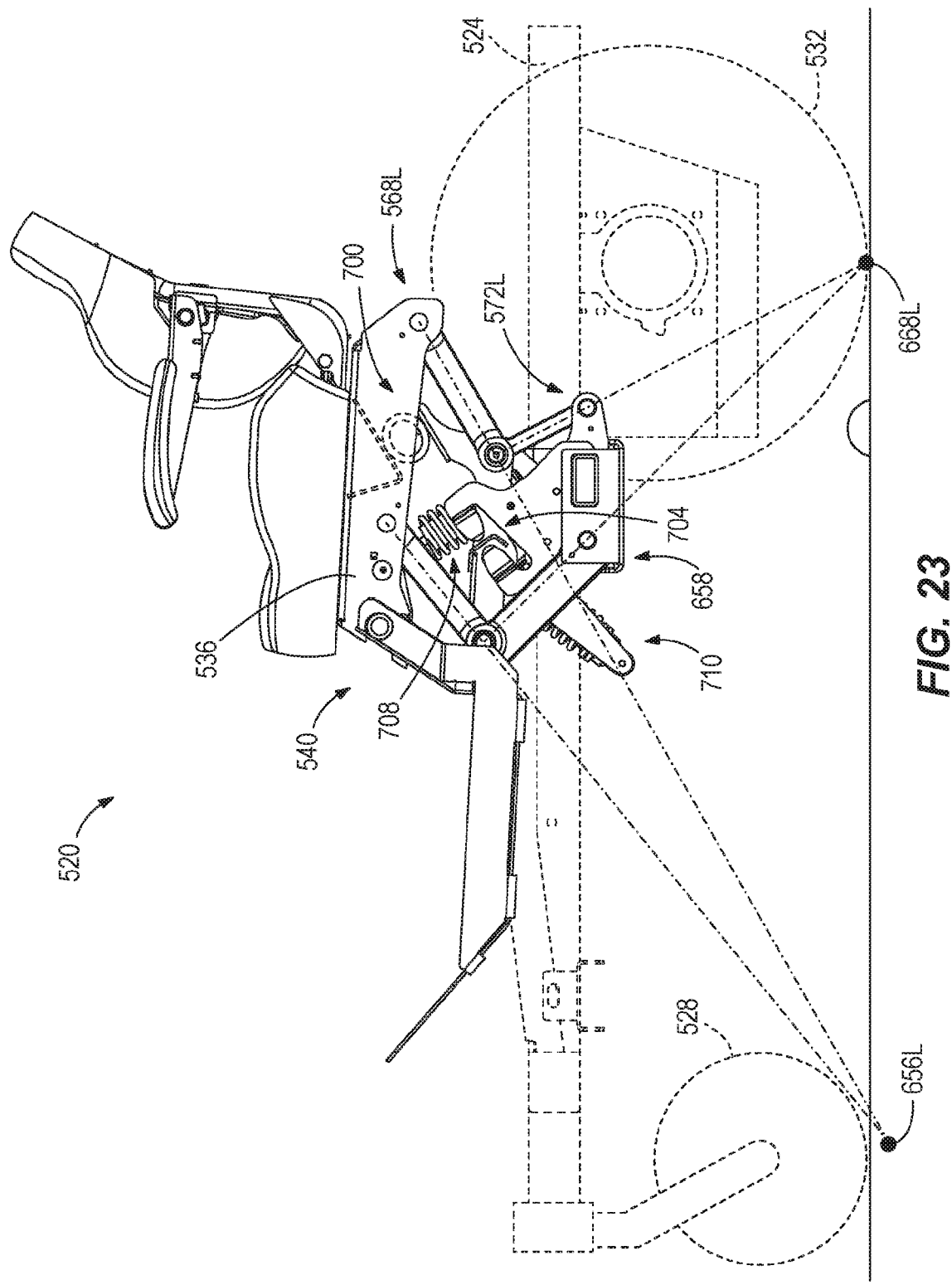
FIG. 23 is a left side view of a portion of the utility vehicle, illustrating a left side of a suspension system according to another embodiment.
Figure 24:
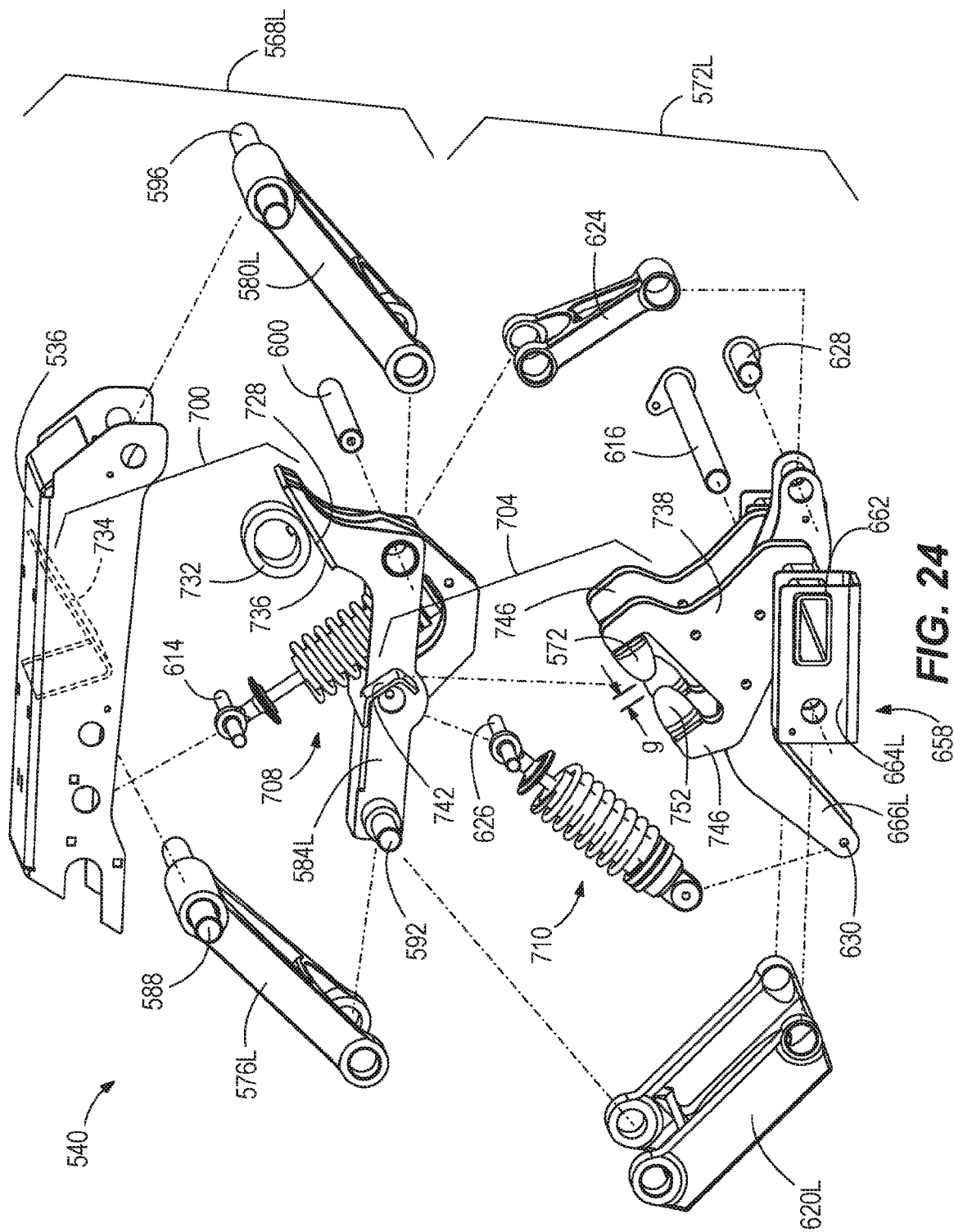
FIG. 24 is a left side, exploded perspective view of the suspension system of FIG. 23.

With reference to FIG. 24, the first linkage assembly 568 on the left side includes a first upper link 576L, a second upper link 580L, a connecting link 584L, and the first biasing member 708. The operator platform 536 may also be considered a link of the first linkage assembly 568. Therefore, the first upper link 576L, the second upper link 580L, the connecting link 584L, and the operator platform 536 creates a four-bar linkage. The first upper link 576L has a first end coupled to a first end of the operator platform 536 by a first shaft 588, and a second end coupled to the connecting link 584L by a second shaft 592. The second upper link 580L has a first end coupled to a second end of the operator platform 536 by a third shaft 596. The connecting link 584L has a first end coupled to the second end of the first upper link 576L by the second shaft 592, and a second end coupled to a second end of the second upper link 580L by a fourth shaft 600. The first, second, third, and fourth shafts 588, 592, 596, 600 extend left to right across the suspension system 540 (i.e., into the page in FIG. 23) to connect with corresponding components of the right side of the suspension system 540.

The biasing member 708 has a first end coupled to the first end of the operator platform 536 and a second end coupled to the connecting link 584L. In other words, the biasing member 708 generally extends between opposite corners of the four-bar linkage formed by the first linkage assembly 568L. As a result, the biasing member 708 urges the first linkage assembly 568L towards an extended position and also acts as a cross-link to restrict excessive movement of the first linkage assembly 568. In the illustrated embodiment, the biasing member 708 includes spring damper assembly (e.g., a coil spring positioned over a shock) that is attached to the operator platform 536 by a first fastener 614 positioned proximate to the first shaft 588 and is coupled to the connecting link 584L by a second fastener 618 positioned proximate to the fourth shaft 600. In the illustrated embodiment, the biasing member 708 does not require an adjustment feature to accommodate operators with varying gravitational weight forces. However, in other embodiments, the biasing member 708 may be adjustable so the user may set a feature such as the pre-load of the coil, the height of the operator platform, and the stiffness of the spring coil. In other embodiments, a control system of the utility vehicle may be in communication with the suspension system 540 and include an automatic adjustment feature or an electric actuator to adjust features of the biasing member 708 such as height, stiffness, etc. For example, sensors (e.g., position, force, etc.) may be coupled to the suspension system 540 in one or more locations (e.g., the biasing member 708, the first linkage assembly 568, the second linkage assemblies 572, etc.) to provide feedback to the control system related to the position of the suspension system 540. As a result, the control system may automatically adjust the suspension system 540 in response to the feedback received from the sensors.

With continued reference to FIG. 24, the second linkage assembly 572 on the left side includes a first lower link 620L, a second lower link 624L, the connecting link 584L, and the second biasing member 710. The frame 524 may also be considered a link of the second linkage assembly 572. Therefore, the first lower link 620L, the second lower link 624L, the connecting link 584L, and the frame 524 creates a four-bar linkage. In the illustrated embodiment, the second linkage assembly 572 is coupled to the frame 524 via a lower bracket 658. The lower bracket 658 includes a cross-beam 662 that extends between a left and right portion of the frame 224, a first support bracket 664L, and a second support bracket 666L. The first support bracket 664L is affixed to frame 524 (FIG. 23). The first lower link 620L has a first end coupled to the frame 524 by the fifth shaft 616 (e.g, through connecting with the first support bracket 664L) and a second end coupled to the first end of the connecting link 584L by the second shaft 592. The second lower link 624L has a first end coupled to the frame 524 (e.g., through connection with the second support bracket 666L), by a sixth shaft 628, and a second end coupled to the second end of the connecting link 584L by the fourth shaft 600. The fifth and sixth shafts 616, 628 extend across the suspension system 540 to secure similar fifth and sixth shafts of the right side assembly. In other words, the fifth and sixth shafts 616, 628 extend across the suspension system 540 or the suspension system 540 may include fifth and sixth shafts 616, 628 on each of the left and the right side of the suspension system 540

The second biasing member 710 has a first end coupled to the connecting link 584L and a second end coupled to the frame 524 (e.g., through connection with the securing bracket 722). In other words, the second biasing member 710 extends between opposing links of the four-bar linkage formed by the second linkage assembly 572. As a result, the second biasing member 710 urges the second linkage assembly 572 towards a resting position and also acts as a cross-link to restrict excessive movement of the second linkage assembly 572. In the illustrated embodiment, the second biasing member 710 is attached to a central portion of the connecting link 584L by a third fastener 626 and is coupled to the frame 524 through connection with the securing bracket 722 by a fourth fastener 630. The illustrated second biasing member 710 includes spring damper assembly (e.g., a coil spring positioned over a shock), however, it should be appreciated that the second biasing member 710 may be formed in alternative other sustainable biasing members as described above with reference to the first biasing member 708.

With continued reference to FIG. 24, the first resistance assembly 700 is coupled to the first linkage assembly 568 and includes a support structure 728, an engagement structure 734 opposing the support structure 728, and a first resilient member 732. The support structure 728 has a first end coupled to the connecting link 584L and defines a support surface 736 that extends from the connecting link 584L towards the operator platform 536. In the illustrated embodiment, the support structure 728 is formed as an integral portion of the connecting link 584L. The engagement structure 734 is coupled to the operator platform 536 is shaped to oppose the support structure 728. The first resilient member 732 is formed of a highly rigid elastic material and has a circular or oval construction. The first resilient member 732 is coupled to the support surface 736 (e.g., via a fastener) and extends from the support surface 736 towards the engagement structure 734. In other embodiments, the first resilient member 732 may be coupled to the engagement structure 734 or be formed with an alternative geometry (e.g., cone-shaped, triangular, etc.).

The second resistance assembly 704 includes a first support linkage 738 having a first end rigidly coupled to the frame 524 and a second end extending towards the connecting link 584L and an engagement member 742 coupled to the connecting link 584L. The second end of the first support linkage 738 includes a pair of arms 746 that each support a resilient member 752. The resilient members 752 are spaced to form a gap g that is sized to receive the engagement member 742. When the suspension system 540 is in the resting position (FIG. 25), the resilient members 752 surround (are positioned on opposite sides of) the engagement member 742 without contacting the engagement member 742. In the illustrated embodiment, the resilient members 752 are cone-shaped and formed of a highly rigid elastic material. During the end of motion of the suspension system 540, the engagement member 742 contacts one of the resilient members 752 to dampening the forces that occur on the operator platform 536. In the illustrated embodiment, the resilient members 752 are formed with a higher rigidity than the first resilient member 732 of the first resistance assembly 700. In other, words, the range of motion through the first resistance assembly 700 is greater than the range of motion of the second resistance assembly 704. In the illustrated embodiment, the suspension system 540 includes a second resistance assembly 704 on each of the left and right sides of the suspension system 540. In other embodiments, a single second resistance assembly 704 may be used.

Figure 25:
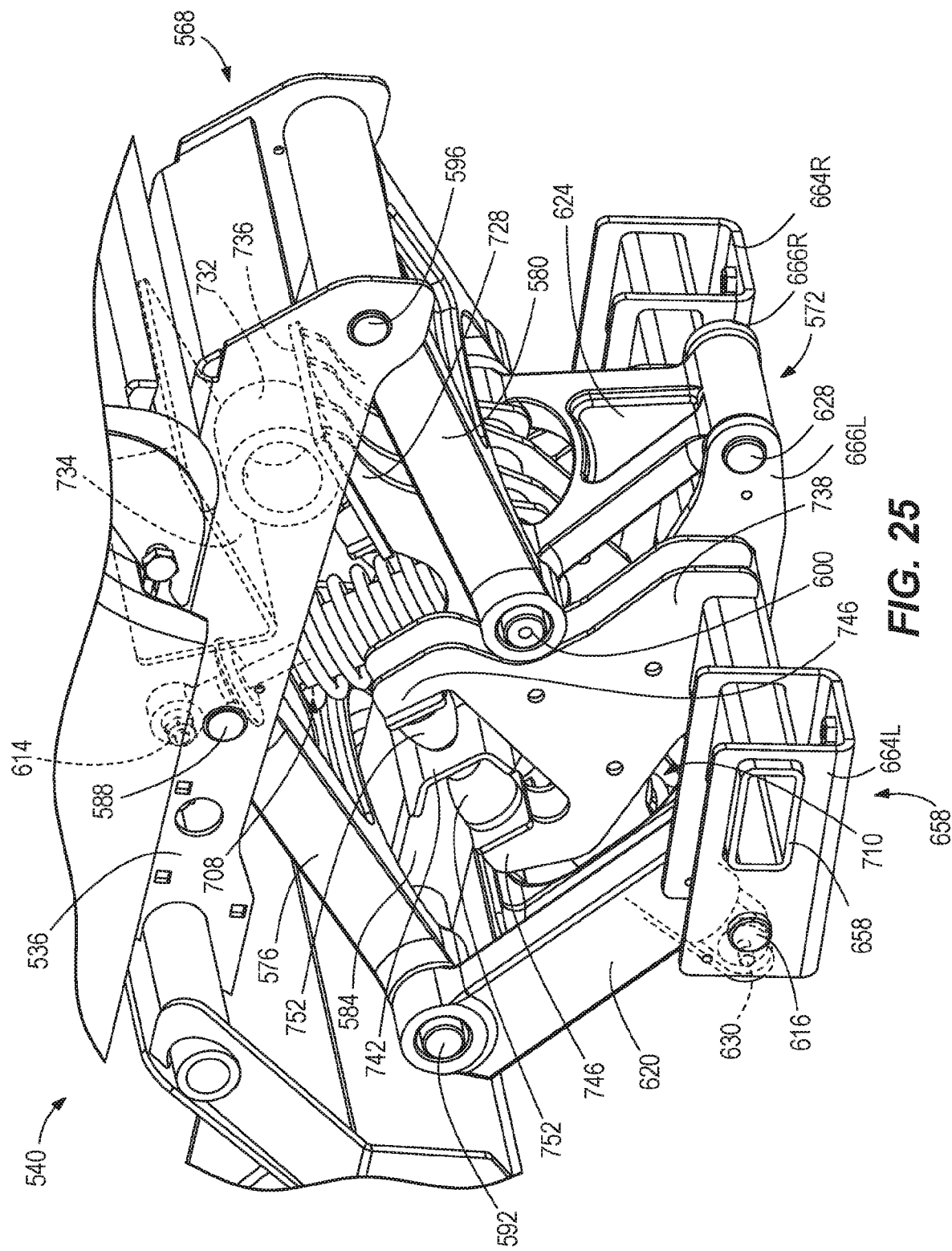
FIG. 25 is a rear, left side isolated perspective view of a portion of the utility vehicle of FIG. 23.

Now with reference to FIG. 25, the suspension system 540 is illustrated in an assembled form. In the illustrated embodiment, the first upper link 576, the second upper link 580, the connecting link 584, the first lower link 620 and the second lower link 624 are each respectively formed as uniform structures that extend between the left and right sides of the utility vehicle 520. In the illustrated embodiment, the first lower link 620 includes a central recess that the second biasing member 710 to extends through and the connecting link 584 has a U-shaped recess cavity (FIG. 24) that defines a mounting portion for the second end of the first biasing member 708. The construction of the first lower link 620 and the connecting link 584 permits the compact construction of the suspension system 540. In other embodiments, each of the left and right sides of the suspension system 540 may be formed of separate links.

FIGS. 26A-26D illustrate the articulation of the suspension system 540. FIG. 25A illustrates the suspension system 540 in the resting position or during normal operation (e.g., over small bumps). In this position, the first biasing member 708 and the second biasing member 710 are slightly compressed by the operator so the first linkage assembly 568 and the second linkage assembly 572 are urged towards the resting position. In the resting position, the engagement member 742 of connecting link 584 is positioned within the gap between the pair of resilient members 752 without applying a deflecting force to either resilient member 752. The gap allows the second linkage assembly 572 to freely move within a limited range of motion without engaging with the second resistance assembly 704 and deflecting the resilient members 752. In other words, the second linkage assembly 572 has a first range of motion in which the second resistance assembly 704 does not affect (e.g., dampen or limit the range of motion) the articulation of the second linkage assembly 572. In some embodiments, the first resistance assembly 700 may support the operator platform 536 in the resting position. For example, in the illustrated embodiment, the engagement structure 734 opposes the support surface 736 so the first resilient member 732 deforms and supports the operator platform 536.

Figure 26A:
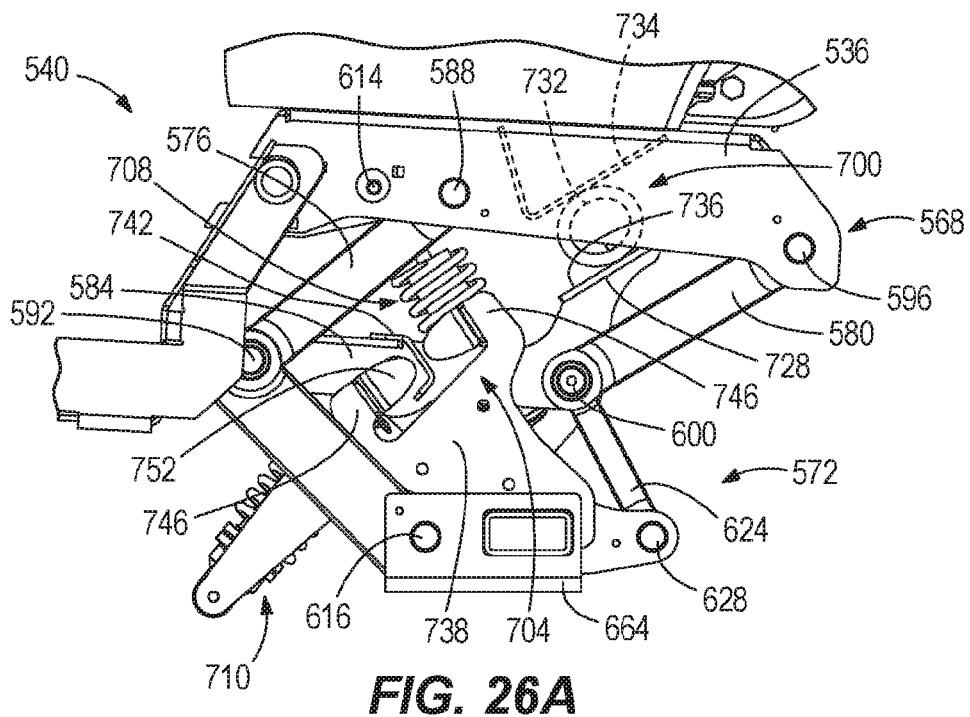
FIG. 26A is a left side view of a portion of the utility vehicle, when an upper and lower linkage assembly of the suspension system is in a resting position.
Figure 26B:
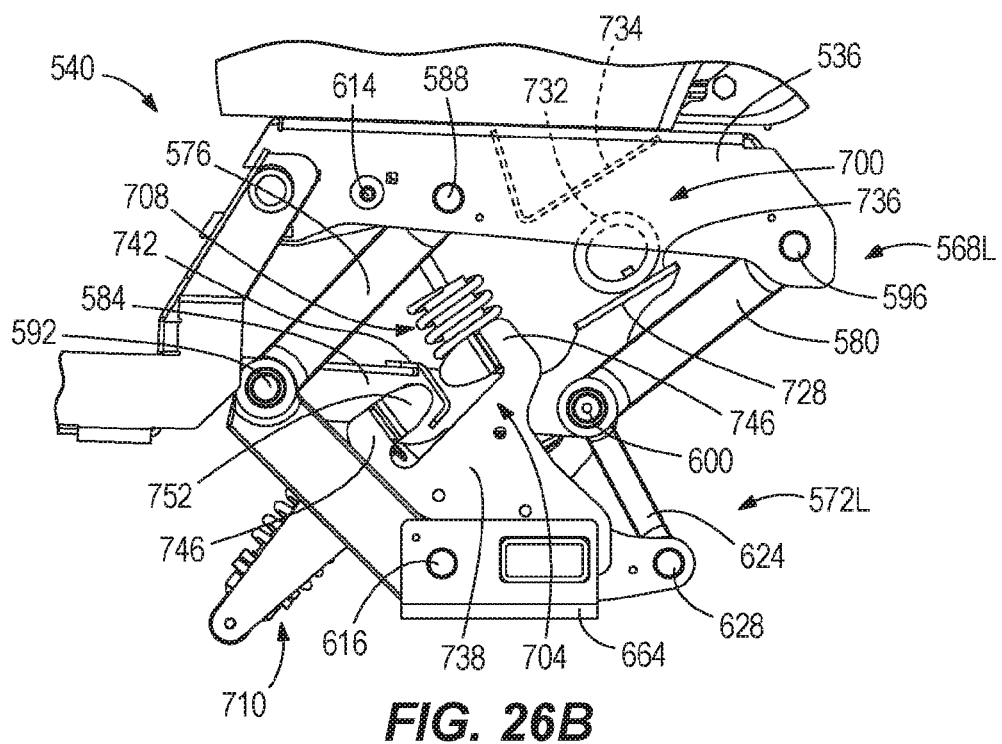
FIG. 26B is a left side view of the portion of the utility vehicle shown in FIG. 26A, when the lower linkage assembly is in a resting position and the upper linkage assembly is in an extended position.

FIG. 26B illustrates the suspension system 540 with the first linkage assembly 568 in an extended position. The first linkage assembly 568 may articulate to the extended position when the rear portion of the frame 524 moves downward (e.g., after contacting a bump with the rear ground engaging element, during curb drops, etc.) or when the operator is not seated on the operator platform 536. When the first linkage assembly 568 is in the extended position, the engagement structure 734 moves away from the support surface 736 (e.g., the first resilient member 732 disengages with the engagement structure 734) and the first biasing member 708 restricts the travel distance of the first linkage assembly 568 (e.g., to form a hard stop). In some embodiments, the first linkage assembly 568 may include a cross link extending between opposite corners of the first linkage assembly 568 to restrict the travel distance of the first linkage assembly 568.

Figure 26C:
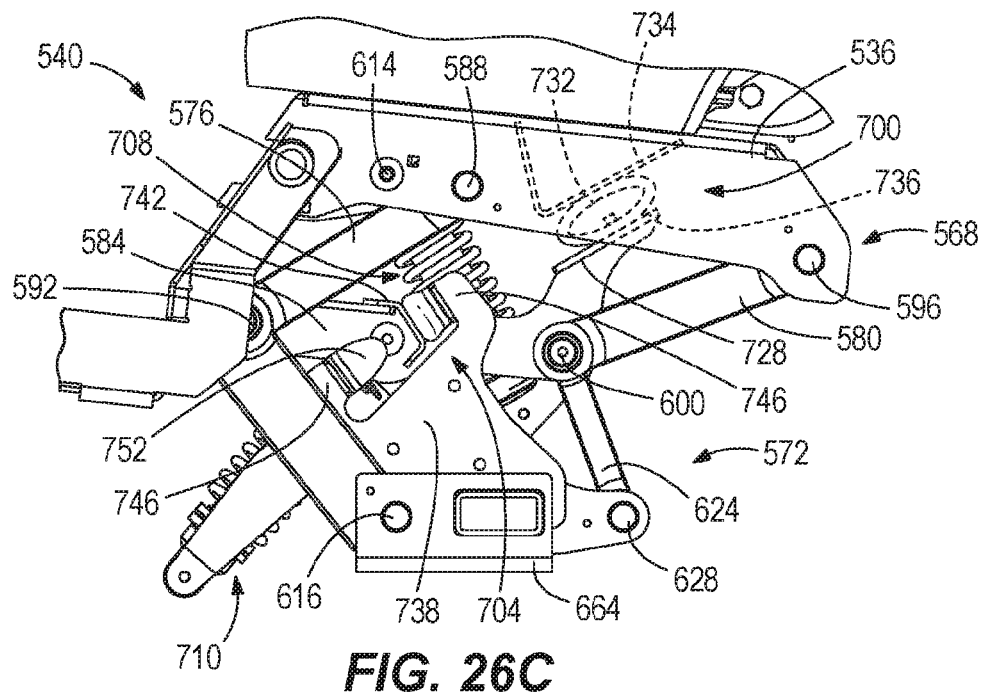
FIG. 26C is a left side view of the portion of the utility vehicle shown in FIG. 26A, when the lower linkage assembly is in an extended position and the upper linkage is in a compressed position.

With reference to FIG. 26C, independent from the first linkage assembly 568, the second linkage assembly 572 may also articulate to a first extended position when the operator is not seated on the operator platform 536. In the first extended position, the engagement member 742 of the connecting link 584 may engage with one of the resilient members 752 (the upper resilient member 752 pointing down and forward) of the second resistance assembly 704. The resilient member 752 in contact with the engagement member 742 slightly deforms to restrict movement of the second linkage assembly 572. During operation of the utility vehicle, the second linkage assembly 572 may articulate to a second extended position (e.g., beyond the first extended position) when the front portion of the frame 524 moves downward. In the second extended position one of the resilient members 752 (the upper resilient member 752 pointing down and forward) deforms to dampen the energy received by the second linkage assembly 572 and causes a dwell near the end of motion of the second linkage assembly 572.

FIG. 26C also illustrates the suspension system 540 with the first linkage assembly 568 in a collapsed position. The first linkage assembly 568 may articulate to the collapsed position when the rear portion of the frame 524 moves upward (e.g., the rear ground engaging element contacts a bump, during curb drops, etc.). When the first linkage assembly 568 is in the collapsed position, the engagement structure 734 moves towards the support surface 736 to compress the first resilient member 732 between the engagement structure 734 and the support surface 736. The compression of the first resilient member 732 dampens the movement of the first linkage assembly 568L to reduce damage to the suspension system 540 and absorb the energy transferred to the first linkage assembly 568 that would otherwise be transferred to the operator platform 536 (e.g., in form of abrupt movements of the operator platform) near the end of motion of the suspension system 540. At the same time, the first biasing member 708 may compress in tandem with the first resilient member 732 to absorb energy transferred to the first linkage assembly 568L and cause a dwell near the end of motion of the first linkage assembly 568L.

Figure 26D:
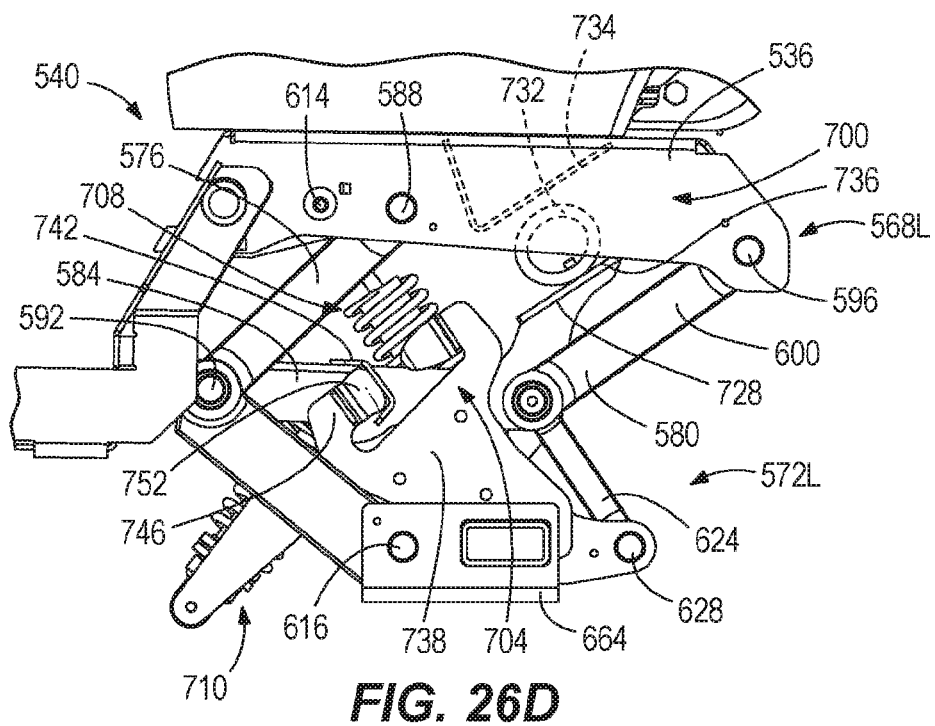
FIG. 26D is a left side view of the portion of the utility vehicle shown in FIG. 26A, when the lower linkage assembly is in a compressed position.

Now with reference to FIG. 26D, independent from the first linkage assembly 568, the second linkage assembly 572 may articulate to a collapsed position when the front portion of the frame 524 moves upward (e.g., the front ground engaging element contacts a bump, after a curb drop, etc.). When the second linkage assembly 572 is in the collapsed position, the second biasing member 710 and the second resistance assembly 704 restricts the travel distance of the second linkage assembly 572 (e.g., to form a hard stop). Since the connecting link 584 is the top link of the second linkage assembly 572, movement of the second linkage assembly 572 to the collapsed position may cause the engagement member 742 of the connecting link 584 to engage with one of the resilient members 752 (the lower resilient member 752 pointing generally up and rearward) of the second resistance assembly 704. The resilient member 752 in contact with the engagement member 742 deforms to dampen the energy received by the second linkage assembly 572. At the same time, the second biasing member 710 may compress in tandem with the resilient member 752 to absorb energy transferred to the second linkage assembly 572 and cause a dwell near the end of motion of the second linkage assembly 572.

Figure 27:
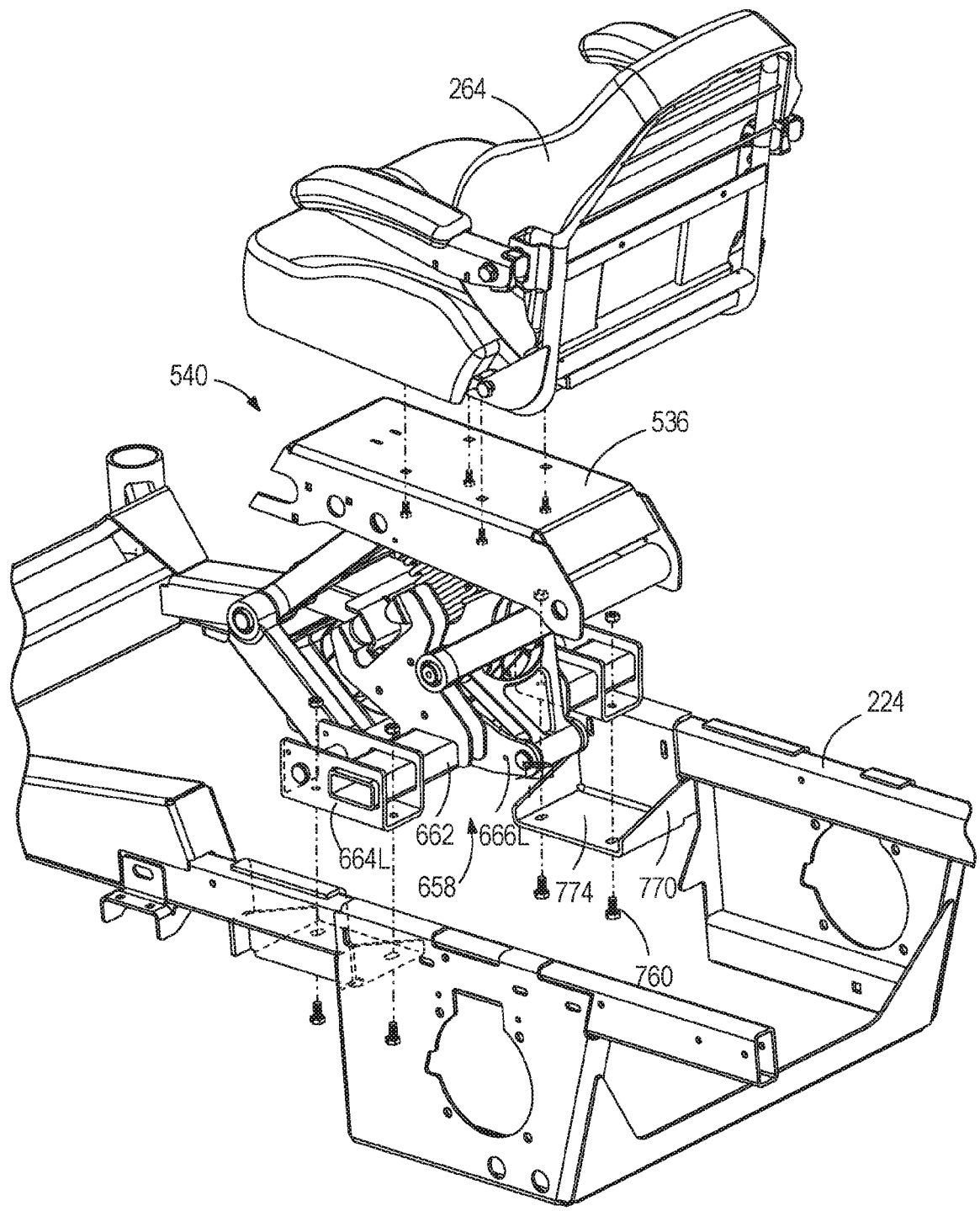
FIG. 27 is a left side, exploded perspective view of the utility vehicle of FIG. 23.

With reference to FIG. 27, an exploded view of the suspension system 540 is illustrated to show the modularity of the suspension system 540. The illustrated suspension system 540 may be assembled separately from the utility vehicle 520 and be fully operational separate from the utility vehicle. Fully operational means that the suspension system 540 may operate as if the suspension system 540 was coupled to a utility vehicle 520, as described above. As a result, the suspension system 540 may be manufactured at an alternative manufacturing facility, may be showcased in a showroom unattached to the utility vehicle, and the like. The frame includes a third support bracket 670 that is affixed to the frame 524 and defines a support surface 674 that supports the lower bracket 658. The support surface 674 is positioned below the frame 524 so the operator platform 536 coupled to the suspension system 240 can be positioned at a desired height relative to the frame 524. In the illustrated embodiment, the first support bracket 664 is affixed to the support surface 674 via a plurality of fasteners so the entire suspension system 540 can be assembled separate from the utility vehicle 520. As a result, the suspension system 540 may be uncoupled from the frame 524 to allow the suspension system 540 to be serviced or replaced with an alternative suspension system.

During assembly of the utility vehicle 520, the frame 524 having the first ground-engaging element 528 coupled to a front portion of the frame 524 and a second ground-engaging element 532 coupled to a rear portion of the frame 524 are provided. The suspension system 540 that is fully operational separate from the frame 524 and the operator platform 536 that is operable to support an operator are also provided. The suspension system 540 is affixed to the frame 524. It should be appreciated that the use of the terms couple or affix, may include either direct coupling or coupling using intervening elements. For example, when the suspension system 540 is affixed or coupled to the frame 524, the suspension system 540 may be directly coupled to the frame 524 or coupled through the lower bracket 658 (e.g., an intervening element). In the illustrated embodiment, the suspension system 540 includes the first linkage assembly 568 and the second linkage assembly 572 that are each four bar linkages that are connected in series.

In the illustrated embodiment, assembling the suspension system 540 includes assembling the second linkage assembly 572 and the first linkage assembly 568. Assembling the first linkage assembly includes pivotally coupling the first end of the first lower link 620 to the lower bracket 658, pivotally coupling a second end of the first lower link 620 to the connecting link 584, pivotally coupling a first end of the second lower link 624 to the lower bracket 658, and pivotally coupling a second end of the second lower link 624 to the second end of the connecting link 584. Assembling the first linkage assembly 568 includes pivotally coupling a first end of the first upper link 576 to a top link of the first linkage assembly 568 (e.g., the operator platform 536), pivotally coupling a second end of the first upper link 576 to the connecting link 584, pivotally coupling a first end of the second upper link 580 to the top link and pivotally coupling a first end of the second upper link 580 to the connecting link 584. In the illustrated embodiment, the operator platform 536 is the top link of the first linkage assembly 568. As a result, the operator platform 536 is affixed to the suspension system 540 (e.g., via a plurality of fasteners 756) prior to affixing the suspension system to the frame 524. However, it should be appreciated that the suspension system 540 may include an additional link that acts as the top link of the first linkage assembly 568, so the operator platform 536 can be affixed to the suspension system 540 after the suspension system 540 is affixed to the frame 524.

In the illustrated embodiment, the lower bracket 658 of the suspension system 540 is affixed to the frame 524. The lower bracket 658 includes the first support bracket 664 that is affixed to the support surface 774 of the third support bracket 770 (via a plurality of fasteners 760. As a result, the fasteners 760 may be removed so the suspension system 540 can be uncoupled from the frame 524 of the utility vehicle 520 and an alternative suspension system may be affixed to the frame 524.

Figure 28:
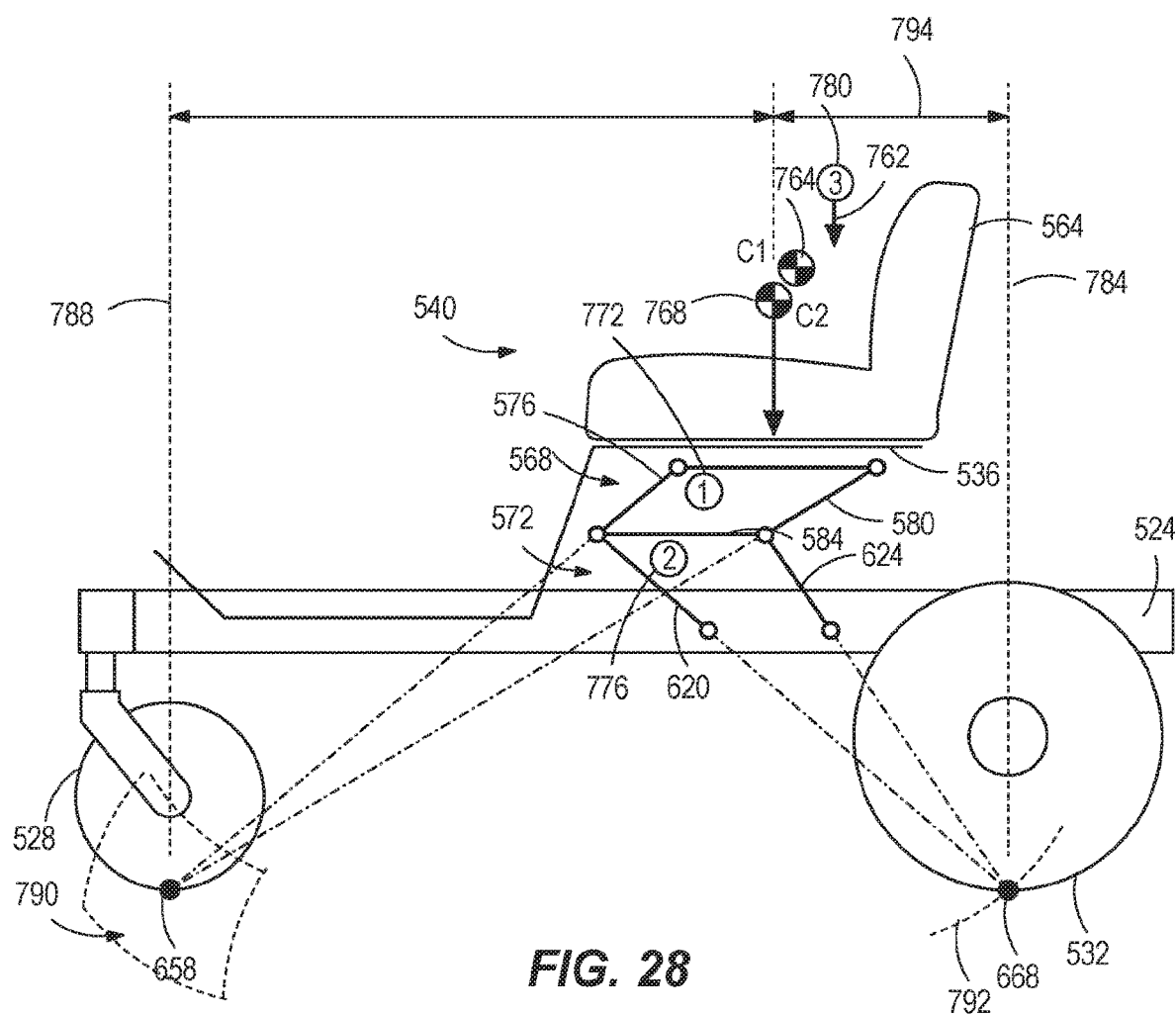
FIG. 28 is a left side, schematic view of the utility vehicle of FIG. 23

FIG. 28 illustrates a schematic view of the suspension system 540. While, the suspension system 540 is described in FIG. 28, it should be appreciated that the schematic may apply equally to the suspension systems 40, 240 described herein. Also, the elements are labeled without the suffix L or R to indicate that the schematic may be applied equally to each side of the suspension system 540. The suspension system 540 is constructed to accommodate motion of the frame 524 relative to the operator platform in response to pitching forces received by the frame 524 (described in detail above) and accommodate movement of the operator platform 536 in response to a non-pitching force 762 received by the operator platform 536. For example, the non-pitching force 762 received by the operator platform 536 may be due to an operator entering the operator platform 536, an operator seated on the operator platform 536, or the like. The non-pitching force 762 is defined as a force received by the operator platform 536 that does not cause the frame 524 to pitch relative to the ground. The non-pitching force 762 may also include the weight force of the operator platform 536 and the seat 564. Since operators typically have various weights and sizes, the non-pitching force 762 received by the operator platform 536 may vary. As a result, the construction of the suspension system 540 allows the operator platform 536 to accommodate various non-pitching forces without the need of an adjustment mechanism. When the non-pitching force 762 is received by the operator platform 536, the first and second linkage assemblies 568, 572 articulate or pitch simultaneously. As a result, pivotal movement of the operator platform 536 is limited and the operator platform 536 remains in substantially the same lateral position relative to the frame 524. In other words, the operator platform 536 minimally travels towards either of the ground-engaging elements 528, 532 (e.g., laterally forward or backwards).

In the illustrated embodiment, the first linkage assembly 568 defines a first composite center of gravity 764 and the second linkage assembly 572 defines a second composite center of gravity 768. When determining the first and second composite center of gravity 764, 768, the weight force of the linkage assembly 568, 572 and forces acting on the respective linkage assembly 568, 572 are used. For example, the first linkage assembly 568 defines a first center of gravity 772, the second linkage 572 defines a second center of gravity 776, and the non-pitching force 762 defined a third center of gravity 780. To determine the first composite center of gravity 764, the first center of gravity 772 and the third center of gravity 780 are combined (e.g., everything supported by the first linkage assembly 568). To determine the second composite center of gravity 768, the first center of gravity 772, the second center of gravity 776, and the third center of gravity 780 are combined (e.g., everything supported by the first linkage assembly 568). It should be appreciated the positioning of the composite center of gravity 764, 768 are approximate and are illustrated schematically for clarity. In addition, while the first and second composite center of gravity 764, 768 are offset in the illustrated embodiment, they may share a common location. For the shake of brevity, the first and second composite center of gravity 764, 768 are described as sharing a common location below.

With continued reference to FIG. 28, the first and second composite center of gravity 764, 768 are each positioned between the first and second ground-engaging elements 528, 532. Additionally, the first and second composite center of gravity 764, 768 are positioned between the first and second instant centers 656, 668. For example, the first and second composite center of gravity 764, 768 are positioned between a pair of boundary lines 784, 788 that extend through the instant centers 656, 668. Since the instant centers 656, 668 instantaneously change in response to the forces received by the suspension system 540, the boundary lines 784, 788 may instantaneously change during movement of the suspension system 540. As a result, the first and second composite center of gravity 764, 768 are positioned a distance 794 from the second ground engaging element 532 so the first and second composite center of gravity 764, 768 remain between the instant centers 656, 668 through the entire range of motion of the suspension system 540. The approximate range of movement of the instant centers 656, 668 are schematically illustrated in FIG. 28. For example, the first instant center 656 may move within a region 790 that near the first ground-engaging element and the second instant center 668 may move along an arc 792 that is near the second ground-engaging element 528, 532. As a result, the positioning of the first and second composite center of gravity 764, 768 between the instant centers 656, 668, cause the first and second linkage assemblies 568, 572 to pitch in opposing direction so the instant centers 656, 668 are located near the first and second ground-engaging elements 528, 532, respectively.

Figure 29:
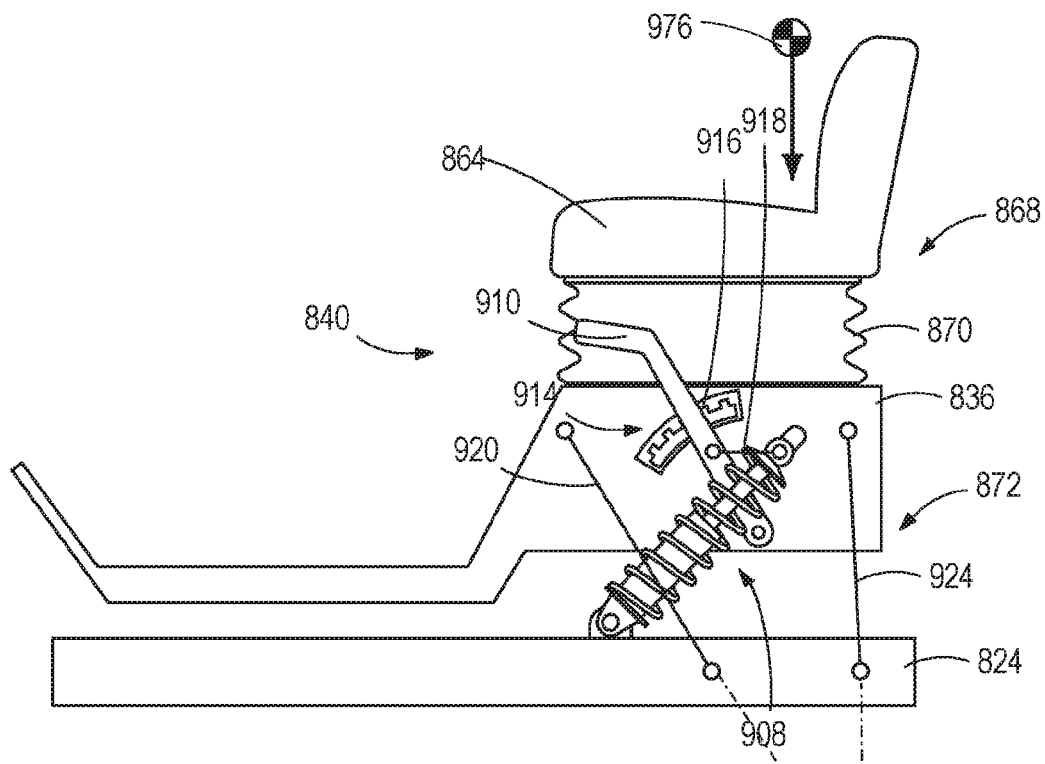
FIG. 29 is a left side schematic view of the utility vehicle, illustrating a suspension system according to another embodiment.
Figure 30:
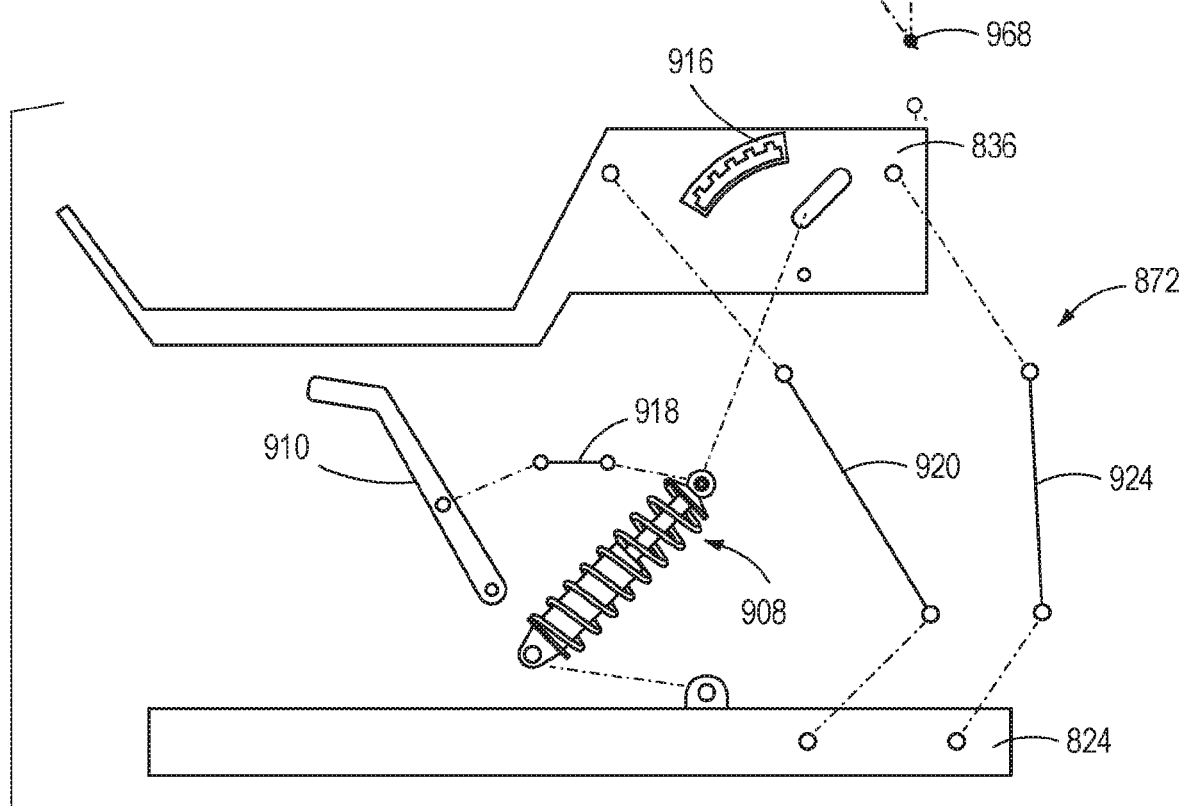
FIG. 30 is a left side exploded view of the suspension system of FIG. 29.

FIGS. 29 and 30 illustrate a suspension system 840 for a utility vehicle according to an alternative embodiment. The suspension system 840 is similar to the suspension systems 40, 240, 540 described above, and the following description focuses primarily on differences between the suspension system 840 and the suspension system 40, 240, 540. In addition, common features and elements of the suspension system 840 corresponding with features and elements of the suspension system 40 are given common reference numbers plus 800. The suspension system 840 includes a first linkage assembly 868 that has a vertical seat suspension module 870 and a second linkage assembly 872 coupled to a frame 824 of the utility vehicle. The vertical seat suspension module 870 may be a standard seat module that is currently used in the art of utility vehicles. The second linkage assembly 872 includes a first lower link 920, a second lower link 924, and a top link in the form of an operator platform 836. The first lower link 920 has a first end pivotally coupled to the frame 824 and a second end pivotally coupled to the operator platform 836. The second lower link 924 has a first end pivotally coupled to the frame 824 and a second end pivotally coupled to the operator platform 836. The top link of the second linkage assembly 872 pivots about an instant center 968.

A biasing member 908 has a first end coupled to the frame 824 and a second end coupled to the operator platform 836. The biasing member 908 is operably coupled to an adjustment mechanism 914 having an adjustment handle 910, an adjustment slot 916, and a connecting link 918 extending between the adjustment handle 910 and the second end of the biasing member 908. In the illustrated embodiment, the adjustment slot 916 has a plurality of notches so the adjustment handle 910 can be moved between a plurality of positions to adjust the tension or compression of the biasing member 908.

Similar to the suspension system 540, the first and second linkage assembly each define a composite center of gravity 976. In order to limit pitching of the operator platform 836, the composite center of gravity 976 must be positioned directly above the instant center 968. As a result, the operator may use the adjustment mechanism 914, to adjust the tension or compression of the spring so the composite of center of gravity 976 is positioned directly above the instant center 968. In other words, the operator is able adjust the position of a composite center of gravity 922 of the suspension system 840 by moving the adjustment handle 910 between the plurality of notches on the adjustment slot 916 so various sized operators can be accommodated. When the composite center of gravity 922 is directly above the instant center 968, the vertical seat suspension module 870 accommodates motion of frame 824 due to a pitching force on the second ground-engaging element 832 and the second linkage assembly 872 accommodates motion of frame 824 due to a pitching force on the first ground-engaging element 828.

FIGS. 31-33 illustrate various configurations of the four bar linkages of a suspension system. In should be appreciated the positioning of the links within the four bar linkages of any of the suspension systems 40, 240, 540, 840 may be arranged in any of the manners illustrated in FIGS. 31-33. For example, FIG. 31 illustrates a suspension system 1040 that includes a first linkage assembly 1068 coupled to an operator platform 1036 and a second linkage assembly 1072 coupled to a frame 1024 of the utility vehicle. In the illustrated embodiment, the first and second linkage assemblies 1068, 1072 are positioned in an opposite orientation to the first and second linkage assemblies of the suspension systems 40, 240, 540. In the illustrated embodiment, the first linkage assembly 1068 defines a first instant center 1158 located near a first ground-engaging element 1028 and the second linkage assembly 1072 defines a second instant center 1168 located near the second ground-engaging element 1032. It should be noted that, in the illustrated embodiment, the first ground-engaging member 1028 is coupled to a rear portion of the frame 1024 and the second ground-engaging is coupled to a front portion of the frame 1024. As a result, the first linkage assembly 1068 accommodates motion of the front portion of the frame 1024 relative to the operator platform 1036 (e.g., by having a top link pivot about the instant center 1158) and the second linkage assembly 1072 is operable independent of the first linkage assembly 1068 to accommodate motion of the rear portion of the frame 1024 relative to the operator platform 1036 (e.g., by having a top link pivot about the instant center 1168). In other words, the suspension system 1040 is inverted relative to the suspension systems 40, 240, 540, 840.

FIGS. 32 and 33 illustrates suspensions systems 1240, 1440 that include a first linkage assembly 1268, 1468 coupled to an operator platform 1236, 1436 and a second linkage assembly 1272, 1472 coupled to a frame 1224, 1422 of the utility vehicle. Each suspension system 1240, 1440 include a connecting link 1284, 1484 that the first linkage assembly 1268, 1468 and the second linkage assembly 1272, 1472 are coupled to. In the illustrated embodiment, the first linkage assembly 1268, 1468 and the second linkage assembly 1272, 1472 do not share a common axis. In other words, the first linkage assembly 1268, 1468 and the second linkage assembly 1272, 1472 are mounted at different heights on the connecting link 1284, 1484. In the illustrated embodiment, the first linkage assembly 1268, 1468 defines a first instant center 1358, 1558 located near a first ground-engaging element 1228, 1428 and the second linkage assembly 1272, 1472 defines a second instant center 1368, 1568 located near the second ground-engaging element 1232, 1432. FIG. 32 illustrated the suspension system 1240 having the first ground-engaging member 1228 is coupled to a front portion of the frame 1024 and the second ground-engaging element 1232 is coupled to a rear portion of the frame 1224. FIG. 33 illustrates the suspension system 1440 having the first ground-engaging member 1428 is coupled to a rear portion of the frame 1424 and the second ground-engaging element is coupled to a front portion of the frame 1024.

Various features and advantage of the invention are set forth in the following claims.

What is claimed is:

1. A utility vehicle comprising:
a frame;
a first ground-engaging element coupled to a first portion of the frame;
a second ground-engaging element coupled to a second portion of the frame;
an operator platform supported by the frame; and
a suspension system coupled between the operator platform and the frame to accommodate motion of the frame relative to the operator platform, the suspension system comprising:
a first linkage assembly coupled to the operator platform and operable to accommodate motion of the second portion of the frame relative to the operator platform; and
a second linkage assembly having a first end coupled to the frame to secure the suspension system to the frame and a second end coupled to the first linkage assembly such that the first and second linkage assemblies are connected to each other in series, the second linkage assembly being operable independent of the first linkage assembly to accommodate motion of the first portion of the frame relative to the operator platform;
wherein the first portion of the frame is one of a front portion of the frame and a rea portion of the frame and the second portion of the frame is the other of the front and rear portion of the frame.

2. The utility vehicle of claim 1, wherein the first ground-engaging element includes a front wheel, and wherein the second ground-engaging element includes a rear wheel.

3. The utility vehicle of claim 1, wherein each of the first linkage assembly and the second linkage assembly includes a four-bar linkage.

4. The utility vehicle of claim 1, wherein at least one of the first and second linkage assemblies includes a four-bar linkage.

5. The utility vehicle of claim 1, wherein:
the first linkage assembly defines a first instant center located to a first side of the operator platform, a top link of the first linkage assembly pivoting about the first instant center,
the second linkage assembly defines a second instant center located to a second side of the operator platform, a top link of the second linkage assembly pivoting about the second instant center, and
the first side of the operator platform is toward one of the front portion and rear portion of the frame md die second side of the operator platform is toward the other of the front portion and rear portion of the frame.

6. The utility vehicle of claim 5, wherein
the first instant center is located now the first ground-engaging element such that the top link of the first linkage assembly pivots about the first instant center in response to a pitching force applied to the second ground-engaging element; and
the second instant center is located near the second ground-engaging element such that the top link of the second linkage assembly pivots about the second instant center in response to a pitching force applied to the first ground-engaging element.

7. The utility vehicle of claim 6, wherein substantially all vertical movement of the frame in response to die pitching force on one or both of the first and second ground-engaging dements is offset by pivoting of the top link of the first linkage assembly about the first instant center, pivoting of the top link of the second linkage assembly about die second instant center, or simultaneous pivoting of the top link of the respective first mid second linkage assemblies about the respective first and second instant centers.

8. The utility vehicle of claim 5, wherein dew top link of the second linkage assembly comprises a connecting link and the second linkage assembly further comprises:
the frame;
a first lower link having a first and pivotally coupled to the frame and a second end pivotally coupled to the connecting link; and
a second lower link having a first end pivotally coupled to the frame and a second end pivotally coupled to the connecting link.

9. The utility vehicle of claim 8, wherein the top link of the first linkage assembly comprises the operator platform md the first linkage assembly further comprises:
the connecting link;
a first upper link having a first end pivotally coupled to the operator platform and a second end pivotally coupled to the connecting link;
and a second upper link having a first end pivotally coupled to the operator platform and a second end pivotally coupled to the connecting link.

10. The utility vehicle of claim 1, wherein the first linkage assembly comprises a vertical seat suspension module that is connected to the second linkage assembly.

11. The utility vehicle of claim 1, further comprising a first biasing member biasing the first linkage assembly to n extended position; and a second biasing member biasing the second linkage assembly to an extended position.

12. The utility vehicle of claim 1, further comprising a first resistance assembly coupled to the first linkage assembly to dampen motion and absorb at least a portion of the energy transferred to the utility vehicle when the first linkage assembly pivots towards a compressed position and approaches an end of a predetermined range of motion.

13. The utility vehicle of claim 12, wherein:
the first resistance assembly comprises a support structure, an engagement structure formed on the operator platform and opposing the support structure, and a first resilient member between the engagement structure and the support structure; and
the first resilient member is configured to compress between the engagement structure and support structure to absorb at least a portion of the energy transferred to the utility vehicle as the first linkage assembly pivots towards the compressed position.

14. The utility vehicle of claim 1, further comprising a second resistance assembly secured to the frame and coupled to the second linkage assembly to dampen motion and absorb at least a portion of the energy transferred to the utility vehicle when the second linkage assembly pivots towards an extended position or a compressed position.

15. The utility vehicle of claim 14, wherein the second resistance assembly comprises:
a support linkage having a first end rigidly coupled to the frame and a second end defining first and second arms;
first and second resilient members supported by the respective first and second arms; and
an engagement member coupled to the second linkage assembly and separated from each resilient member by a gap so the second linkage assembly freely moves within a limited range of motion without engaging with the second resistance assembly;
wherein the first resilient member is configured to compress against the engagement member to dampen motion and absorb at least a portion of the energy transferred to the utility vehicle when the second linkage assembly pivots towards an extended position, and
wherein the second resilient member is configured to compress against the engagement member to dampen motion and absorb at least a portion of the energy transferred to the utility vehicle when the second linkage assembly pivots towards a compressed position.

16. The utility vehicle of claim 1, further comprising:
a seat coupled to the operator platform; and
a lateral suspension system coupled between the seat and the operator platform to absorb energy transferred to the operator platform in response to roll forces received by the utility vehicle.

17. A utility vehicle comprising:
a frame;
a first ground-engaging element coupled to a first portion of the frame;
a second ground-engaging element coupled to a second portion of the frame;
an operator platform supported by the frame; and
a suspension system coupled between the operator platform and the frame to accommodate motion of die frame relative to the operator platform, the suspension system comprising:
a first four bar linkage assembly having a first top link, a connecting link, a first upper link having a first end pivotally coupled to the first top link and a second and pivotally coupled to the connecting link, and a second upper link having a first end pivotally coupled to the first top link and a second end pivotally coupled to the connecting link, the first four bar linkage assembly defining a first instant center located to a first side of the operator platform, die first top link pivoting about the first instant center to accommodate motion of the second portion of the frame relative to the operator platform; and
a second four bar linkage assembly connected in series to the first four bar linkage assembly, the second four bar linkage assembly having a second top link, the frame, a first lower link having a first end pivotally coupled to the frame aid a second mid pivotally coupled to the second top link, a second lower link having a first mid pivotally coupled to the frame and a second mid pivotally coupled to the second top link, the second four bar linkage assembly defining a second instant center located to a second side of the operator platform, the second top link pivoting about the first second instant center to accommodate motion of the first portion of the frame relative to the operator platform,
wherein the first portion of the frame is one of a front portion of the frame and a rear portion of the frame and the second portion of the frame is the other of the front and rear portion of the frame.

18. The utility vehicle of claim 17, wherein:
the first instant center is located near first ground-engaging element such that the first top link of the first linkage assembly pivots in response to a pitching force applied to the second ground-engaging element, and
the second instant center is located near the second ground-engaging element such that the second top link of the second linkage assembly pivots in response to a pitching force applied to the first ground-engaging element.

19. The utility vehicle of claim 18, wherein the first top link of the first four bar linkage assembly comprises a portion of the operator platform.

20. The utility vehicle of claim 19, wherein the connecting link of the first four bar linkage assembly comprises a portion of the second top link of the second four bar linkage assembly.

21. The utility vehicle of claim 17, further comprising a first biasing member biasing the first four bar linkage assembly to n extended position, and a second biasing member biasing the second four bar linkage assembly to n extended position.

22. The utility vehicle of claim 21, wherein the first biasing member has a first end coupled to the first top link and a second end coupled to the connecting link.

23. The utility vehicle of claim 22, wherein the second biasing ember has a first end coupled to the connecting link and a second end coupled to the frame.

24. The utility vehicle of claim 17, further comprising a first resistance assembly coupled to the first four bar linkage assembly to dampen motion and absorb at least a portion of the energy transferred to the utility vehicle when the first four bar linkage assembly pivots towards a compressed position and approaches an end of a predetermined range of motion.

25. The utility vehicle of claim 24, further comprising a second resistance assembly secured to the frame and coupled to the second four bar linkage assembly to dampen motion and absorb at least a portion of the energy transferred to the utility vehicle s the second four bar linkage assembly pivots towards an extended position or a compressed position.

26. The utility vehicle of claim 17, further comprising:
a seat coupled to the operator platform; and
a lateral suspension system coupled between the seat and the operator platform to absorb energy transferred to the operator platform in response to roll forces received by the utility vehicle.

27. A utility vehicle comprising:
a frame having a front portion and a rem portion;
a first ground-engaging element coupled to one of the front and rear portion of the frame for rotation about a first drive axis;
a second ground-engaging element coupled to the other one of the front and rear portion of the frame for rotation about a second drive axis;
an operator platform supported by the frame and located at least partially between the first drive axis and the second drive axis, the operator platform operable to support an operator relative to the frame; and
a suspension system coupled between the operator platform and the frame to accommodate motion of the frame relative to the operator platform and motion of the operator platform relative to the frame, the suspension system comprising:
a first linkage assembly coupled to the operator platform and operable to accommodate motion of the frame relative to the operator platform in response to a pitching force on the second ground-engaging element, the first linkage assembly defines a first composite center of gravity; and
a second linkage assembly having a first end coupled to the frame to secure the suspension system to the frame and a second and coupled to the first linkage assembly such that the first and second linkage assemblies are connected to each other in series, the second linkage assembly being operable independent from the first linkage assembly to accommodate motion of the frame relative to the operator platform in response to a pitching force on the first ground-engaging element, the second linkage assembly defining a second composite center of gravity,
wherein the first composite center of gravity and the second composite cater of gravity are each positioned between the first and second drive axes so the first linkage assembly and the second linkage assembly pivot together to limit pivotal movement of the operator platform relative to the frame in response to a non-pitching force received by the operator platform.

28. The utility vehicle of claim 27, wherein each of the first linkage assembly and the second linkage assembly includes a four-bar linkage.

29. The utility vehicle of claim 27, wherein at least one of the first and second linkage assemblies includes a four-bar linkage.

30. The utility vehicle of claim 27, wherein the first linkage assembly defines a first instant center located near first ground-engaging element such that a top link of the first linkage assembly pivots about the first instant center in response to the pitching force applied to the second ground-engaging element; and
the second linkage assembly defines a second instant center is located new the second ground-engaging element such that a top link of the second linkage assembly pivots about the second instant center in response to the pitching force applied to the first ground-engaging element.

31. The utility vehicle of claim 30, wherein the first and second composite center of gravity are positioned between the first instant center and the second instant center so the first linkage assembly pitches towards the second ground-engaging element and the second linkage assembly pitches towards the first ground-engaging elements to limit pivotal movement of the operator platform relative to the frame.

32. The utility vehicle of claim 27, wherein:
the first linkage assembly comprises a vertical seat suspension module that is connected to the second linkage assembly;
the second linkage assembly defines an instant center located near the second ground-engaging element such that a top link of the second linkage assembly pivots in response to the pitching force applied to the first ground-engaging element; and
the first and second composite center of gravity we positioned directly above the instant center so the vertical seat suspension module accommodates motion of frame due to the pitching force on the second ground-engaging element and the second linkage assembly accommodates motion of frame due to the pitching force on the first ground-engaging element.

33. The utility vehicle of claim 32, wherein the vertical seat suspension module comprises a biasing member and an adjustment mechanism coupled to the biasing member so the first and second composite center of gravity of the suspension system can be adjusted to accommodate the non-pitching force.

34. The utility vehicle of claim 27, further comprising a first resistance assembly coupled to the first linkage assembly to dampen motion and absorb at least a portion of the energy transferred to the operator platform as the first linkage assembly pivots towards a compressed position.

35. The utility vehicle of claim 34, further comprising a second resistance assembly secured to the frame and coupled to the second linkage assembly to dampen motion and absorb at least a portion of the energy transferred to the second linkage assembly pivots towards an extended position or a compressed position.

36. A method of assembling a utility vehicle, the method comprising:
providing a frame having a first ground-engaging element coupled to a front portion of the frame and a second ground-engaging element coupled to a rea portion of the frame;
providing a suspension system that is fully operational separate from the frame, the suspension system comprising a first linkage assembly and a second linkage assembly connected in series with the first linkage assembly, wherein the first linkage assembly, die second linkage assembly, or both includes a four-bar linkage;
providing an operator platform that is operable to support an operator;
affixing the suspension system to the frame, and
affixing the operator platform to the suspension system.

37. The method of claim 36, wherein providing the suspension system comprises:
providing the second linkage assembly having a connecting link, a lower bracket, a first lower link, and a second lower link;
pivotally coupling a first end of the first lower link to the lower bracket;

pivotally coupling a second end of the first lower link to the connecting link;

pivotally coupling a first end of the second lower link to the lower bracket; and pivotally coupling a second end of the second lower link to the second end of the connecting link.

38. The method of claim 37, wherein affixing the suspension system to dew frame comprises affixing the lower bracket to the frame.

39. The method of claim 37, wherein providing the suspension system comprises:

providing the first linkage assembly having a top link, the connecting link, a first upper link, and a second upper link;

pivotally coupling a first end of the first upper link to the top link;

pivotally coupling a second end of the first upper link to the connecting link;

pivotally coupling a first end of the second upper link to the top link;

pivotally coupling a first end of the second upper link to the connecting link.

40. The method of claim 39, wherein affixing the operator platform to the suspension system comprises affixing the operator platform to the first linkage assembly so the operator platform forms the top link of the first linkage assembly.

41. The method of claim 37, wherein providing the suspension system comprises:

providing the first linkage assembly comprising a vertical seat suspension module;

coupling the vertical seat suspension module to the connecting link of the second linkage assembly.

42. The method of claim 36, further comprising:

uncoupling the operator platform from the suspension system;

uncoupling suspension system from the frame;

affixing an alternative suspension system to the frame;

affixing the operator platform to the alternative suspension system.

* * * * *